United States Patent [19]
Gretta et al.

[11] Patent Number: 6,076,952
[45] Date of Patent: Jun. 20, 2000

[54] FIELDBUS NETWORK CONFIGURATION UTILITY WITH IMPROVED PARAMETER CONTROL

[75] Inventors: Robert Gretta; Ram Ramachandran, both of Austin, Tex.

[73] Assignee: National Instruments, Corp., Austin, Tex.

[21] Appl. No.: 08/932,274

[22] Filed: Sep. 17, 1997

[51] Int. Cl.⁷ ............................................... G05B 9/02
[52] U.S. Cl. .................... 364/188; 709/220; 370/248; 370/252; 370/255; 370/254; 370/257; 370/258; 370/457; 370/351
[58] Field of Search ............................ 364/188; 370/254, 370/351, 248, 257, 258, 255, 457, 252; 709/220

[56] References Cited

U.S. PATENT DOCUMENTS

| | | | |
|---|---|---|---|
| 5,768,119 | 6/1998 | Havekost et al. | 364/133 |
| 5,796,721 | 8/1998 | Gretta, Jr. | 370/245 |
| 5,850,523 | 2/1998 | Gretta, Jr. | 709/224 |

OTHER PUBLICATIONS

Fieldbus Foundation Fieldbus Specification System Architecture, By Fieldbus Foundation, Aug. 28, 1995, pp. 1–40, 1–119, 1–54, 1–55, 1–44, 1–116, 1–66, 1–11, 1–52 & 1–22.

*Primary Examiner*—Paul P. Gordon
*Assistant Examiner*—McDieunel Marc
*Attorney, Agent, or Firm*—Conley, Rose & Tayon; Jeffrey C. Hood

[57] ABSTRACT

A system and method for displaying and configuring parameters in a fieldbus configuration system. The fieldbus configuration utility first determines the devices and blocks present in the system, and then determines the parameters of each block. When the parameters are displayed, an object is displayed proximate to certain of the parameters. The object includes a color and/or shape which indicates the type or class of parameter. The user can also configure alarms and trends using the improved graphical interface of the present invention. The user configures alarms and trends by assembling a graphical program or wiring diagram on the screen which comprises a selected one or more block icons and an icon representing the device receiving the trend or alarm. The system also includes a periodic update window which is used to obtain periodically updated values of selected parameters.

58 Claims, 48 Drawing Sheets

Fieldbus Network Link

Fieldbus Network Devices

Function Block Parameters

Linkage between Blocks

Control Loop

Multiple Loops

Linkage Between Two Loops

Location of Publishing and Function Block Schedules

Add Links Dialog Box

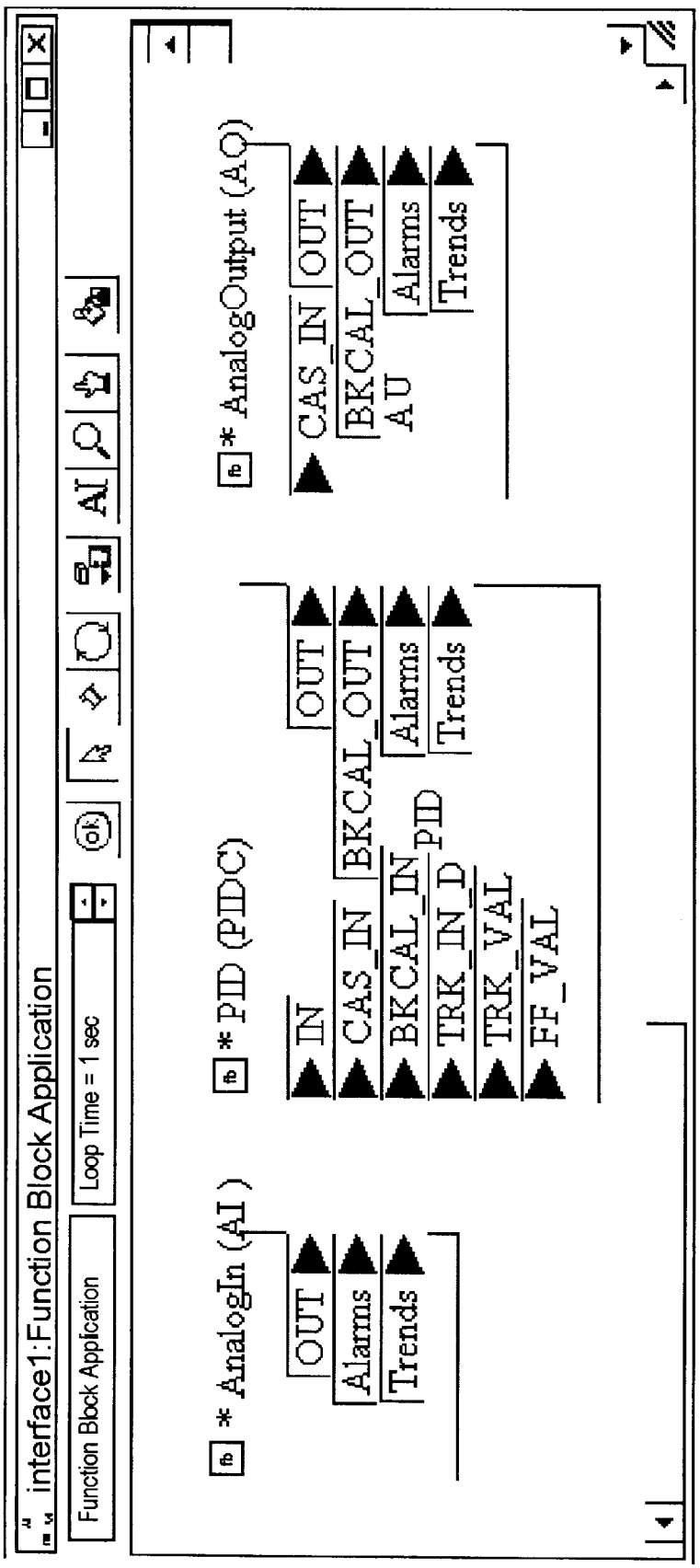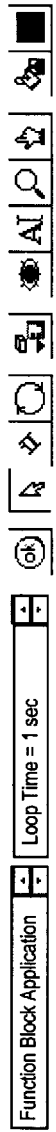
FIG. 14
FIG. 15

The Toolbar

Edit

| ⊙ TAG_DESC | abcde | oct (max len = 32) | Tag Description Help-The |

FIG. 32a

Spin

| ⊙ STRATEGY | 12345 | ▲▼ u16 | Strategy Help-The strategy |

FIG. 32b

List

| ⊙ SHED_OPT | ShedToManual ▼ | eum | Shed Option Help-Defines action |
⊞ ● RCAS_OUT_D   Uninitialized-Uninitialized Help-
⊞ ● UPDATE_EVT   NormalShed_NormalReturn-Actual mode changes to next lowest priority non-
⊞ ● BLOCK_ALM    NormalShed_NoReturn-Target mode changes to next lowest priority non-rem
                 ShedToAuto_NormalReturn-Actual mode changes to Auto, but returns to targ
                 ShedToAuto_NoReturn-Target mode changes to Auto
                 ShedToManual_NormalReturn-Actual mode changes to Manual, but returns t
                 ShedToManual_NoReturn-Target mode changes to Manual
                 ShedToRetainedTarget_NormalReturn-Shed to previous target mode and ret
                 ShedToRetainedTarget_NoReturn-Target mode changes to target retained n

FIG. 32c

Check List

⊟ ● MODE_BLK                                                    Mode Block Help - The actu
   TARGET         ☐ROut-Remote Output Mode         Target Mode Help -
   ├ACTUAL            ☐RCas-Remote Cascade Mode        Actual Mode Help -
   ├PERMITTED         ☑Cas - Cascade Mode              Permitted Mode Help -
   └NORMAL            ☐Auto - Automatic Mode           Normal Mode Help -
  ● BLOCK_ERR              ☑Man - Man                   Block Error Help - This parar
⊞ ● PV_D                             ☐LO-Local Override Mode          PV Discrete Help - Either the
⊞ ● SP_D                             ☐IMan - Initialization Manual Mode  Setpoint Discrete Help - The
⊞ ▶ OUT D                            ☐OOS - Out Of Service Mode       Output Discrete Help - The p

FIG. 32d

The Toolbar

| DiscreteInput (DI) | [icons] |

FIG. 33

FIELDBUS NETWORK CONFIGURATION UTILITY WITH IMPROVED PARAMETER CONTROL

FIELD OF INVENTION

The invention relates to fieldbus networks. In particular, the invention relates to an improved fieldbus network configuration utility for configuring function blocks in a fieldbus network using pre-defined or user-created function block connection templates.

BACKGROUND OF THE INVENTION

A fieldbus is a specific type of local area network (LAN) that is used to monitor or control one or more pieces of production equipment. The term "Fieldbus" generally refers to an all-digital, two-way communication system that connects control systems to instrumentation. A fieldbus network comprises a plurality of digital devices and control/monitoring equipment that are integrated to provide I/O and control for automated processes. A fieldbus network is typically used in industrial and/or process control applications, such as a factory or manufacturing plant. The physical devices in a fieldbus system are connected by the fieldbus. One example of a fieldbus network is the Fieldbus Foundation fieldbus network.

Foundation Fieldbus, which is the serial communications network created by the Fieldbus foundation, specifically targets the need for robust distributed control in process control environments. Devices connected by a Foundation Fieldbus exchange data between themselves, and thus control a fieldbus process. Devices are given the opportunity to communicate data by a token passing scheme controlled by a device referred to as the "Link Active Scheduler" or LAS (a device used to schedule communication traffic).

The components of a Foundation Fieldbus Network are as follows:

1) Link
2) Devices
3) Blocks and Parameters
4) Linkages
5) Loops
6) Schedule

Fieldbus networks may contain one of four types of devices, these being temporary devices, field devices, interface devices, and monitor devices. Temporary devices are devices attached to one of four network addresses reserved for temporary or visitor use. Temporary devices are typically used for configuration and troubleshooting. Field devices are devices that typically comprise function block application processes or, in other words, devices that perform the I/O and control that automates the plant or factory. All field devices are given a permanent address by the system manager when they are attached to the network. Interface devices perform data display and other interface functions for field devices. Like field devices, interface devices are assigned a permanent address, but interface devices do not necessarily contain function block application processes. Finally, monitor devices are devices that are able to listen to network traffic but are not permitted to transmit onto the network. Monitor devices receive no address when attached to the network, and the other network devices are unaware of the monitor's presence.

As mentioned above, a field device generally comprises one or more function block application processes, referred to as function blocks. A function block comprises an algorithm and one or more parameters associated with the algorithm. Function blocks model field device functions, such as analog input (AI) functions and PID (Proportional Integral Derivative) control loop functions, among others. The function block model provides a common structure for defining function block inputs, outputs, algorithms and control parameters. This structure simplifies the identification and standardization of characteristics that are common to function blocks.

The function block model includes associated standardized definitions used to support function blocks. These definitions include the Object Dictionary (OD) and the Device Description Language (DDL). These definitions support application processes in the definitions and description of their network visible objects, such as function blocks and their parameters.

Each physical device performs a portion of the total system operation by implementing one or more application processes. Application processes perform one or more time-critical functions, such as providing sensor readings or implementing one or more control algorithms. As noted above, these field device functions are modeled by function blocks. The operation of the various function blocks is coordinated through configuration of their external communications, execution schedules, and operating parameters.

Physical devices in a fieldbus system are interconnected by a fieldbus network. Fieldbus networks may be comprised of one or more link segments interconnected by bridges. Communication between physical devices is provided by physical layer and data link layer protocols. Intervening bridges forward messages transparently between links.

A fieldbus network utilizes a four layered communication stack or four layer protocol, including a physical layer, a data link layer, and application layer that is divided into an access sublayer and a messaging sublayer. Transfer of information between field devices is provided by the physical layer and data link layer protocols. The physical layer specifies how signals are sent, the fieldbus data link layer (FDL) specifies how the network access is shared and scheduled among devices, and the application layer defines the message formats available to applications for the exchange of commands. Communications between application processes in the field devices occurs through the application layer protocols. The application layer is divided into two sublayers, an upper sublayer, defined by the Fieldbus Messaging Specification (FMS), that provides services to application processes, and a lower sublayer, known as the Fieldbus Access Sublayer (FAS), that maps FMS services onto the underlying capabilities of the data link layer.

In fieldbus networks, information is transmitted along the fieldbus in discrete segments commonly referred to as packets. Packets are passed between the field devices connected to the network. Each packet may contain FDL information, FAS information, and FMS information corresponding to the various architectural layers used in the fieldbus implementation.

System management is used in fieldbus networks to coordinate the operation of the various devices in a distributed fieldbus system. System management functions include node address assignment for devices, application clock synchronization, distributed application scheduling across the segment, and support for locating application tags. System management provides the facilities to bring new devices on the segment to an operational state and to control the overall system operation. System management uses FMS to remotely access management information within a device and to directly access the data link layer to carry out its other functions. A single system management entity exists in each device for each data link segment connected to the device. The entity comprises user applications and a system management kernel. The kernel provides a network coordinated and synchronized set of functions.

A fieldbus configuration utility is generally used to create a fieldbus application. The fieldbus configuration utility is used to create a schedule for the fieldbus devices to control operation of the fieldbus devices. However, current fieldbus configuration utilities do not provide a simplified manner for creating a fieldbus configuration.

Applicants are aware of a fieldbus configuration utility available from SMAR. The SMAR fieldbus configuration utility provides a mechanism for connecting function blocks and editing parameters. However, the SMAR fieldbus configuration utility does not display input and output parameters on the function block diagram, and thus is not intuitive and user friendly. The SMAR fieldbus configuration utility also does not provide for scheduling. The SMAR fieldbus configuration utility does not include device descriptions, and thus does cannot determine arbitrary data types. The SMAR fieldbus configuration utility further does not provide a method for configuring trends and alerts and does not classify parameters in any way.

Therefore, an improved fieldbus configuration utility is desired which provides an improved user interface and simplified development for fieldbus applications.

SUMMARY OF THE INVENTION

The present invention comprises a system and method for creating a fieldbus configuration on a computer system. The fieldbus configuration is created for a fieldbus network, wherein the fieldbus network includes a plurality of devices connected to a fieldbus bus. Each of the fieldbus devices includes one or more function blocks, wherein function blocks include at least one algorithm or method and one or more parameters.

The method comprises first scanning the fieldbus network to determine the devices comprised in the fieldbus network and the function blocks comprised in the devices. The method then displays on the screen a selected plurality of function block icons in response to user input, wherein each of the plurality of function block icons represents a function block. Each of the plurality of function block icons includes one or more inputs and/or one or more outputs. In response to user input, the method then displays on the screen one or more wires connecting the plurality of function block icons. Thus the method allows the user to select function blocks for placement in an editor window, and then link or wire the function blocks to create a fieldbus configuration for the fieldbus network.

The user also can use one or more fieldbus configuration templates in the creation of a fieldbus configuration. Each fieldbus configuration template comprises a pre-wired fieldbus configuration, i.e., each fieldbus configuration template represents one or more linked blocks which form at least a portion of a fieldbus configuration. The user can select a fieldbus configuration template from one or more fieldbus configuration template selections. The user can then use and/or modify the fieldbus configuration template to create a fieldbus configuration.

The editor window where the fieldbus configuration is created specifies a first rate for the fieldbus configuration. Thus, when the fieldbus configuration is executed, the function block icons comprised in fieldbus configuration execute at the first rate specified by the editor window. The user can place one or more loop structures in the editor window, wherein the user can place one or more function block icons comprised within the loop structure. The loop structure can be used to specify a second different rate for the function block icons comprised within the loop structure. Thus, when the fieldbus configuration which includes the loop structure is executed, the function block icons comprised in the loop structure execute at the second rate specified by the loop structure, and the function block icons comprised in the editor window and not comprised in the loop structure execute at the first rate specified by the editor window.

In response to the fieldbus configuration wiring diagram created by the user, the system or method automatically creates a fieldbus configuration for the fieldbus network. The user can then download the fieldbus configuration to the fieldbus network, wherein the downloading operates to configure the devices in the fieldbus network.

The system and method of the present invention also automatically creates and displays a schedule in response to the created fieldbus configuration. In the preferred embodiment, the schedule is created and displayed in real time as the user assembles the fieldbus configuration wiring diagram. This provides the user with immediate feedback of the configuration as it is being assembled.

If the fieldbus configuration includes one or more loops, the schedule is created using the associated loop times. The method preferably creates an optimized schedule in response to the fieldbus configuration. The schedule comprises one or more schedule bars for graphically or visually indicating the order of execution of the function blocks. The user can change the order of execution indicated by the schedule by graphically manipulating the schedule, and more particularly by graphically manipulating or altering the location of the one or more schedule bars in the schedule.

The present invention also provides an improved method for displaying parameters. According to the present invention, the parameters are displayed based on the device description classification. The present invention uses the device description classification information to provide a more intuitive display of the parameters. The system preferably displays an object next to various parameters, wherein the objects have different colors and/or shapes to distinguish among contained, input and output parameters, and also distinguish among the types of contained parameters, e.g., alarm, tuning and diagnostic parameters.

The present invention includes an improved method for obtaining the device description information of parameters. First, the method determines the one or more function blocks in a device, and then determines the parameters from the device. The method then obtains a device description for each parameter. Obtaining the device description includes receiving parameter information associated with the parameters. The method then parses the parameter information, and uses this information to display the parameters in a manner which indicates at least a portion of the parameter information. This preferably comprises displaying an object next to certain of the parameters, wherein the objects have different shapes and/or colors to visually distinguish among the parameters.

The user can also configure alarms and trends using the improved graphical interface of the present invention. The system includes the ability to configure trends and alarms using graphical data flow diagramming, in a similar manner to the assembly of a fieldbus configuration. The user is simply required to wire the trends/alarms output of a function block to a trends/alarm input of a device to configure trends/alarms. The present invention also provides a periodic update window which enables a user to select parameters for periodic updating.

BRIEF DESCRIPTION OF DRAWINGS

A better understanding of the present invention can be obtained when the following detailed description of the preferred embodiment is considered in conjunction with the following drawings, in which:

FIG. 14 is a screen shot illustrating the function block application editor which includes function blocks that have been added to a function block application;

FIG. 15 illustrates the toolbar which appears at the top of the function block application editor of FIG. 14;

FIG. 20a is a screen shot illustrating an initial form of a function block template, and FIG. 20b illustrates a fieldbus configuration or function block application created using the template of FIG. 20a;

FIG. 32a–d are screen shots illustrating special edit controls used for editing parameters of a function block;

FIG. 33 illustrates a toolbar used for reading and writing of parameters which appears at the top of the screen shot of FIG. 28;

Figure 1:
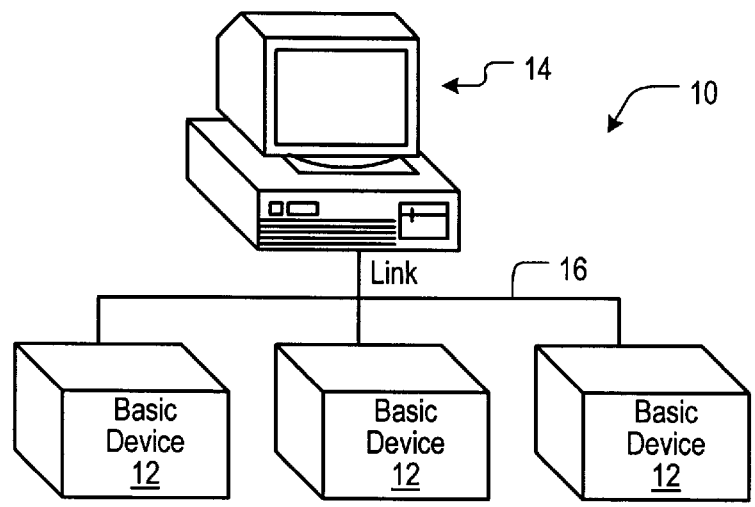
FIG. 1 is a simplified block diagram of a fieldbus network.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DESCRIPTION OF THE PREFERRED EMBODIMENT

Incorporation By Reference

The Fieldbus Specification, Document FF-94-801, available from the Fieldbus Foundation, is hereby incorporated by reference as though fully and completely set forth herein.
FIG. 1—Fieldbus Network FIG. 1 is a block diagram of a simple single link fieldbus network 10. The fieldbus network 10 comprises a process control network system. In the present application, the term "Fieldbus" is intended to include any of various types of process control networks, including the Foundation Fieldbus fieldbus network, among others.

System 10 is comprised of a fieldbus 16 and a plurality of fieldbus devices 12 connected to fieldbus 16. Fieldbus devices 12 and fieldbus 16 are preferably compliant with the Fieldbus Specification published by the Fieldbus Foundation. However, as noted above, fieldbus devices 12 and fieldbus 16 may be compliant with other types of fieldbus networks or fieldbus specifications, as desired. The Foundation Fieldbus network is comprised of devices connected by a serial bus, referred to as the fieldbus 16. However, it is noted that the fieldbus 16 may comprise any of various types of data buses, as desired. The network portion shown in FIG. 1 is referred to as a "Link" or a "Segment". Segments can be separated by special devices called bridges.

Fieldbus devices 12 each include one or more function blocks which perform functions or operations in the system. Fieldbus devices 12 also preferably each include a function block shell. More particularly, fieldbus devices 12 include a memory element or memory media which stores one or more function blocks and a function block shell or interface. Fieldbus devices 12 are capable of generating fieldbus packets on fieldbus 16. Each fieldbus device 12 is assigned a permanent network address. The fieldbus devices 12 illustrated in FIG. 1 may include devices such as PID (Proportional Integral Derivative), Analog Input, and Analog Output devices, among others.

System 10 also includes an interface device 14, such as a computer system, coupled to the fieldbus bus. The host computer system 14 may store a non-embedded application. In the preferred embodiment, the computer system 14 includes a memory media which stores a fieldbus configuration utility according to the present invention. As used herein, the term "memory media" is intended to include various types of memories or storage devices, including system memory, such as DRAM, SRAM, EDO RAM, etc., hard disk storage or other magnetic media, CD-ROM(s), optical storage, and floppy disks, among others.

The computer system 14 is operable to execute the fieldbus configuration utility according to the present invention to enable the user to create a fieldbus configuration. The computer system 14 also includes one or more user input devices, such as a keyboard and/or pointing device, which enables the user to interact with the computer system 14.

Figure 2:
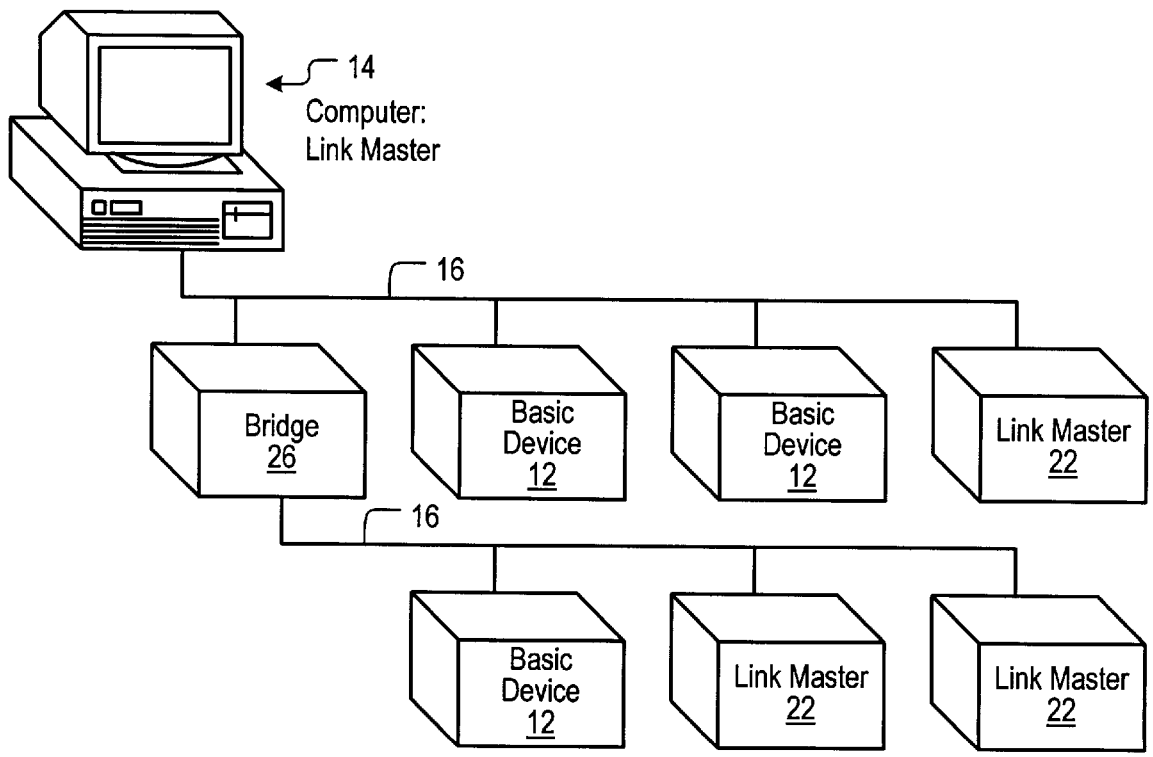
FIG. 2 is a simplified block diagram of a fieldbus network including a bridge, one or more basic devices, and one or more link masters.

One or more of the fieldbus devices 12 preferably comprise Fieldbus "round cards". A fieldbus round card comprises a logic device, preferably configured as a round PCB card, which includes processing logic. Each fieldbus device round card includes one or more function blocks (user applications) stored on the round card in a memory, and a function block shell according to the present invention stored in a memory.
FIG. 2: Fieldbus Devices Referring now to FIG. 2, there are generally three types of devices 12 on a fieldbus network, these being a Link Master 22, a Basic Device 24 and a Bridge 26. Link master 22 is a device which has the capability of orchestrating communications traffic on a fieldbus segment. This device can be a DCS or can be any other device such as a valve or a pressure transmitter. Link Master 22 is necessary to prevent multiple devices from communicating their data at the same time. Basic Device 24 is a device without Link Master capability. Bridge 26 is a device that connects two or more links. As shown in FIG. 2, although the computer 14 in FIG. 2 is configured as a Link Master, the reference numeral 14 is still used to designate the computer 14, even though the computer 14 in FIG. 2 operates as a link master 22.

Figure 3:
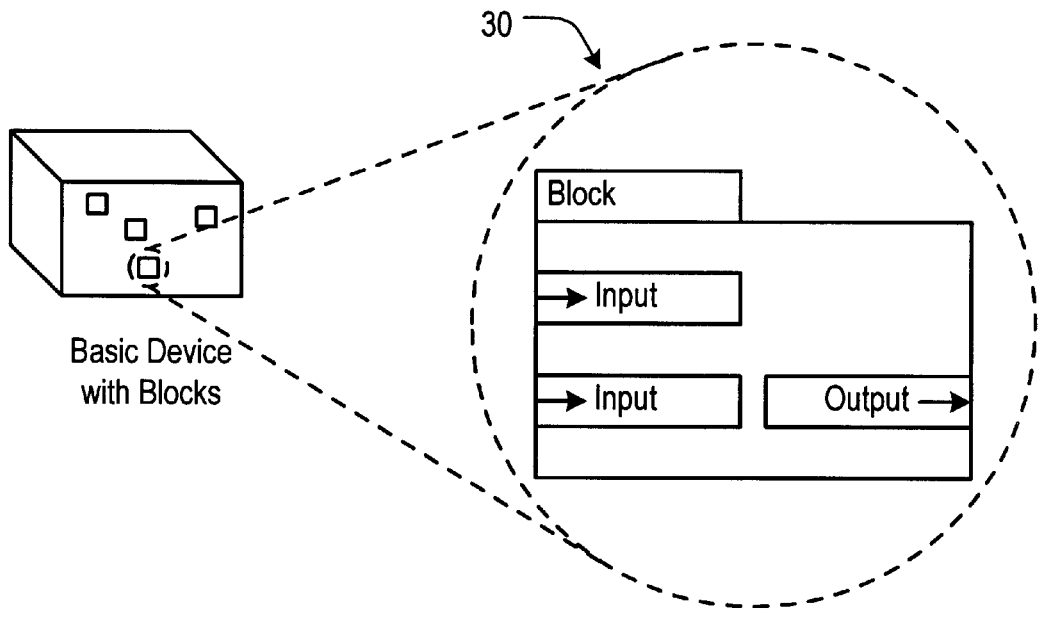
FIG. 3 illustrates the function blocks in a device.

Devices are uniquely identified on the fieldbus by a human readable name or "tag". The tag is a configurable attribute of the device and is typically used to describe the function as well as location of the device. Device tags are unique on a fieldbus network. Another unique identifier of a device is the device ID, which is basically a serial number of the device that is unique throughout the world.
FIG. 3: Blocks and Parameters Typically a device 12 contains a set of functions that it can perform. As shown in FIG. 3, these functions are represented as function blocks 30 within the device 12. The blocks 30 are basically containers of algorithms and the parameters controlling the algorithm(s). The specification for Foundation Fieldbus defines 10 standard blocks/algorithms as follows:

Analog Input (AI)

Analog Output (AO)

Discrete Input (DI)

Discrete Output (DO)

Proportional Integral Derivative (PID)

Proportional Derivative (PD)

Bias Gain (BG)

Ratio Control (RC)

Control Selector (CS)

Manual Loader (ML)

The actual function of a block 30 is determined or modified by the settings of block parameters, which can be classed as follows:

Input—Parameter that is to receive data from another block

Output—Parameter that is to send data to another block

Contained—Parameter that neither receives or sends data, but rather is "contained" within the block.

These parameters can also be optionally sub-classed as:

Alarm—Parameters related to alarms

Trend—Parameters related to trending

Tuning—Parameters related to tuning

Diagnostic—Parameters related to diagnosing/testing block functions

The above classifications of alarm, trend and tuning are independent of the input, output, and contained classifications. For example, an input parameter can also be a trend parameter.

Figure 4:
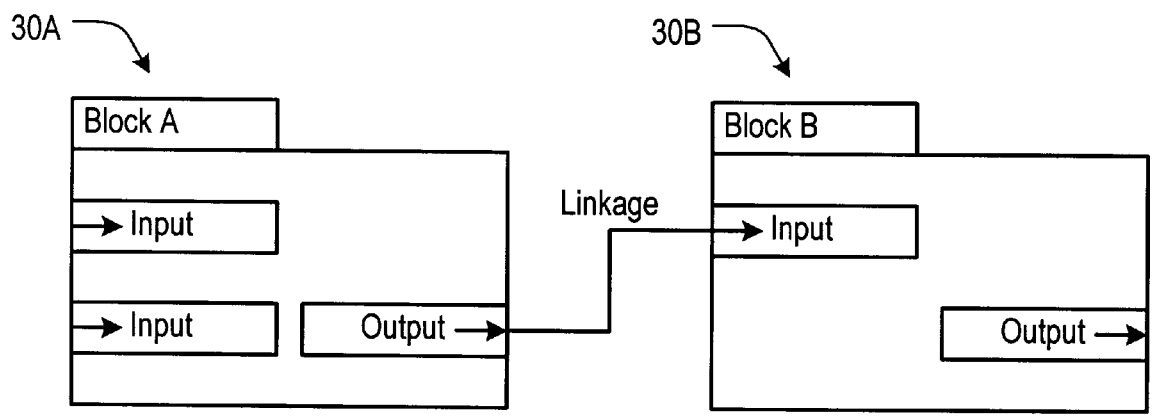
FIG. 4 illustrates linkages between function blocks.

In a similar manner to devices 12, blocks 30 are uniquely identified on the fieldbus by a human readable name or character string name, referred to as a "tag". The block tag is a configurable attribute of the block 30 and is typically used to describe the function as well as location of the block 30. Block tags are unique on a fieldbus network.
FIG. 4: Linkages As shown in FIG. 4, the function blocks 30 configured to control a process are "linked" or connected via configuration objects inside the devices. FIG. 4 illustrates a first function block 30A connected to a second function block 30B by a link or wire. These links provide the mechanism for transporting data from one block to the other, i.e., these links illustrate or represent a block sending data to another block. A block parameter that is written to the bus is referred to as a published parameter. A block parameter that is receiving data is referred to as a subscribed parameter.

Figure 5:
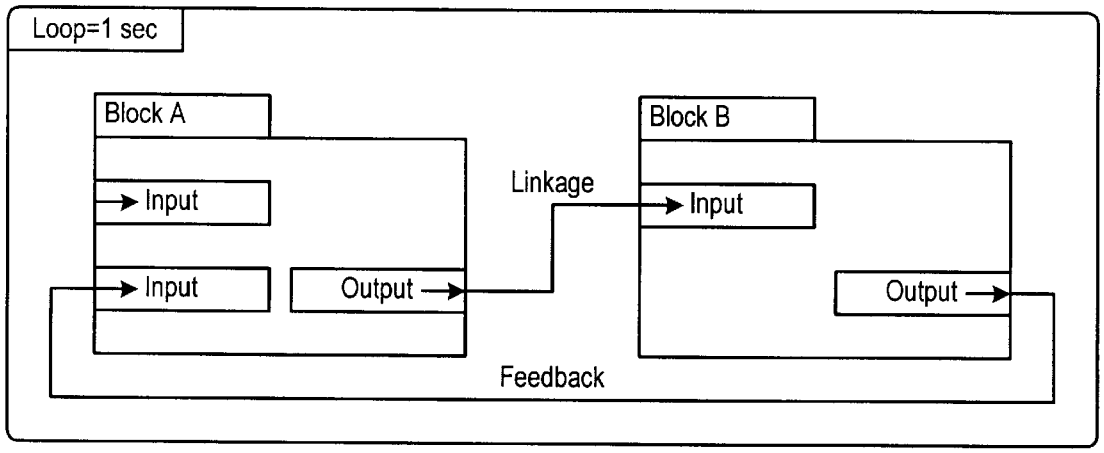
FIG. 5 illustrates a loop created by two or more function blocks.
Figure 6:
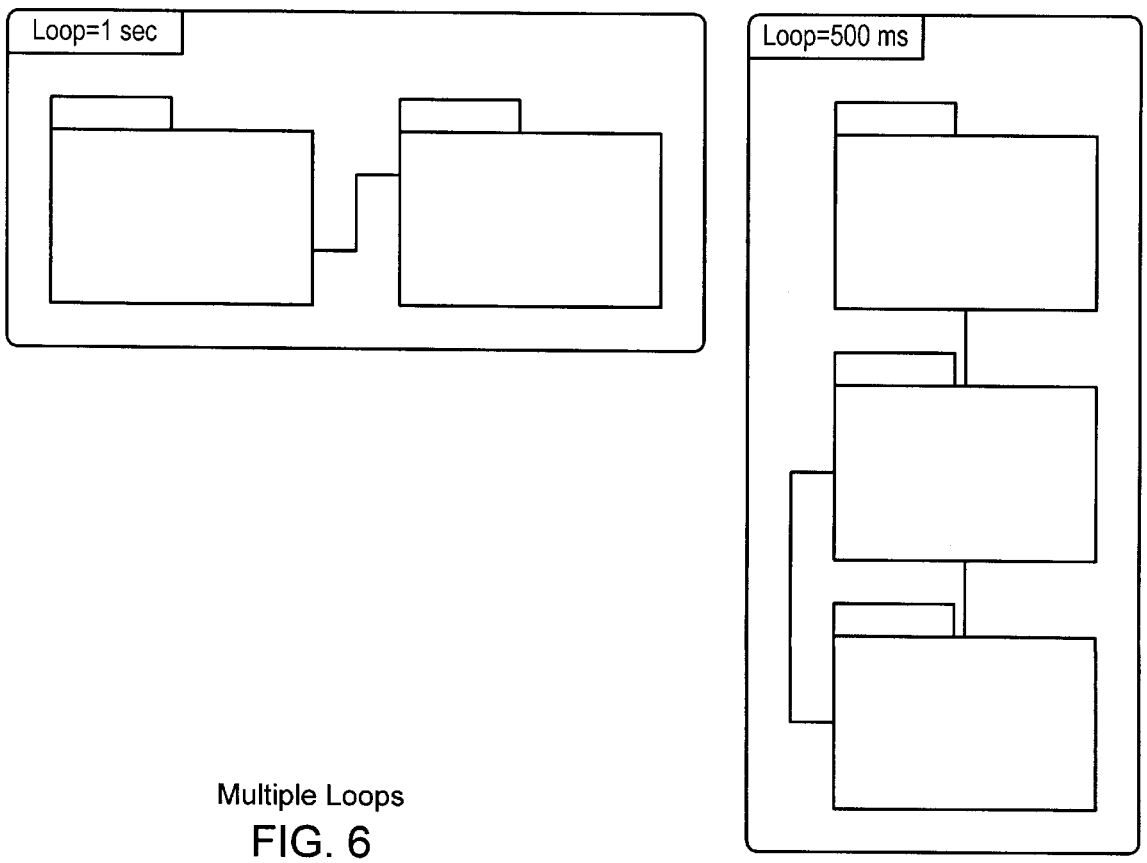
FIG. 6 illustrates multiple loops running at different rates on a fieldbus segment.
Figure 7:
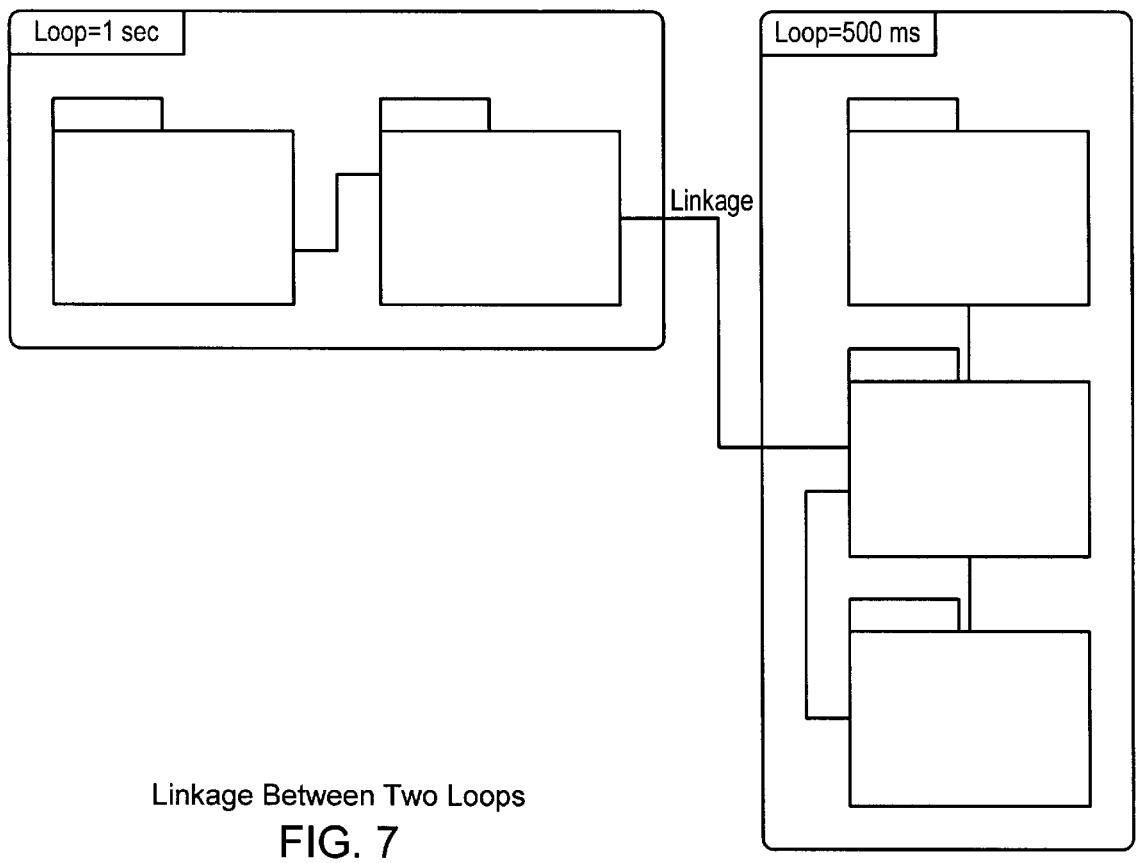
FIG. 7 illustrates multiple loops connected together via a data linkage.

FIGS. 5–7: Loops

Referring now to FIG. 5, a loop or control loop is a group of one or more function blocks 30 connected by linkages executing at a configured rate. FIG. 5 illustrates Block A, designated by 30A, linked with Block B, designated by 30B, including a feedback link or path which creates a loop. Each block executes at the configured rate and data is communicated between the blocks at the configured rate.

As shown in FIG. 6, it is possible to have multiple loops running at different rates on a fieldbus segment. Further, as shown in FIG. 7, even though the loops are running at different rates, they can feed each other data via the linkages.

Figure 8:
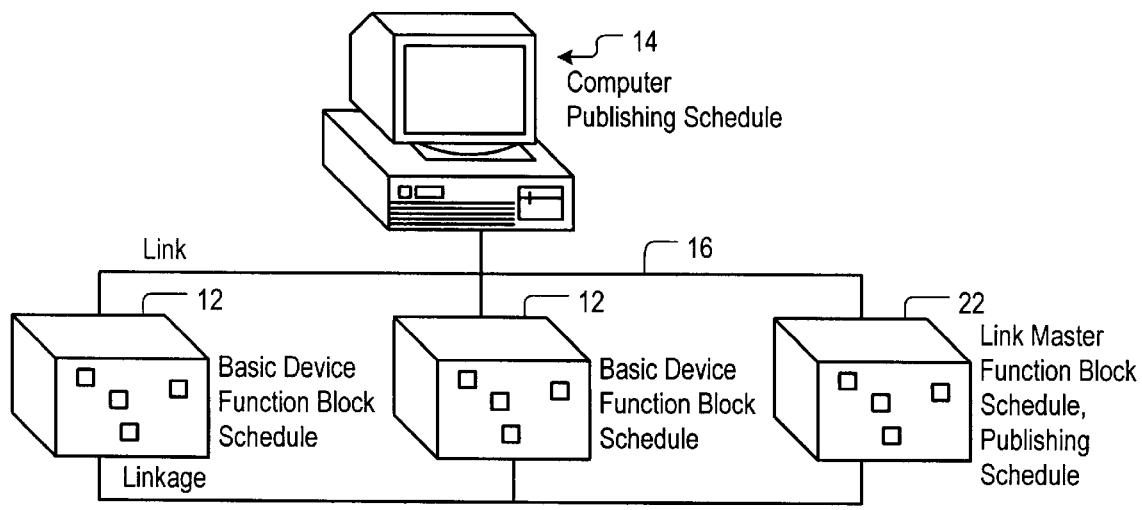
FIG. 8 illustrates a fieldbus network and also indicates which devices contain the publishing schedule and/or function block schedule.

FIG. 8—Fieldbus Schedules

Referring now to FIG. 8, a schedule of data traffic is necessary to allow devices to communicate data properly at a controlled rate. A schedule of data traffic makes it possible for communication to be deterministic, meaning that data is transferred between a given set of devices at the same time during each loop.

The schedule can be divided into two parts: a function block schedule that determines when a block executes, and a publishing schedule that determines when published data parameters are communicated on the fieldbus. The function block schedule is downloaded to the device that contains the function blocks, and the publishing schedule is typically downloaded to one or multiple devices that have Link Master capability. The Link Master running the publishing schedule and thus controlling the process is referred to as the "Link Active Scheduler" or LAS.

Downloading the schedule to multiple devices ensures that the process will continue to be controlled even if the LAS fails. In the case of LAS failure, another device with Link Master capability takes over the bus and runs the schedule.

Therefore, the Link Active Scheduler (LAS) is a Link Master device that is currently running the bus schedule. The LAS is a controller which orchestrates the communications traffic on a fieldbus segment. The LAS is necessary to prevent multiple devices from communicating their data at the same time.

FIG. 8 shows the relationship of the function block schedule and the publishing schedule to the device, link, link master, and LAS. As shown in FIG. 8, the schedule can be downloaded to multiple Link Master devices. FIG. 8 illustrates a fieldbus network which includes a link master and a PC which operates as the LAS. In FIG. 8, each of the PC LAS and the link master 22 contain the publishing schedule. Thus if the current LAS stops running the schedule because of failure, another Link Master will notice and take over the bus.

Fieldbus Configuration Utility of the Preferred Embodiment

The fieldbus configuration utility of the present invention allows the process engineer an easy way of configuring a fieldbus network. The fieldbus configuration utility also allows the process engineer a simplified way of keeping track of these configuration changes. The fieldbus configuration utility of the present invention advantageously provides an intuitive graphical environment for creating linkages, loops and a schedule. This provides a simplified system and method for configuring the fieldbus network.

Figure 9A:
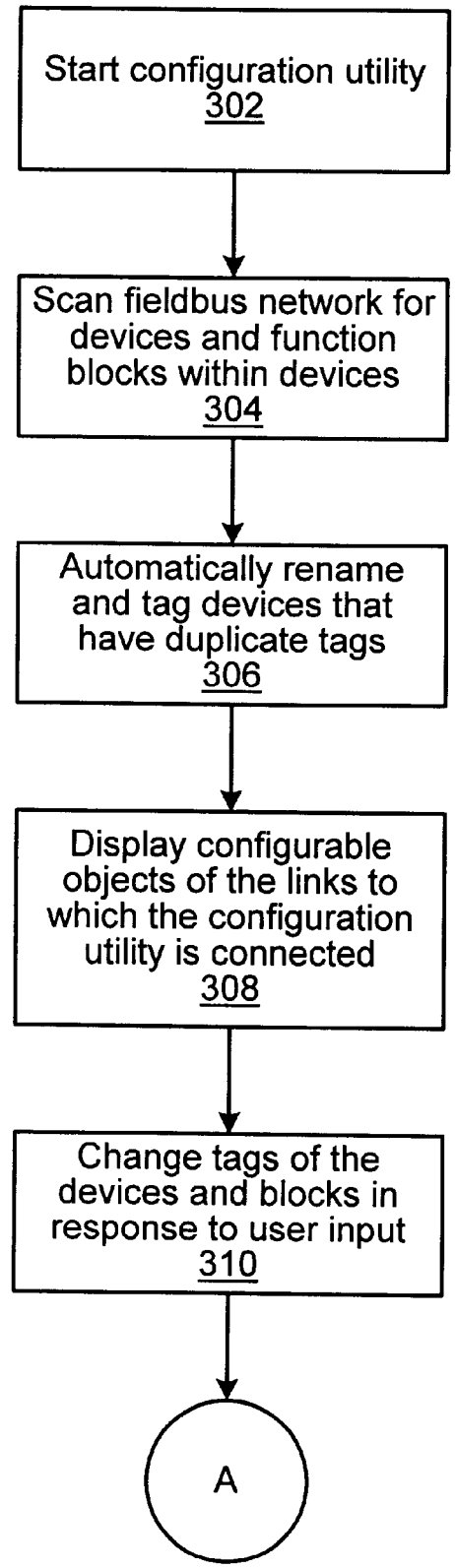
FIG. 9A and 9B are a flowchart diagram illustrating operation of the fieldbus configuration utility according to the present invention.
Figure 9B:
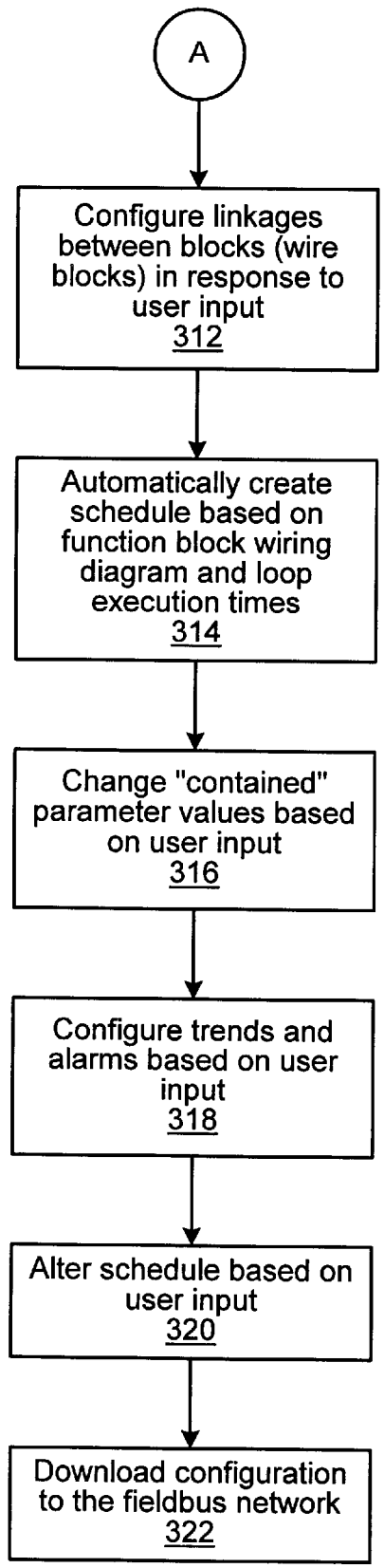

FIGS. 9A and 9B—Configuring a Fieldbus Network

Referring now to FIG. 9A, a flowchart diagram is shown illustrating steps performed in configuring a fieldbus network using the system and method of the present invention. It is noted that certain of the steps in FIGS. 9A and 9B are optional, and certain of the steps can occur in different various orders and/or concurrently, as desired.

As shown, in step 302 the configuration utility is started, generally in response to user input. In step 304 the fieldbus configuration utility scans the fieldbus network for devices and the blocks within the devices. Thus in step 304 the fieldbus configuration utility scans the fieldbus network for all of the devices connected to the fieldbus network and the function blocks within the devices. The configuration utility preferably automatically reads all devices and blocks from the network. The configuration utility also preferably automatically assigns addresses to devices that appear at the (boot-up) default addresses.

In step 306 the configuration utility optionally automatically renames and tags devices and blocks that have duplicate tags. In step 308 the fieldbus configuration utility displays the configurable objects of the link(s) to which the configuration utility is connected, i.e., displays the devices and their respective function blocks found in the scanning performed in step 304. After the devices and their respective function blocks are displayed in step 308, the user can further optionally change tags of the devices and blocks in step 310.

Referring now to FIG. 9B, in step 312 the user creates a fieldbus configuration, also referred to as a fieldbus function block application. As discussed further below, this involves placing or dropping fieldbus function blocks into a window on the screen, and then configuring linkages between the blocks, i.e., wiring the blocks. Stated another way, in step 312 the fieldbus configuration utility displays function blocks, and linkages or wires between blocks, in response to user input. Thus in step 312 the user creates a fieldbus configuration using the fieldbus configuration utility system and method of the present invention. The user creates a fieldbus configuration by wiring or linking function blocks preferably using a data flow paradigm and/or control flow paradigm. The user preferably wires or links the function blocks in a manner similar to creation of a virtual instrument using the LabVIEW programming environment from National Instruments Corporation.

According to the preferred embodiment of the invention, the configuration utility includes "Templates" that are typical pre-wired process control loops. The user can use these pre-wired templates in step 312 to greatly simplify the creation of fieldbus configurations. The user simply drops these templates onto the display screen and assigns the proper block tag. The user can also modify templates placed on the screen, e.g., add or change function blocks and/or connections to the templates, or change parameters within blocks in the template, to create desired fieldbus configurations. Templates can be created and saved by the user also. The use of templates in creating fieldbus configurations is discussed further below.

In step 314 the fieldbus configuration utility creates a schedule in response to the fieldbus configuration created by the user in step 312. The configuration utility preferably automatically generates a schedule based on the function block wiring diagram and loop execution times. The fieldbus configuration utility preferably creates a graphical schedule which enables the user to view the schedule of data communications on the fieldbus network corresponding to the configuration created by the user in step 312.

In the preferred embodiment of the invention, the fieldbus configuration utility automatically creates and displays the schedule as the fieldbus configuration is being created, i.e., as the fieldbus configuration wiring diagram is assembled by the user. Thus the schedule is updated in real time as the user assembles the wiring diagram.

In step 316 the user can optionally change "contained" parameter values, such as alarm limits, setpoints, etc. to suit the user's configuration. Thus in step 316 the fieldbus configuration utility changes contained parameter values in response to user input. In step 318 the user can optionally configure trends and alarms. Stated another way, in step 318 the fieldbus configuration utility changes trend and alarm values for the fieldbus configuration in response to user input.

In step 320 the user optionally alters the schedule created in step 312, i.e., the fieldbus configuration utility alters the schedule in response to user input.

After the user has completed a desired fieldbus configuration, in step 322 the fieldbus configuration utility downloads the configuration to the fieldbus network. When instructed to by the user, the configuration utility preferably only downloads changes to a configuration. The method illustrated in FIG. 9 is described in greater detail in the following sections.

Figure 10:
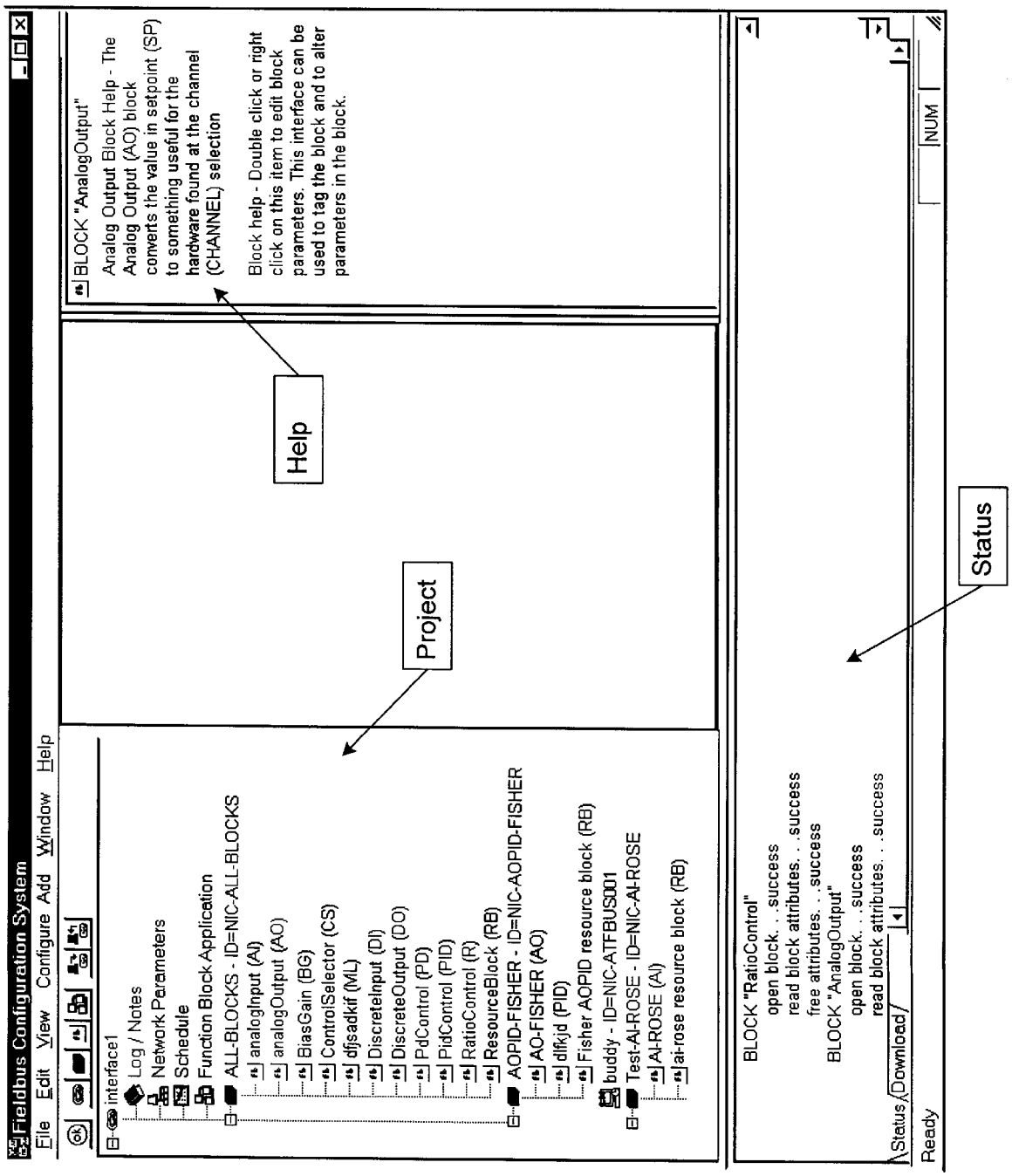
FIG. 10 is a screen shot illustrating windows of the fieldbus configuration system which appear at startup, including the help window, status window, and project view window.

FIG. 10—Fieldbus Configuration Utility Graphical User Interface

Referring now to FIG. 10, when the configuration utility starts up in step 302, the configuration utility presents a graphical user interface (GUI) with three windows, these windows being a help window, a status window and a "project view" window. The Help Window displays help information for the object that the user's cursor is currently over. This help comes from the configuration utility and from the Device Description Files (DD Files). This window can be hidden from the "Windows" menu.

The Status window contains tabs for "Status", "Download" and "Errors". The Status tab displays the current status of the configuration utility. Whenever data is read, written, scanned or downloaded to the bus, this window updates with the steps that the configuration utility is taking.

The "Download" tab is updated only when a configuration is downloaded to the bus. The Download tab shows all the status information for the last configuration download of the bus, and the fieldbus configuration utility retains this information until the next download. The Download tab automatically appears on top when a configuration begins to be downloaded. The "Errors" tab is automatically updated reflecting any errors that the current project has.

Figure 11:
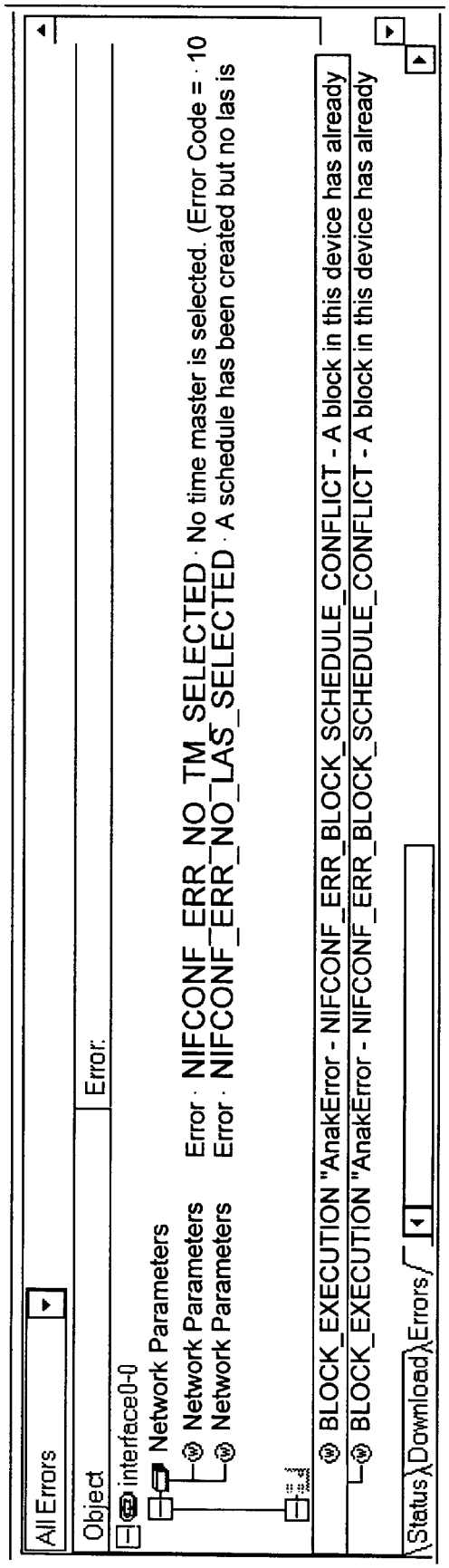
FIG. 11 illustrates the edit tab in the status window of FIG. 10.

As shown, in FIG. 11, the Errors tab displays all recent I/O errors, project configuration errors, and warnings. To correct an error, the user can select or double-click on the error to open the window containing the error. Certain error messages provide hints about how to correct the error. The Errors tab includes a drop list box attached to the upper left corner of the window which is used to make a selection in what kind of errors the user desires to see. The "All Errors" selection shows all I/O and project errors, and the "Project Errors" selection shows only project errors. When the user downloads the configuration, the fieldbus configuration utility checks for errors in the project. If a project error is detected, the fieldbus configuration utility warns the user and allows the user to cancel the download.

The Project View displays the configurable objects of the link(s) that the configuration utility is connected to. The user selects, or double clicks on, these objects to open the appropriate editor for their configurations.

It is noted that these three windows are "Dockable" windows. The windows attach to the sides of the configuration utility, and the user can grab the boarder of one of these windows and can drag and reattach the window anywhere on the screen. This allows the developer to alter the graphical user interface environment as desired.

One purpose of the fieldbus configuration utility of the present invention is to allow the process engineer an easy way of configuring a fieldbus network, and keeping track of configuration changes. The configuration utility accomplishes this by providing an intuitive graphical environment for creating linkages, loops and a schedule, as discussed further below.

Figure 12:
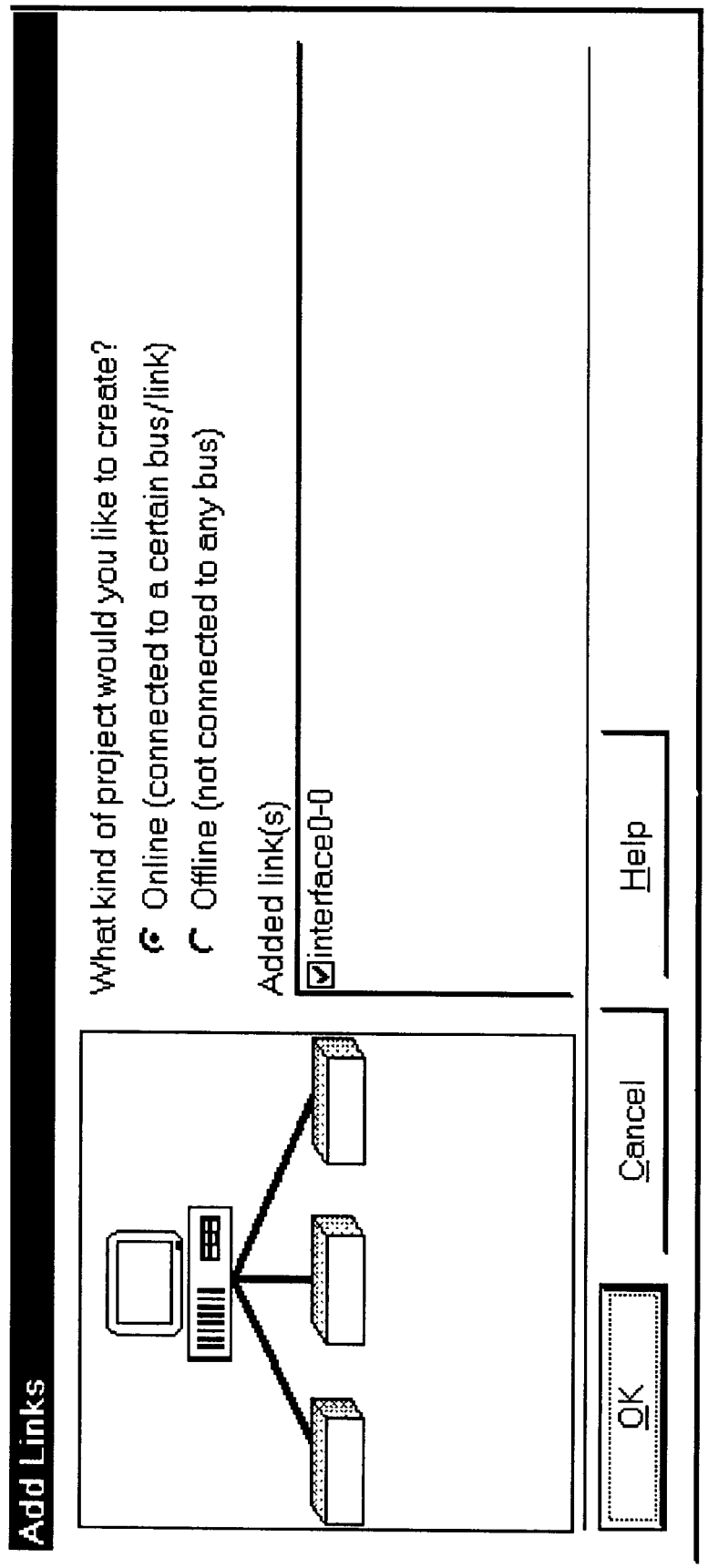
FIG. 12 is a screen shot illustrating the fieldbus configuration project wizard which enables a user to connect to a particular interface.

FIG. 12: Scanning the Network

FIG. 12 illustrates the process of scanning the network performed in step 304. When the user initiates the configuration utility in step 302, the configuration utility automatically displays the Add Links dialog box shown in FIG. 12. The user can then perform the following steps to connect to a specific fieldbus interface. First, the user selects the interface to which the user desires to connect, i.e., the user can choose from one of the available link(s) and interfaces for the project from the Added Links checklist. The user can then click on the OK button to create a new project that is connected to the selected links. The user can also select the type of project desired to be created. The types of projects include "online", connected to a certain bus/link, or offline. The user will typically choose "online", indicating a desire to connect to a particular link.

During the scan of the fieldbus network in step 302, in step 306 the fieldbus configuration utility checks the addresses and object tags. If a device is missing either an address or a tag, or if a block has no tag, the fieldbus configuration utility assigns one. If the fieldbus configuration utility detects duplicate tags, it renames the device or block, appending the original device or block tag with a numeric identifier.

During the initial scan of the bus, various other state icons may appear, including an Hourglass "updating" icons, which shows that the configuration utility is currently reading or writing to this object; an "Error" icon which shows that the configuration utility detected or encountered an error with this object; and an "Invalid" icon which indicates that an object is not responding.

Figure 13:
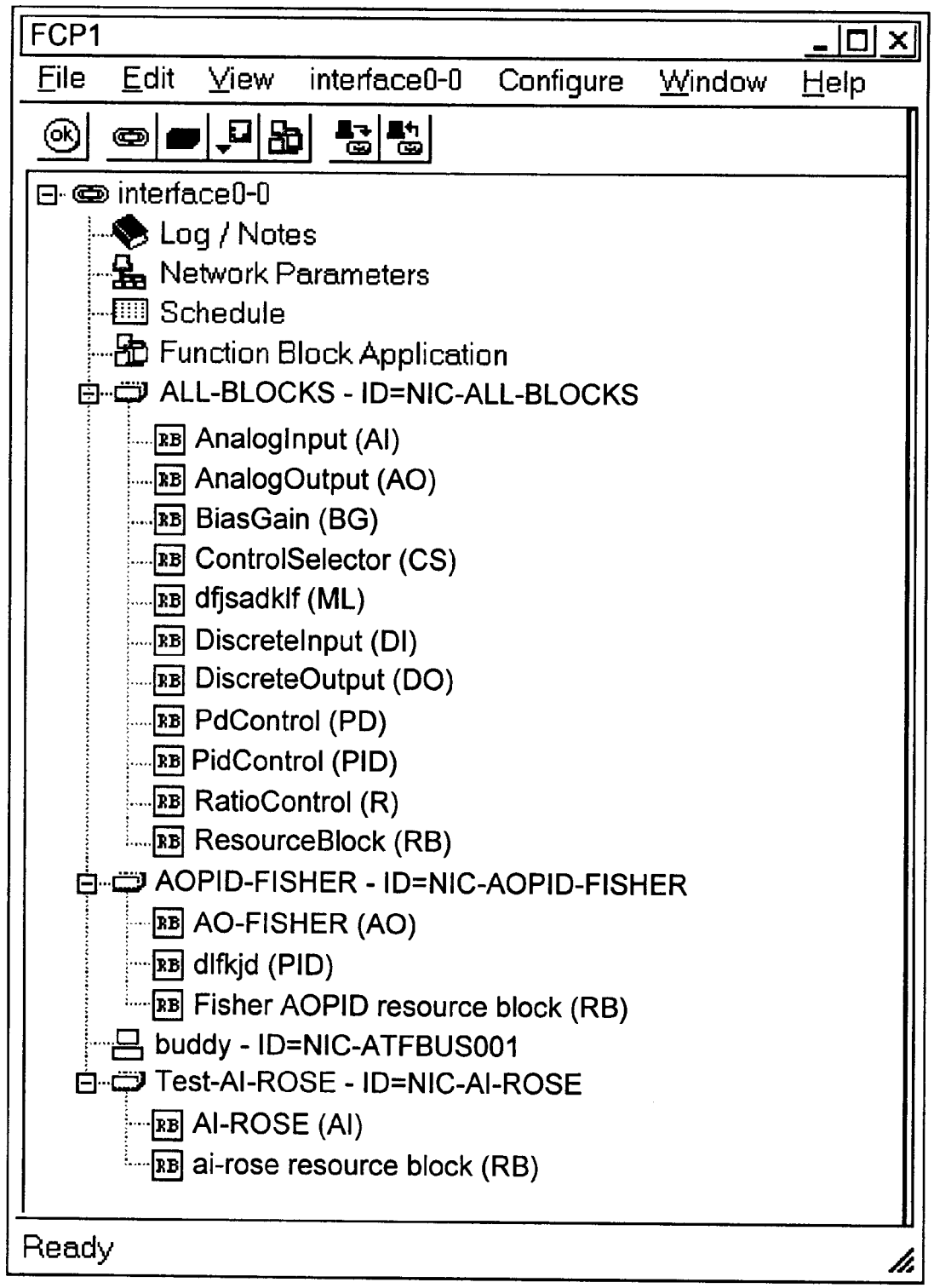
FIG. 13 illustrates the project view window of the screen shot of FIG. 10.

FIG. 13—Fieldbus Configuration Project View

Referring now to FIG. 13, after the network has been scanned in step 304, the fieldbus configuration utility creates a new project for the user to develop a configuration. In other words, after the scanning has completed in step 304, the configuration utility in step 308 displays a "Project View" window which displays all of the fieldbus objects on the link(s) to which the user is connected.

The Project View window includes various Project icons, including a Link (Segment) icon which represents the fieldbus segment to which the user is connected; a Log/Notes icon which represents a summary of all the changes that have been made to the project segment; a Network Parameters icon which represents low level configuration parameters for the segment that the user may wish to change; and a schedule icon which represents a schedule of function block executions and data transmissions for the entire link. The Project View window also includes a Function Block Application icon which represents the editor used to "wire" function blocks together into a process loop. It is noted that multiple instances of a function block application can be added to the project if desired.

The Project View window also includes a Device icon which represents a fieldbus device. The Device icon is followed by the device's tag and its unique serial identifier. Each Device icon will typically include one or more Function block icons which represent a fieldbus function block. The block icon is followed by the block's tag and its type in parentheses. The Project View window further includes a Host Device icon which represents the device (PC) that is hosting the configuration utility.

As shown, the "project" is organized to present a hierarchical view of the link, i.e., the link comprises Network Parameters, a Schedule, Function Block Applications, and devices; and a device contains function blocks.

Project View Toolbar

As shown in FIG. 13, the toolbar at the top of the project window is useful for performing some basic functions on the project. From left to right, the Project View toolbar includes the following buttons: OK, Link, Device, Function Block, Function Block Application, Download, and Upload. The OK button is used to validate the project and check for errors. The Link button adds another link to the project. The Device button adds a device to the link, and is used in offline configuration only. The Function Block button creates or instantiates a new block inside of a device. The Function Block Application button adds another function block application to the link. The Download icon downloads the configuration, and the Upload icon rereads the projects configuration.

Changing Tags of Devices and Blocks

As discussed above with respect to step 310, tags of Devices, Blocks, and Function Block Applications can be changed simply by the user clicking on the object in the "Project View" to highlight the object and then clicking again to show the edit box. The configuration utility does not write these changes to the objects until the project is downloaded to configure the link. However when a tag is changed an asterisk, "*", is placed by the changed tag.

Creating a Fieldbus Configuration (Creating a Function Block Application)

As mentioned above with respect FIG. 4, a user creates a fieldbus configuration or function block application by wiring or linking function blocks in step 312. This operates to define the desired process, i.e., create a fieldbus configuration. In the present disclosure, the term "fieldbus configuration" and "fieldbus function block application" are used interchangeably to refer to the configuration or application wiring diagram created with the Function Block Application editor. The fieldbus configuration utility includes two methods for creating a fieldbus configuration, these being either manually or by use of templates.

The user first selects or double clicks on the Function Block Application Editor icon to launch the Function Block Application editor, as shown in FIG. 14. The Function Block Application Editor comprises a graphical interface that can be used to create the fieldbus application or fieldbus configuration. The top of the function block application editor includes a toolbar that displays the various tools used for editing the function block application. The toolbar is shown separately in FIG. 15. These tools are described below as they appear from left to right.

Function Block Application—Shows the name of the fieldbus configuration or function block application Loop Time—default execution rate of the process loop OK (Errors)—Performs error checking, regenerates the schedule of the application, and removes bad wires Pointer—the arrow pointer used to drag and highlight objects on the screen.

Wire tool—the wiring tool used to make connections between "valid" inputs and outputs. The configuration utility checks the data type of the input and output connected by a wire to be sure that a valid connection is made.

Loop—the loop tool is used to define an execution loop. In the preferred embodiment, the default time on the toolbar is the execution rate for all blocks on the Function Block Application Editor. However at times it is desired to define multiple loops that run at different execution rates. The loop structure allows the user to assign an "execution rate" to a selected group of function blocks. In other words, the loop tool allows the user to isolate selected function blocks from the default execution time, wherein these selected function blocks execute at a different execution time than the default time.

Device/Blocks—Another way of accessing the block menu.

Text Editing Tool—Text tool used to write additional information about the application to the screen.

Magnifying Lens—Zoom tool used to zoom in and out.

Execution Order—Ordering tool used to reorder the execution of the blocks in a loop. The order is decided automatically by the configuration utility. However the user may wish to change this order. The operation of the Ordering tool is discussed in more detail in conjunction with scheduling.

Fill—the fill tool can be used to color objects on the screen.

Selected Color—this will display a color menu for the color to be used with the fill tool.

FIG. 14—Function Block Application Editor

As mentioned above, a user double clicks on the "Function Block Application Editor" icon to open up the editor window. When the user selects the "Function Block Application Editor", the editing screen appears as shown in FIG. 14. The editor window is initially blank. The editing screen shown in FIG. 14 includes function blocks that have been added to the function block application. These are the blocks intended to be used for process configuration.

Figure 16:
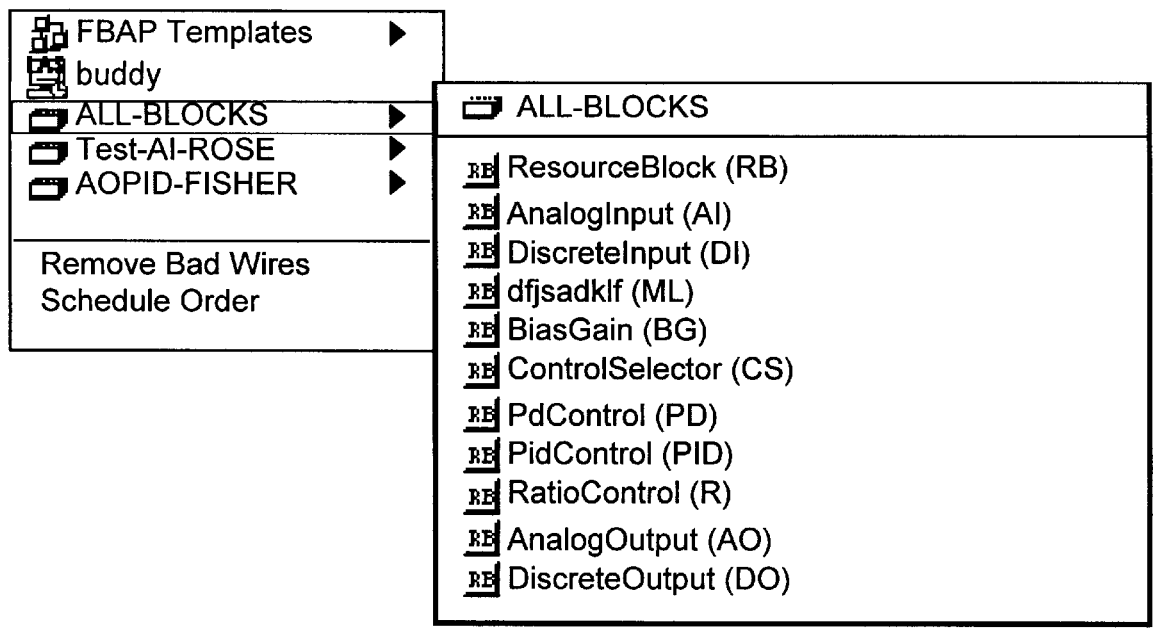
FIG. 16 is a screen shot illustrating a pull-down menu used to select a block that the user desires to place on the screen.

Function blocks can be added to the window by 2 methods, these being 1) the user dragging the block from the "Project View" or 2) the user right clicking the mouse to view the drop down menu and then selecting the block desired to be placed on the screen, as shown in FIG. 16. It is noted that there is only "one" instance of a function block on a fieldbus network, and thus a function block is "grayed out" after it is used in a function block application.

Figure 17A:
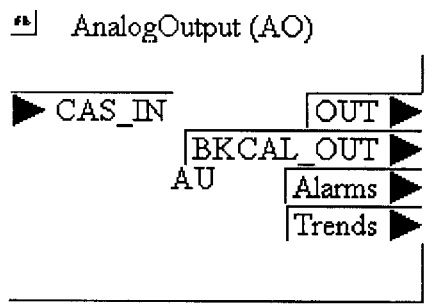
FIGS. 17a–c are screen shots illustrating various aspects of a function block.
Figure 17B:
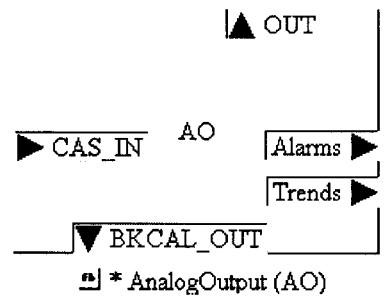
Figure 17C:
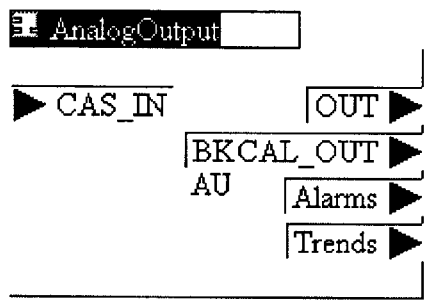

FIGS. 17a–17c: Function Block

Function blocks comprise an algorithm and several parameters for controlling a process. As shown in the function block of FIG. 17a, the input and output parameters of this function block are displayed on the block. The pointer on the outside of the parameters shows the direction of data flow of that parameter. By default, the block tag is at the top, all inputs are on the left, and all outputs are on the right. These can be moved or changed using the pointer.

Each function block icon includes one or more connections comprising inputs or outputs, wherein the connections provide/receive information selected from the group comprising: data, alarms and trends. The method of the present invention displays each of the connections with a respective color depending on whether the connection is designed to receive data information, alarm information, or trend information.

As shown in FIG. 17b, the block is resizable and the tag and parameters are moveable relative to the block. As shown in FIG. 17c, the user can double click on the tag of the block to display an edit control. This enables the user to change the tag directly from the FBAP editor window.

Step 312—Creating Linkages between Blocks

As discussed above, in step 312 the user creates a function block diagram to create the fieldbus configuration. In creating a function block diagram, the user can either create the function block diagram manually or use pre-configured templates, or use a combination of the two.

Figure 18A:
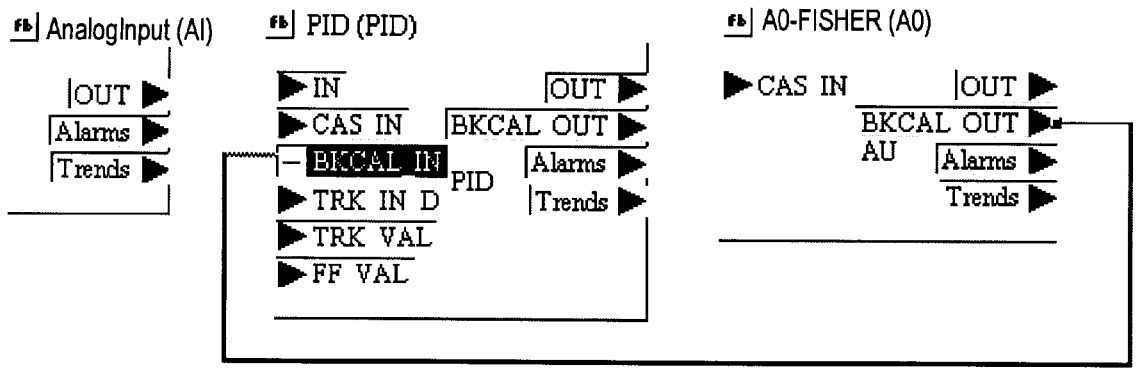
FIGS. 18a–c are screen shots illustrating wiring of function blocks to create a fieldbus configuration or function block application.
Figure 18B:
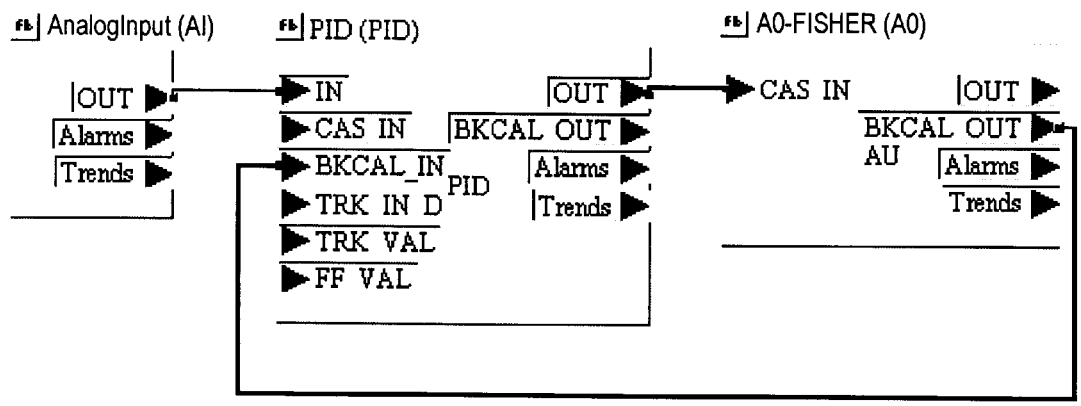

FIGS. 18a and 18b—Wiring Blocks Manually

If the user desires to create the function block diagram manually, the user first drags blocks over to the diagram. Alternatively, the user can also right click on the screen, and the system displays a selection of blocks. The user can select a block from the displayed list to appear on the screen. Once two or more desired blocks appear on the screen in the function block application editor window, the user can then begin to wire up the blocks.

Figure 18C:
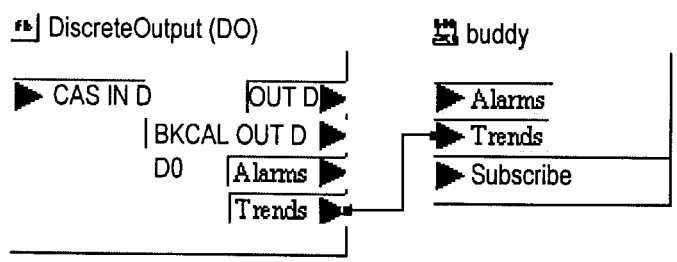

FIGS. 18a–18c illustrate the "wiring up" of a fieldbus configuration, also referred to as a function block application or function block wiring diagram. The function blocks in FIGS. 18a–18c are wired up in the function block application (FBAP) editor window shown in FIG. 14, and it is noted that the editor window is not shown in FIGS. 18a–18c for convenience.

As shown in FIGS. 18a and 18b, when the user desires to wire blocks manually in step 312, the user performs the following steps. First the user selects the wiring tool, then clicks on an input or output of the block to be linked, routes the wire around other blocks, and then clicks on the appropriate output or input to be linked. FIG. 18a illustrates the BKCAL OUT output of the AO-FISHER function block being connected to the BKCAL IN input of the PID function block. FIG. 18b illustrates the OUT output of the Analog-Input function block connected to the IN input of the PID function block and the OUT output of the PID function block connected to the CAS IN input of the AO-FISHER function block. The present invention enables a user to wire function blocks together in a manner similar to wiring data flow diagrams in the LabVIEW graphical programming environment. For more information on the LabVIEW graphical programming environment, please see U.S. Pat. Nos. 4,901,221; 4,914,568; 5,291,587; 5,301,336; and 5,301,301; which are hereby incorporated by reference.

During a wiring operation the configuration utility performs type checking and only highlights valid inputs and output. Thus, once the user has clicked on an output of the block to be linked and has begun routing the wire around other blocks, the fieldbus configuration utility of the preferred embodiment performs type checking and only highlights valid inputs and outputs. Thus the user is visually notified of which connections are valid connections for a wire. Also, the user is only allowed to make valid connections, i.e., is only allowed to connect to a highlighted connection. This simplifies configuration development and reduces wiring errors.

As shown in FIG. 18c, the user can also drop devices from the Project View window into the Function Block Application Editor window, e.g., for configuring trends and alarms, as discussed further below.

Further, the present invention allows one output of a function block to connect to two or more inputs of two or more function blocks.

Using Templates

The user can also use fieldbus configuration templates, also referred to as function block connection templates, to configure linkages between blocks in step 312. Templates comprise pre-wired fieldbus configurations or pre-wired process control loops that the user can place or drop on the screen. The configuration utility preferably includes several types of pre-defined fieldbus configurations and/or process control loops. In addition, the user can save his/her own fieldbus configuration or file for later re-use. A user can save a fieldbus configuration as a template by choosing the Save Template option from the file menu. All templates are preferably saved to the Template directory under the configuration utilities main directory. If a template is located in this directory, the template will automatically appear in the template menu.

Figure 19:
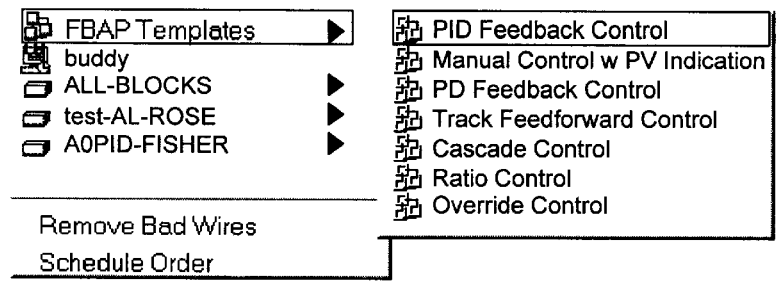
FIG. 19 is a screen shot illustrating a menu used to select function block application templates according to one embodiment of the present invention.

The user accesses templates by right clicking on the mouse or by using "Open Template" from the file menu, as shown in FIG. 19. When user input is received to access a template, all templates currently stored in the template directory are displayed. Thus the computer displays one or more fieldbus configuration template selections, wherein each of the fieldbus configuration template selections represents a pre-wired fieldbus configuration. The computer then receives a user selection of one of the fieldbus configuration template selections. In response to this user selection, the computer displays the selected fieldbus configuration template. The fieldbus configuration template comprises a plurality of linked function block icons which form at least a portion of a fieldbus configuration.

Figures 20A, 20B:
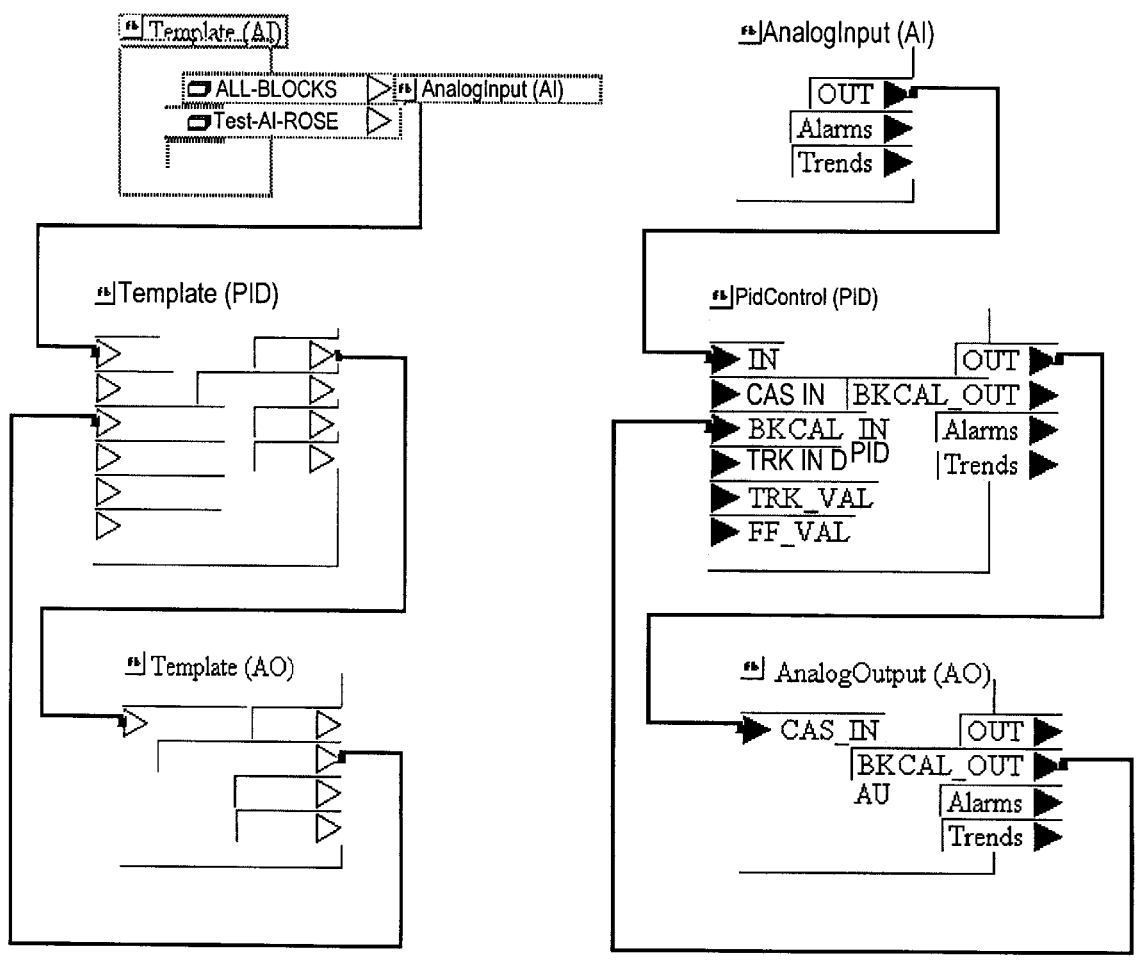

The fieldbus configuration template is shown in FIG. 20a and the completed fieldbus configuration based off of the template is shown in FIG. 20b. It is noted that both the template and completed fieldbus configuration appear in the FPAB editor window shown in FIG. 14, and they are shown external to the editor window in FIGS. 20a and 20b.

A user uses a fieldbus template to create a fieldbus configuration as follows. As noted above, a user selects a desired template, which causes the computer to display on the screen a pre-wired fieldbus configuration, i.e., the template. The pre-wired fieldbus configuration generally includes two or more function block icons connected by one or more wires. The user can select a template first or after one or more function blocks are already displayed on the screen.

The user can then modify the pre-wired fieldbus configuration to create the fieldbus configuration for the fieldbus network. As shown in FIG. 20a, the template blocks are preferably initially "grayed out", signifying that they are not assigned to any function block in a device. Also, each of the function blocks are called "Template", since they are not yet associated with a function block in the current project.

As shown in FIG. 20a, the user double clicks on each block in the template to view all the blocks that match this block type in the project. The user can then simply select the desired block for wiring. As shown in FIG. 20a, the user selects or double clicks the Template (AI) to view all the blocks that match this block type in the project. In this example, the only block in the project that matches this block type is the AnalogInput (AI) block, as shown. The user selects blocks for each of the templates in FIG. 20a, thereby producing the function block diagram of FIG. 20b.

Modification of the template generally includes one or more of displaying on the screen one or more additional function block icons in response to user input and/or displaying on the screen one or more additional wires connecting the function block icons. Thus the user can modify the template or add to the template to create a desired fieldbus configuration. After modification, the user can save the newly created fieldbus configuration as a new template.

Figure 20C:
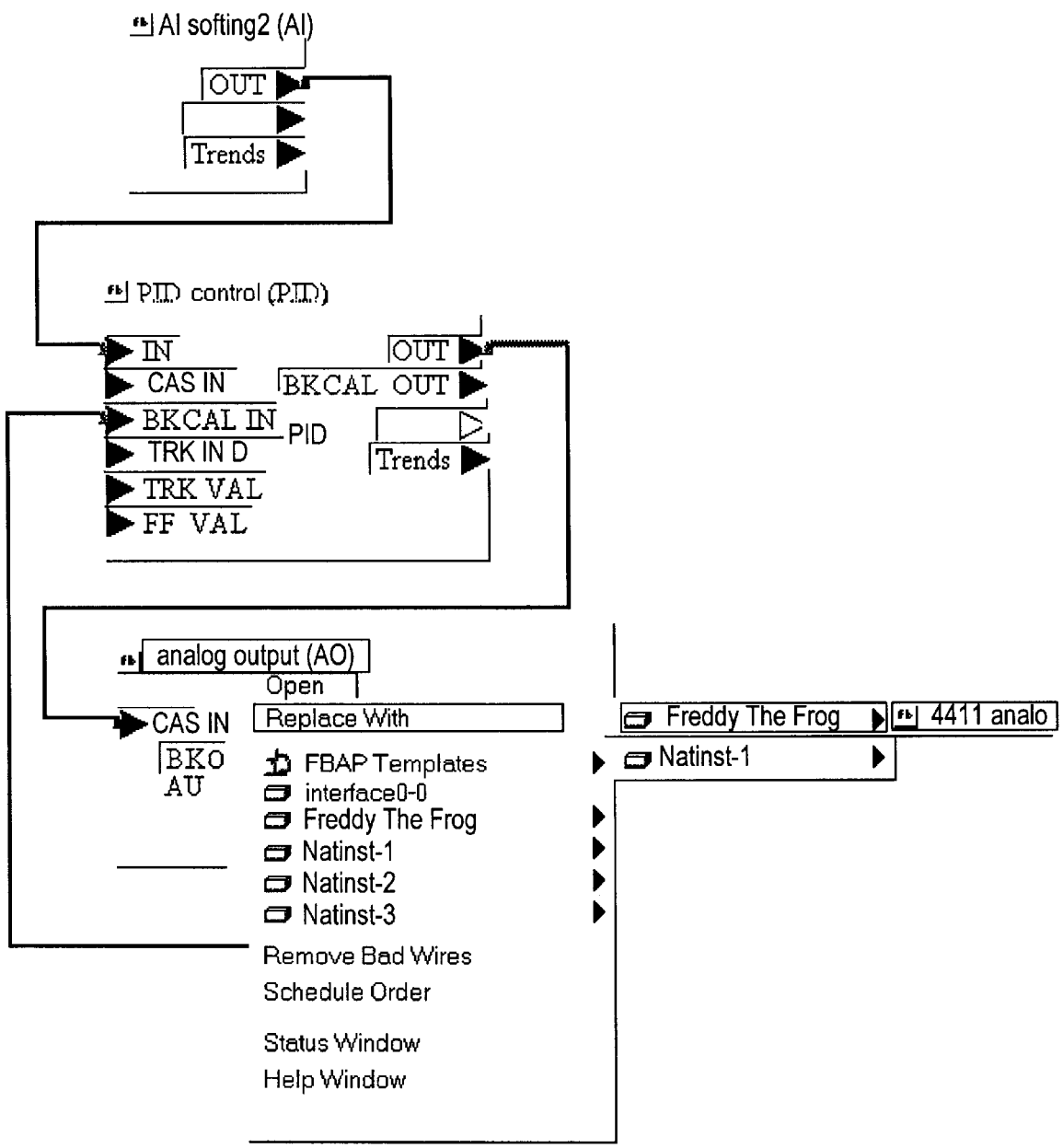
FIG. 20c is a screen shot illustrating replacement of a function block with another block.

As shown in FIG. 20c, once a fieldbus configuration has been created, the present invention provides an improved method for replacing blocks with other blocks without requiring the user to have to re-draw the configuration. As shown, the user can simply select or click on the block and select from a list of blocks of similar type to replace a function block with another function block.

Figure 21:
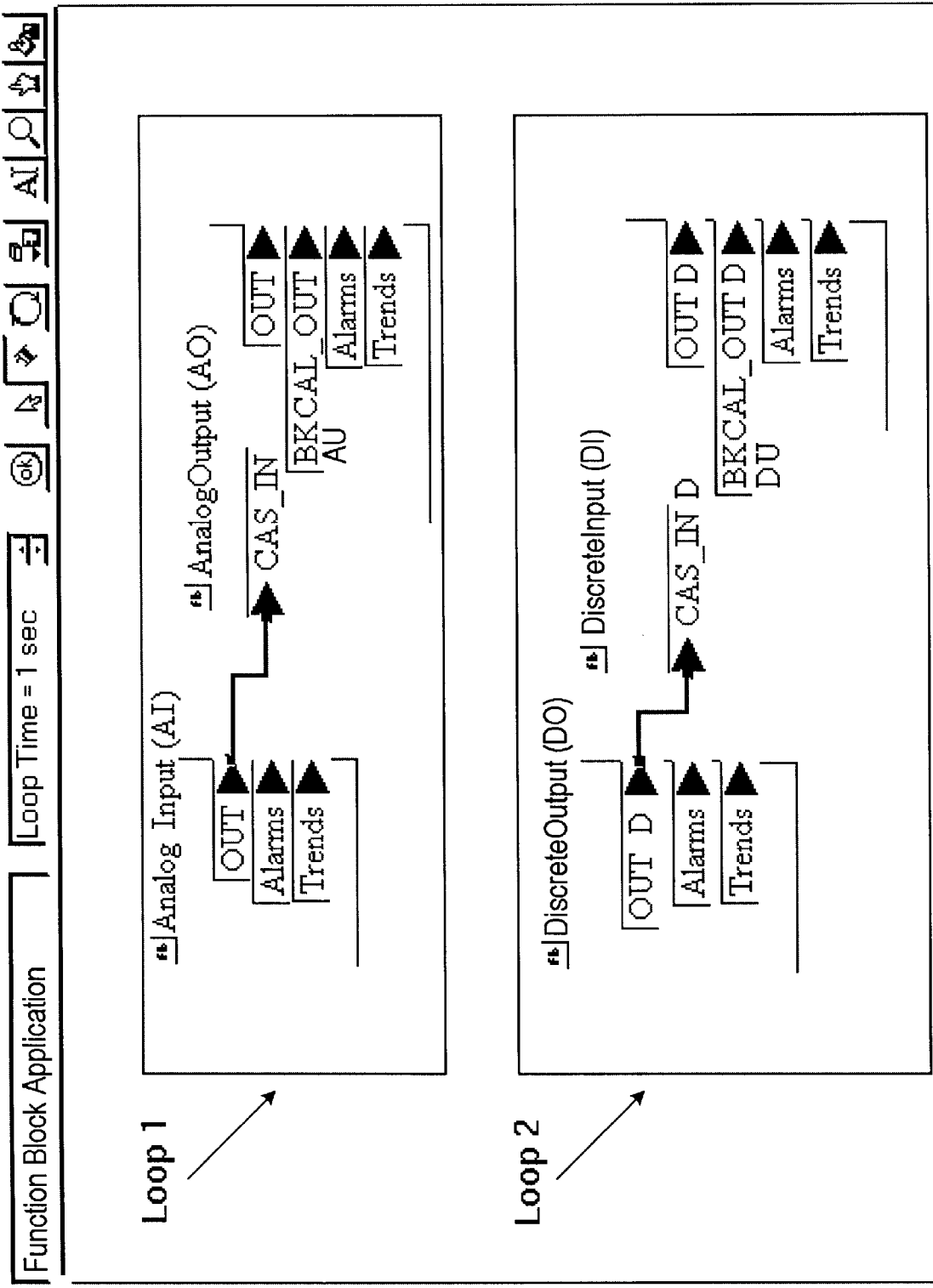
FIG. 21 is a screen shot illustrating a fieldbus configuration including a plurality of loops.

FIG. 21—Multiple Loops

A loop basically comprises a group of function blocks that are linked (wired) together and execute at a specified rate. As shown in FIG. 21, many loops can be defined on one function block application editor window. However, often it is desirable to add other function block application editor windows to the project to break up the loops. The user adds another function block application window to the project by clicking the function block application toolbar button in the project view.

Defining Multiple Loops Running at Different Rates

Figure 22:
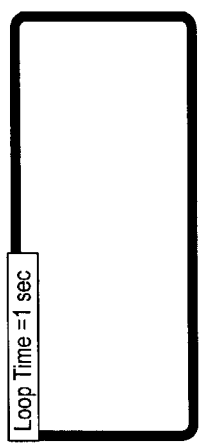
FIG. 22 is a screen shot illustrating a loop structure used to encapsulate a group of function blocks and assign an execution rate.

Referring now to FIG. 22, the present invention includes a loop structure, shown in FIG. 22, which is useable to encapsulate a group of one or more function blocks and assign a different execution rate to the group of function blocks. In other words, the user creates or drops a loop structure which encapsulates a group of one or more function blocks, and the loop structure is used to assign a different execution rate to these selected one or more function blocks. The system of the present invention includes a loop tool that is used to create the loop structure. The user simply drags the loop tool around a group of blocks to encapsulate a group of one or more function blocks within the loop structure. The user includes loop structures in a function block application while configuring linkages in step 312.

Figure 23:
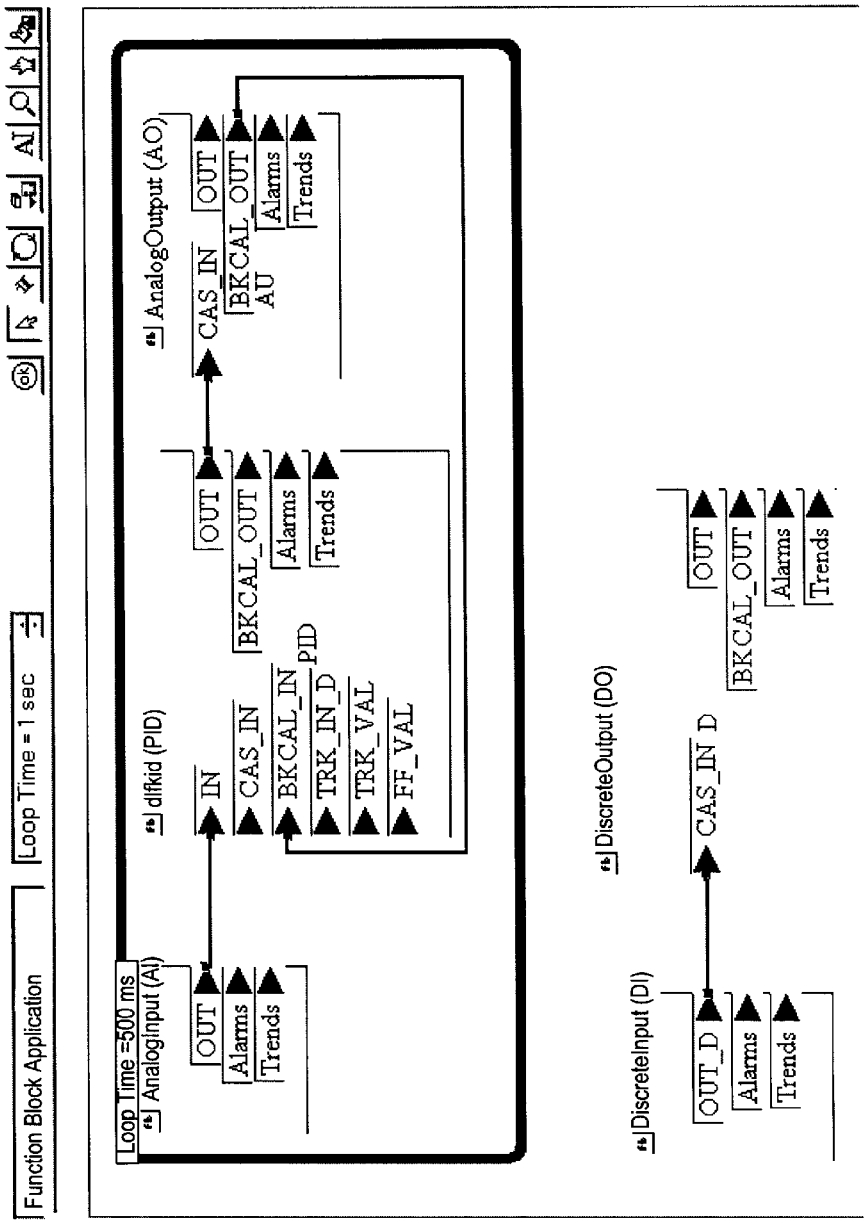
FIG. 23 is a screen shot illustrating a fieldbus configuration including a loop structure.

In the preferred embodiment, the loop execution time on the toolbar is the default execution time for all function blocks on the function block application editor window that are not encapsulated by a loop structure. For example, as shown in FIG. 23, the DI and DO blocks execute at a rate of 1 second, as indicated by the function block application editor window, and the AI-PID-AO loop executes once every 500 ms, as indicated by the loop structure encapsulating the AI, PID and AO function blocks. FIG. 6 also illustrates multiple loops running at different rates on a fieldbus segment.

Thus, in one embodiment, the present invention comprises a computer-implemented method for creating a fieldbus configuration on a computer system which includes loop structures as described above. The method includes displaying one or more function block icons in the function block application editor window in response to user input. Each of the one or more function block icons represents a function block. The method then links the one or more function block icons in response to user input to create a fieldbus configuration. The function block application editor window specifies a first rate for the fieldbus configuration. Thus, when the fieldbus configuration is executed, the one or more function block icons comprised in the fieldbus configuration, i.e., comprised in the function block application editor window, execute at the first rate specified by the window.

As described above, the user can place a loop structure in the function block application editor window, wherein a first one or more of the function block icons are comprised within said loop structure. The loop structure can be used to specify a second rate for the first one or more of the function block icons that are comprised in the loop structure. As shown in FIG. 23, a second one or more of he function block icons may not be comprised in the loop structure. When this fieldbus configuration is executed, the first one or more of the function block icons comprised in the loop structure execute at the second rate specified by the loop structure, and the second one or more of the function block icons comprised in the function block application editor window and not comprised in the loop structure execute at the first rate specified by the window.

A fieldbus configuration may also be created with multiple loop structures, each encapsulating one or more function blocks, and each specifying a different rate than the function block application editor window. In this example, the method displays a first loop structure and a second loop structure on the function block application editor window. The method displays a first one or more function block icons in the first loop structure, and a second one or more function block icons in the second loop structure. The first loop structure specifies a second rate for the first one or more function block icons, and the second loop structure specifies a third rate for the second one or more function block icons. When this fieldbus configuration is executed, the first one or more function block icons comprised in the first loop structure execute at the second rate specified by the first loop structure, and the second one or more function block icons comprised in the second loop structure execute at the third rate specified by the second loop structure. A third one or more of the function block icons not comprised in either of the first or second loop structures execute at the first rate specified by the window. It is also noted, as shown in FIG. 7, that one or more of the function block icons in the first loop structure can be linked to one or more of the function block icons in the second loop structure.

Schedule

As discussed above, in step 314 the configuration utility automatically creates and displays the schedule, preferably as the user creates the fieldbus configuration. In other words, the schedule is preferably created and/or updated in real time as the user is assembling the fieldbus configuration. An example which illustrates creation of the schedule in real time as the user is assembling the fieldbus configuration is discussed with reference to FIGS. 44a–d.

The configuration utility preferably determines execution order and timing of the schedule based on network and device factors, and the loop execution rates the user enters on the FBAP editor window and/or in loop structures placed in the editor window. The configuration utility thus provides an optimized schedule in response to the function block application created by the user, i.e., the wiring diagram comprising the wired function block icons created by the user. As also noted above, the schedule can be altered based on user input in step 320. In the preferred embodiment, the schedule of the link can be viewed and edited by double clicking on the schedule in the project view.

Figure 24:
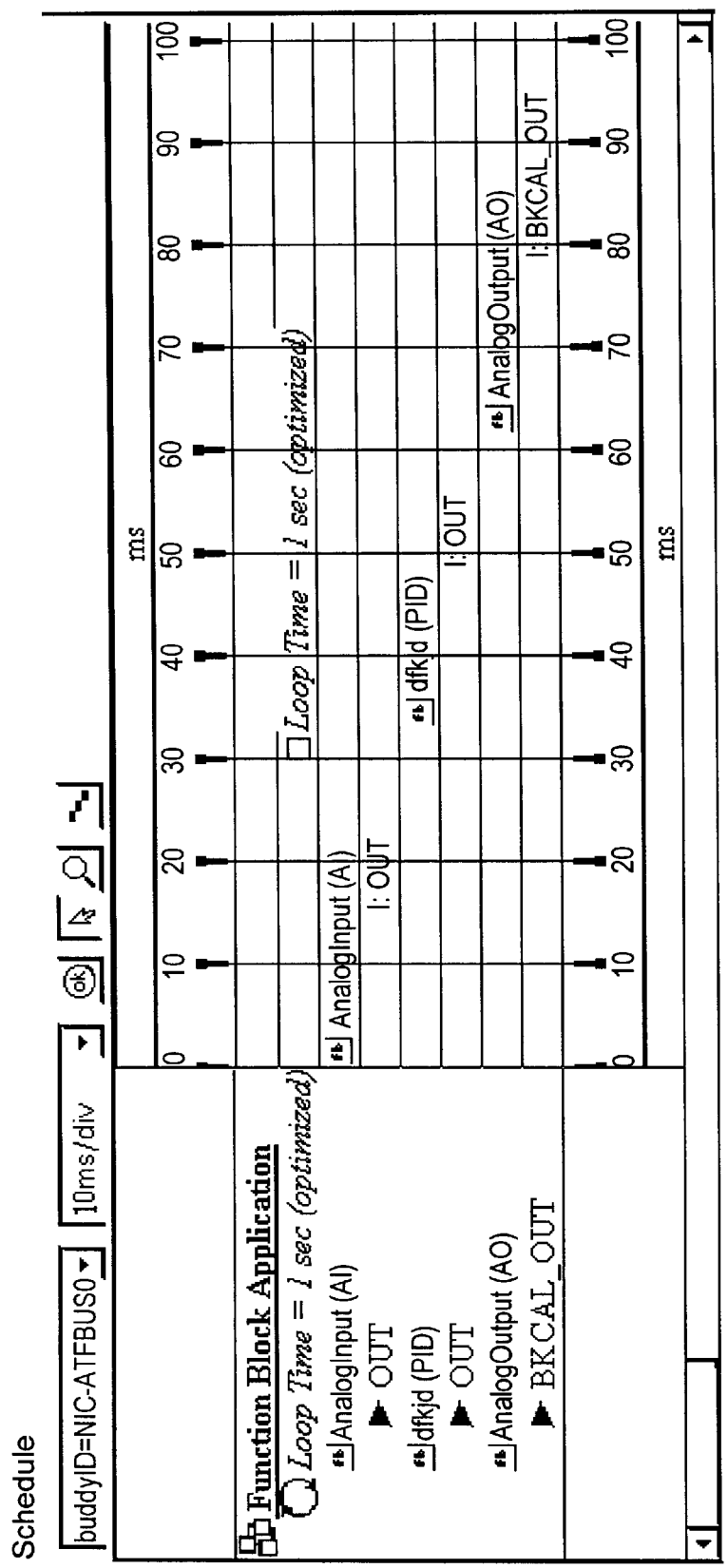
FIG. 24 is a screen shot illustrating a schedule automatically created by the configuration utility of the present invention.

The schedule window is shown in FIG. 24. As shown, the schedule window is arranged so that a key of the scheduled objects appears on the left. The right side of the schedule window includes a timing diagram that displays the execution times of the function blocks and when data is transmitted on the bus. The timing diagram includes blue bars and green bars. It is noted that other colors can be used, as desired. The blue bars correspond to or are used to represent the function block execution times, and the green bars correspond to or are used to represent the data transmission times, or more specifically the LAS notification time plus the transmission time Blue bars=function block execution times Green bars=LAS Notification Time+Transmission Time It is noted that an optimized schedule can show that the transmission time overlaps the end time for the function block because the transmission time "includes" the time that the LAS uses to tell the device to send the data.

It is not necessary for the user to alter the schedule if the function block execution times in the device are correct. If it is necessary for the user to alter the schedule, the user can tune the execution times by simply dragging the execution time bars on the screen. The automatic optimization of the schedule is disabled for the bars that the user changes or drags on the screen. If the user wishes to re-optimize, the user can click the optimization button on the toolbar. Examples of where the user may desire to alter the schedule include where the times in the device are incorrect, or one device has too many blocks to execute.

Figure 25:
FIG. 25 illustrates the toolbar at the top of the schedule of FIG. 24.

As shown in FIG. 24, the schedule window includes a toolbar, and this toolbar is shown separately in FIG. 25. The toolbar includes the following items from left to right:

Primary LAS device—this is the device that will be the primary LAS for the system Scale—the time/divisions on the timing diagram Errors—Validate the schedule Pointer—Used for dragging the time bars around on the timing diagram Magnifying lens—Used for zooming in and out. Also changes the scale.

Optimize Schedule—Reruns the optimization routine. This is used, for example, where the user changes the schedule by dragging the bars to different locations, and then desires to return to the optimized schedule.

Thus, to summarize the discussion of the schedule, according to one embodiment, the present invention includes a computer-implemented method for creating a fieldbus configuration on a computer system. The method comprises assembling a fieldbus configuration on the display screen of the computer. Assembling the fieldbus configuration comprises displaying one or more function block icons in response to user input and linking the one or more function block icons. The system and method automatically creates a schedule in response to the fieldbus configuration being assembled. The schedule indicates an order of execution and timing of the one or more function blocks. The system and method updates and displays the schedule on the screen in response to the user assembling the schedule. The schedule thus graphically displays the order of execution of the function blocks comprised in the fieldbus configuration and automatically checks for configuration errors.

In the preferred embodiment, the schedule is created and displayed during the assembly of the fieldbus configuration. In other words, the schedule is updated and displayed in real time as the fieldbus configuration is assembled on the screen. This provides an immediate indication to the user of the order and timing of execution of the fieldbus configuration as the fieldbus configuration is assembled. In the preferred embodiment, the schedule is updated and displayed in real time after each function block icon is placed on the screen, and after each linkage between function block icons is created on the screen.

The method preferably creates an optimized schedule in response to the created fieldbus configuration. The optimized schedule includes block optimum loop timing. The method then ensures that executions do not conflict, that data transmissions do not overlap, and that the schedule eliminates dead space between block executions, thereby making the "fastest" loop. The method also automatically orders blocks to execute from "upstream" to "downstream" as data will flow. The method further schedules blocks that are scheduled for different rates in the same device to execute the appropriate number of times to achieve both (or more) rates.

As noted above, the schedule graphically displays the order of execution of the plurality of function blocks comprised in the fieldbus configuration. The schedule comprises one or more schedule bars for visually or graphically indicating the order of execution of the plurality of function blocks.

If one or more loops or loop structures are comprised in the fieldbus configuration, the operation of creating the schedule includes using the associated loop times or rates to determine or create the schedule. An example which illustrates this is discussed with reference to FIGS. 45a–d.

The user can also change the order of execution indicated by the schedule after the schedule is created. Changing the order of execution indicated by the schedule comprises graphically manipulating the schedule in response to user input. More specifically, changing the order of execution of the schedule comprises graphically manipulating the one or more schedule bars in response to user input, including altering a location of one or more of the schedule bars. As noted below with respect to FIG. 27 and FIGS. 46a–d, the user can also change the order of execution of the function block icons by manipulating the schedule bars in the schedule window.

The user can also generate a re-optimized schedule after he/she changes the order of execution indicated by the schedule.

Multiple Loop Representation

Figure 26:
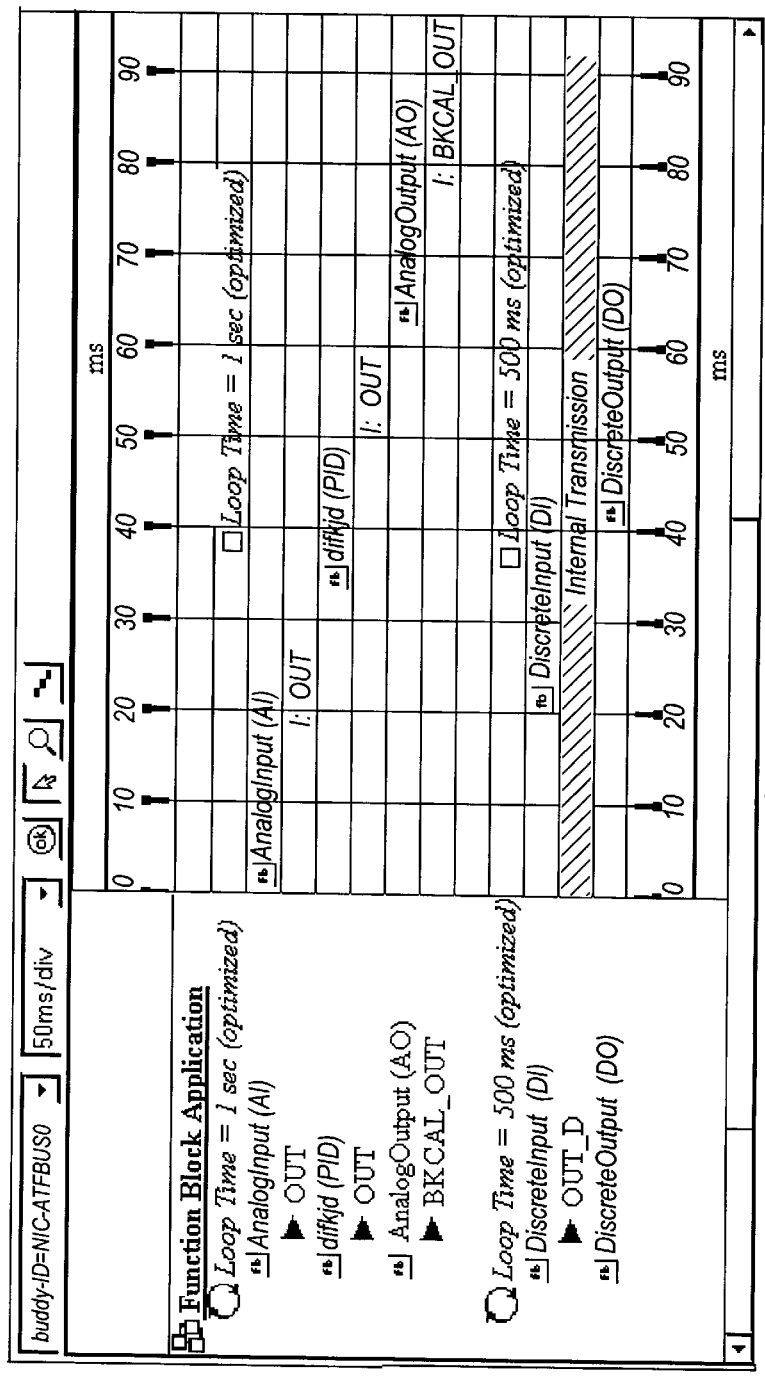
FIG. 26 is a screen shot illustrating a schedule with multiple loops.

FIG. 26 illustrates a schedule which includes multiple loops, i.e., FIG. 26 illustrates a schedule which shows how multiple loops are represented. As shown, the loops are basically divided by a white divider. The loop line above the blocks and parameter times displays a check box that can be used to turn on and off optimization for that particular loop.

Setting Execution Order (Another way of altering the schedule)

Figure 27:
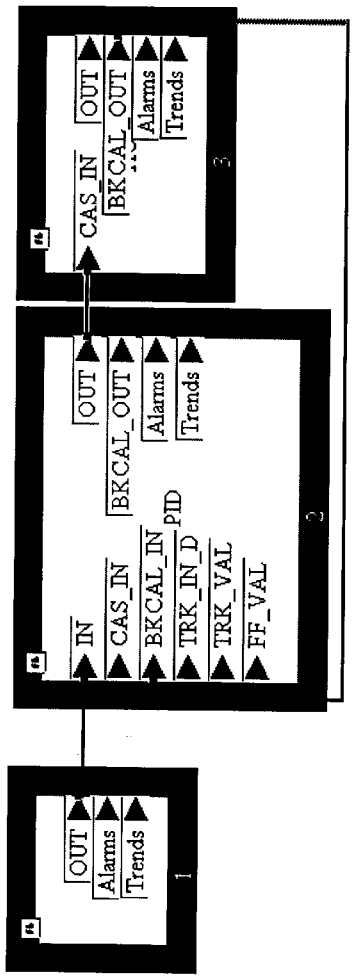
FIG. 27 is a screen shot of a fieldbus configuration which illustrates a method of setting the execution order of function blocks to alter the schedule.

The configuration utility automatically decides the order in which the blocks execute. However, as shown in FIG. 27, the user can change the execution order from the FBAP editor window by using the execution order tool. In the function block application editor, the user simply selects the ordering tool and clicks the blocks in the order that the user desires them to execute. The blocks will highlight, and their current execution order will be displayed at the bottom of the block. A more detailed example of this is provided with reference to FIGS. 46a–d. As noted above, the user can also change the order of execution of the function block icons by manipulating the schedule bars in the schedule window.

Displaying Parameter Values (alarm limits, setpoints . . . etc.)

Figure 28:
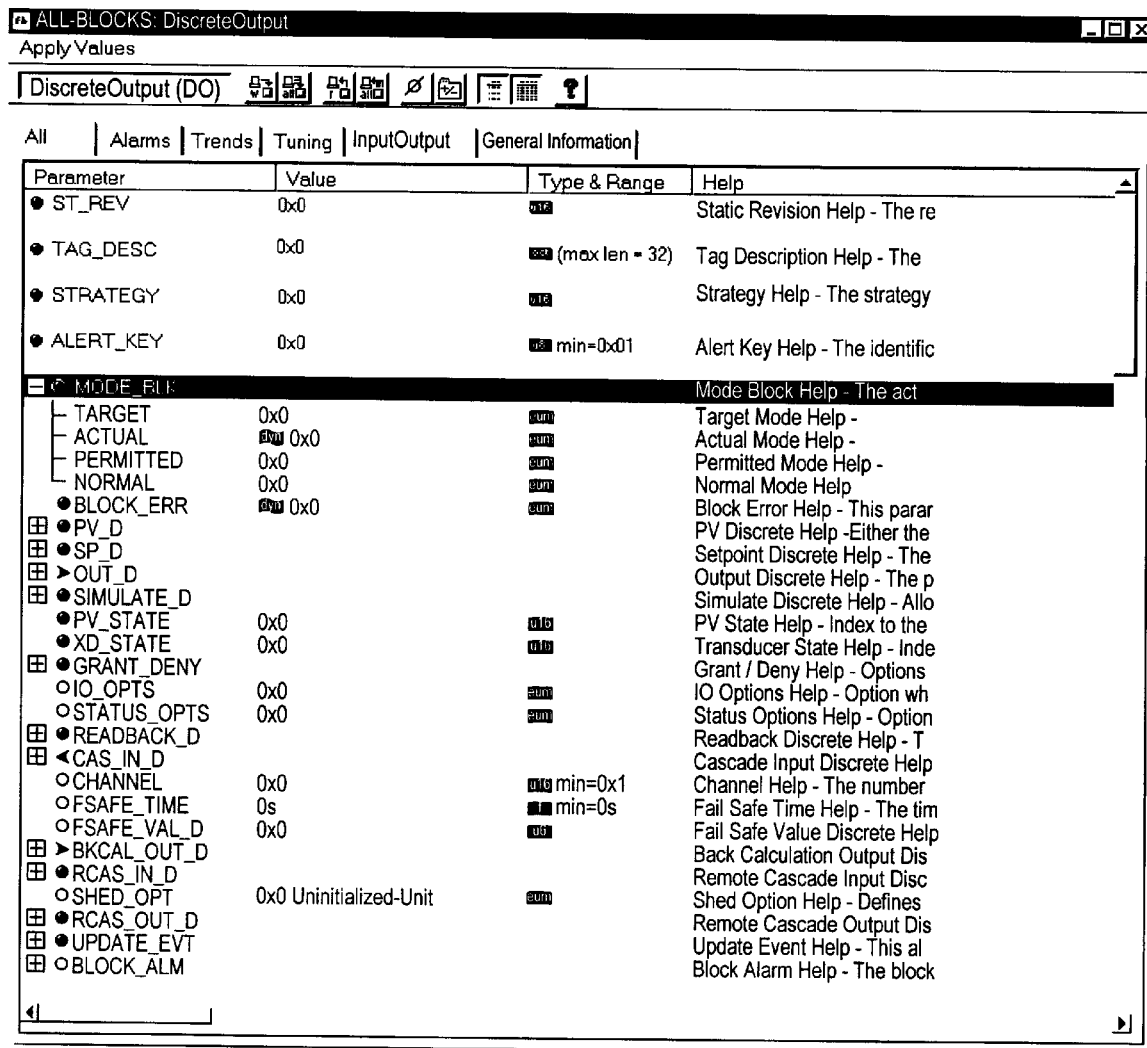
FIG. 28 is a screen shot illustrating a list of function block parameters associated with a respective function block.

Referring now to FIG. 28, the present invention provides an improved system and method for displaying parameters in a more intuitive manner. FIG. 28 illustrates a Block window for a function block. In order to access a Block window of a function block, first the user selects or double clicks on the function block in either the Project View or Function Block Application to open the Block window. The Block window presents a list of function block parameters for the selected block. The parameters are displayed in a column format with the columns being as follows:

1) Parameter—Name of the parameter
2) Value—The value read from the block
3) Type & Range—The data type of the parameter and the range of valid values
4) Help—Help strings from the device description The parameters are displayed in the order that they appear in the block. Parameters with a plus "+" sign beside them signifies that the parameter is a record (structure) and contains more than one entry. The user clicks on this plus sign to expand or collapse the structure. When a parameter value is changed, an asterisk "*" appears beside the parameter name.

As shown in FIG. 28, the parameters have an object or icon displayed proximate to the name, preferably to the left of the name, that color codes and symbolically represents the class of the parameter. The various types of parameters are described below.

Input parameters—are parameters that receive ("subscribe") data

Output parameters—are parameters that send ("publish") data

Contained parameters—these are not Input or Output parameters. There are 3 types of contained parameters:
1) Tuning—used for tuning the function of the block
2) Alarm—used for parameters associated with the transmission and configuration of alarms
3) Diagnostic—used to test the functionality of a block The circle represents contained parameters. Contained parameters cannot be linked to other parameters they are simple "contained" in the block.

There are 3 types of contained parameters

Alarms—Green

Tuning—Light Blue

Diagnostic—Purple

Black—All others

The right arrow is color coded red and represents an output. The left arrow is color coded blue and represents an input.

There are 6 tabs on this window that groups the parameters up into their various classes. This is convenient for configuration. The 6 tabs are as follows.

All—Shows all the parameters

Alarms—Shows only alarm parameters and is used to configure alarms

Trends—Shows only trendable parameters and is used to configure trends

Tuning—Shows only tuning parameters and is used to tune the block

Input/Output—Shows only the I/O parameters.

General Information—Displays basic information about the function block.

Custom—User customizable tab; the user can add his own selected parameters; this tab also includes a periodic update feature.

Figure 29:
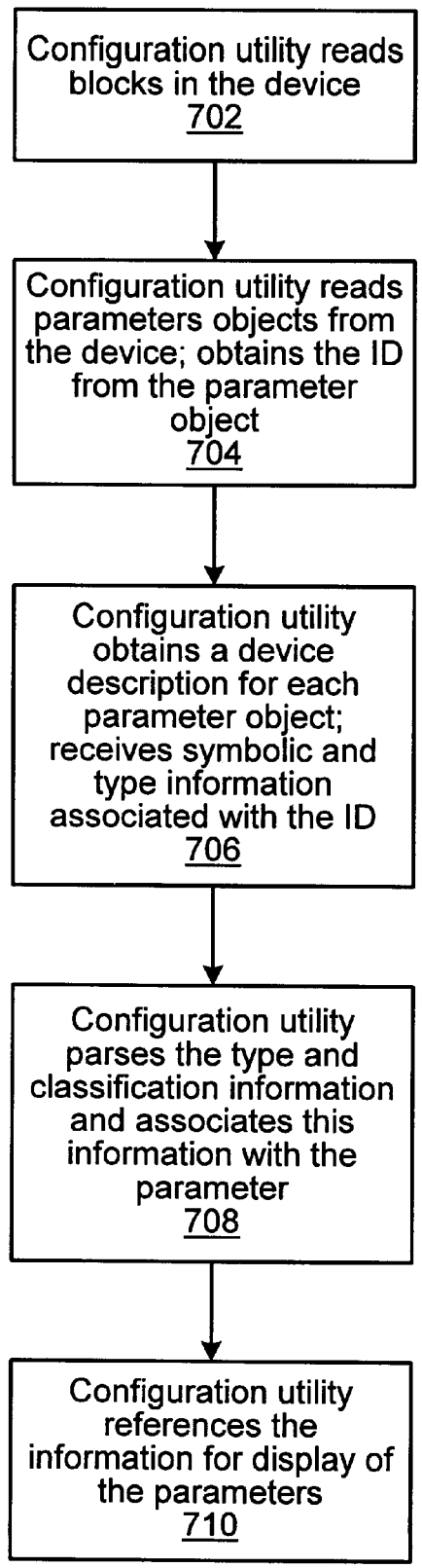
FIG. 29 is a flowchart diagram illustrating operation of the configuration utility in obtaining device description information regarding parameters of a block.

FIG. 29—Flowchart Diagram for Display of Parameters

Referring now to FIG. 29, a flowchart diagram is shown illustrating operation of a method which obtains information on parameters for display. This method illustrates how information is obtained for display of parameters with appropriate colors and/or shapes to visually represent the type of parameter. It is noted that certain of the steps may be performed concurrently and/or in various orders.

As shown, in step 702 the configuration utility dynamically reads or determines all of the function blocks in a device, i.e., determines all of the function blocks in a device. The configuration utility preferably executes a function call referred to as NIF_get_block_list. This function call operates to retrieve all of the blocks within a device. The NIF_get_block_list function call is a call to the NI Fbus API, which is available from National Instruments Corporation.

After all of the blocks within a device have been determined in step 702, in step 704 the configuration utility dynamically reads the parameters, also referred to as parameter objects, from each of the blocks determined in step 702. Each parameter has an ID value included in its data object. In step 704 the configuration utility also obtains the ID value for each parameter object.

In step 706 the configuration utility dynamically obtains a device description for each parameter object. In the preferred embodiment, the configuration utility invokes a function call referred to as NIF_get_object_attributes in the NI Fbus API. The NIF_get_object_attributes function call combines a call referred to as Get_OD, which is specified in the Fieldbus specification, as well as a call to "DD_Services". The Get_OD function call returns the ID of the parameter. It is noted that the Get_OD function call may not be performed if the ID is already available. The function call referred to as "DD services" returns a data structure which comprises the device description for the respective parameter.

The data structure comprises parameter information, including symbolic information, classification information, and/or type information. The symbolic information includes the name as well as help strings for blocks and parameters. The classification information indicates the type or class of parameter, e.g., contained, input, or output. The type information indicates the data type of the parameter. Thus in step 706 the DD services function call, or the NIF_get_object_attributes call returns the symbolic, classification and type information associated with the ID in a data structure.

In step 708 the configuration utility parses the data structure to obtain the classification information for each parameter. The configuration utility parses the classification information such as input, output, and contained, and also the class or type of contained parameter, including tuning, alarm, and diagnostic. The configuration utility parses this information and associates this information with the respective parameter. The configuration utility may also parse other information, such as the type information, e.g., integer, float, character, among others.

In step 710 the configuration utility uses this information to display the parameters, wherein the parameters are displayed in a manner which indicates at least a portion of the parameter information. In the preferred embodiment, the configuration utility uses the parameter information to display objects or icons proximate to the parameter names to indicate the classification of the parameter. The configuration utility preferably uses particular colors and/or shapes to distinguish among the parameters. As described above, the colors and/or shapes visually represent the classification and/or type of the parameter. The symbolically and color coded icons are displayed throughout the configuration utility, including on the block dialogs, the function block applications (fieldbus configurations), and the schedule. In an alternate embodiment, the present invention displays the name of the parameter in a particular color or font to identify the classification or represent other parameter information.

As shown in FIG. 28 and discussed above, the parameters have an icon displayed to the left of the name that color codes and symbolically represents the class of the parameter. The circle represents contained parameters. Contained parameters cannot be linked to other parameters they are simple "contained" in the block. The right arrow is color coded red and represents an output. The left arrow is color coded blue and represents an input.

The contained parameters are symbolically coded with a circle and are color coded as described below.

Alarms—Green

Tuning—Light Blue

Diagnostic—Purple

Black—All others

Figure 30:
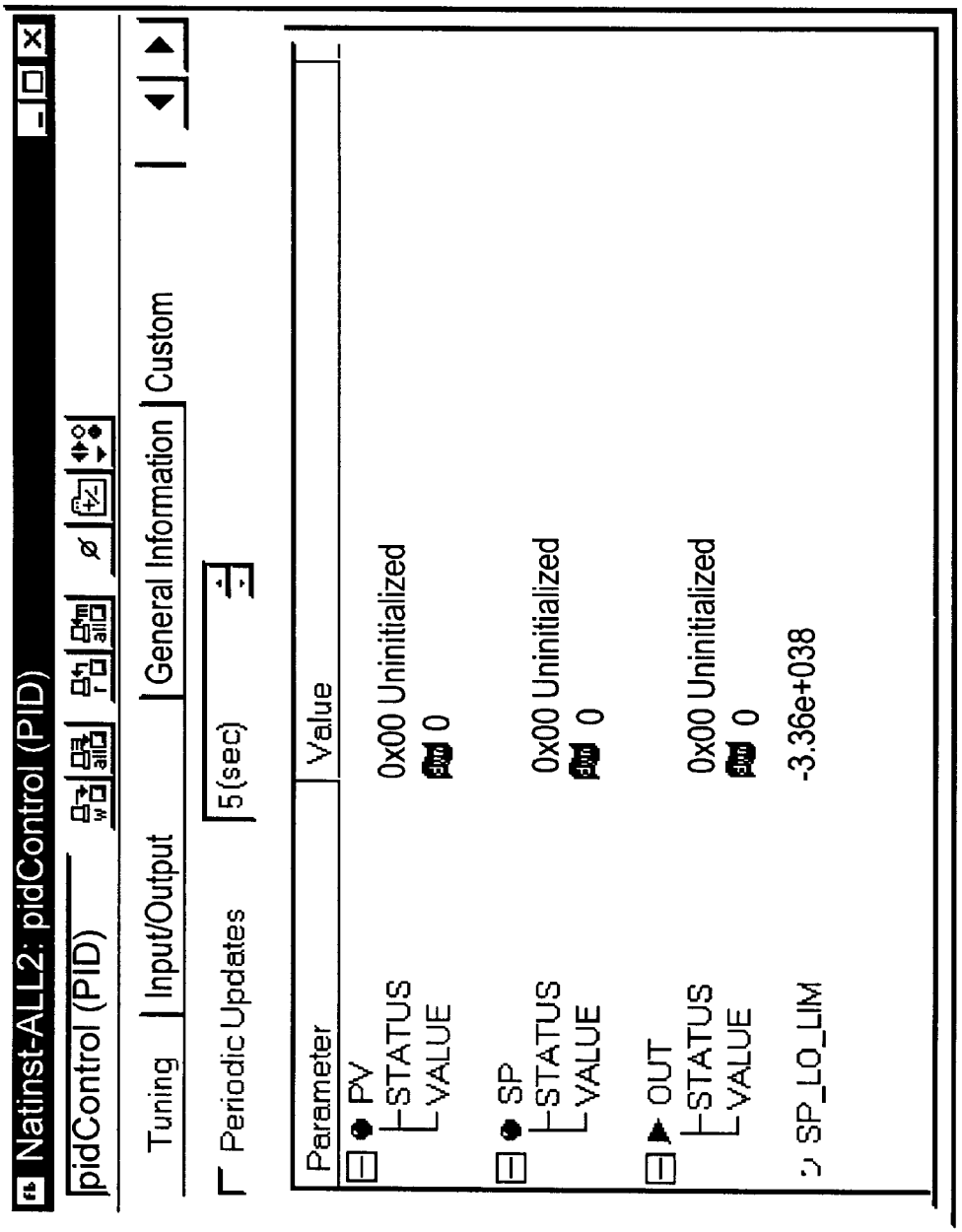
FIGS. 30 and 31 are screen shots illustrating display of parameters with symbolically and color coded icons.
Figure 31:
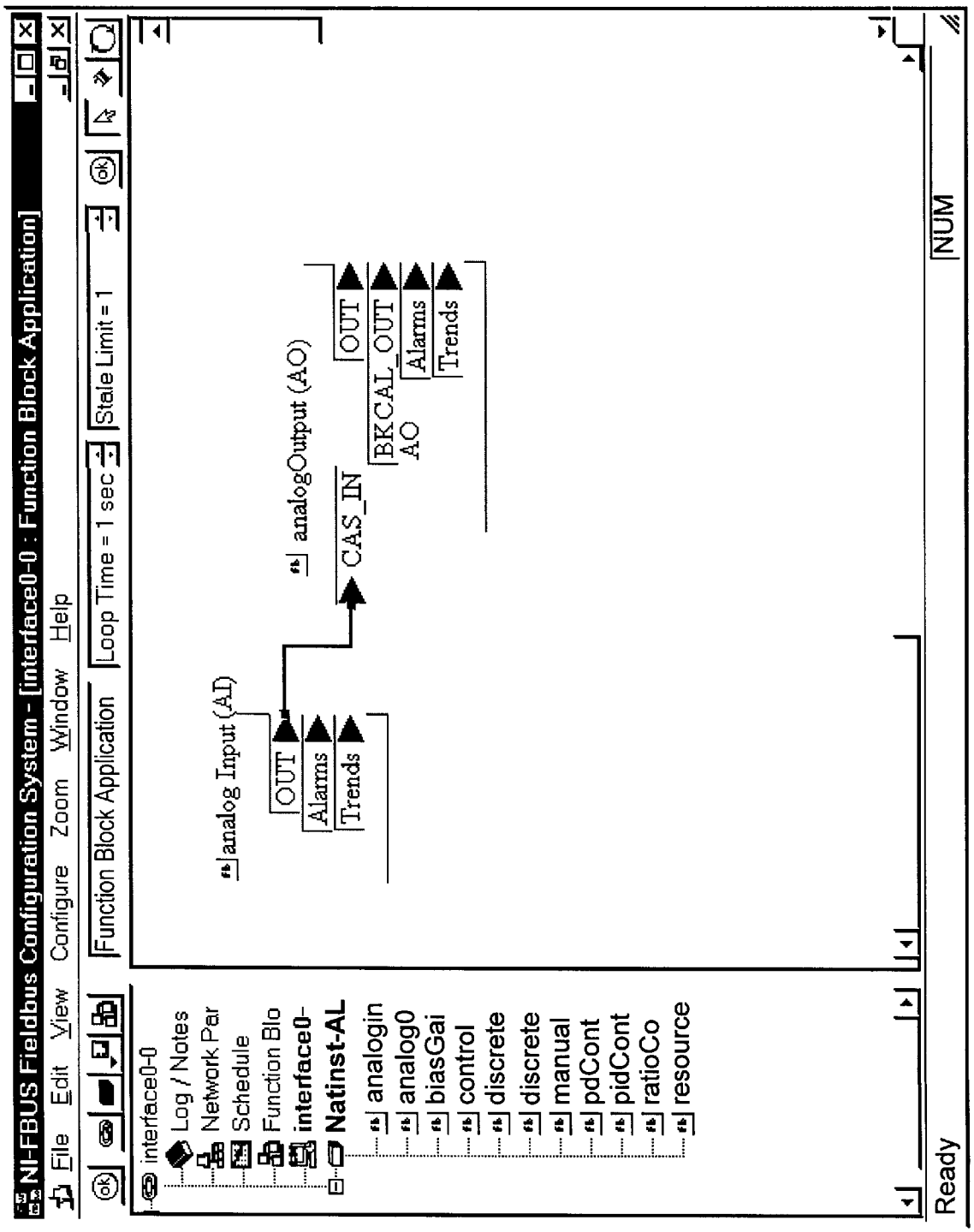

FIG. 30 illustrates a screen shot of a block window which includes icons having various shapes and color codings, and FIG. 31 illustrates a fieldbus configuration or function block application which includes icons having various shapes and color codings. As shown, contained parameters are represented by a circle, whereas input and output parameters are represented by left and right arrows, respectively. Although not shown due to the black and white figure, contained parameters are further represented by the different colors described above.

Changing Parameter Values (alarm limits, setpoints . . . etc.)

As discussed above, the user can change "contained" parameter values in step 316. Referring now to FIG. 28, the system of the present invention includes an improved method for changing parameter values, including alarm limits, setpoints, etc. In order to change the values of parameters in a block from the default values, the user performs the following steps. First, the user accesses the Block window as described above. The Block window presents a list of function block parameters for the selected block as described above.

The window shown in FIG. 28 can be used to change the parameter values. The value column displays the last read value of that parameter. If the parameter value is "grayed" the parameter is not editable. If the parameter value is not grayed, the user can simply select the parameter value desired to change and type in the new value. Alternatively, the user selects or clicks on the parameter to display the proper edit control for changing the value of that parameter.

In one embodiment, special Edit controls can appear for the editable parameters of the function block, these including Edit, Spin, List and Check List controls. As shown in FIG. 32a, the Edit control is available for changing string values. As shown in FIG. 32b, the Spin control is available for changing integer values. The Spin control includes left and right arrow buttons that can be used to increase or decrease the value. As shown in FIG. 32c, the List control is available for selecting from several alternative options. The options in the list control are derived from the device description. As shown in FIG. 32d, the Check List control is available for selecting several options. The options in the list control are derived from the device description.

The toolbar at the top of the window in FIG. 28 provides an interface for reading and writing parameters, and this toolbar is shown separately in FIG. 33. The toolbar items are described below from left to right:

Name—Tag of the function block. Use this to change the tag of the block.

Write—write all changes. Including writing the new tag if the tag has changed.

Write All—write all parameters. Including writing the new tag if the tag has changed.

Read—Read selected parameter

Read All—Read all parameters

Clear—Clears all linkages to this block

Refresh—Updates the screen

Simple View—Displays only the parameter and value columns

Detail View—Displays the parameter, value, range, and help columns

When data is read or written to a block the status window is updated with the status of the transactions.

Configuring trends and alarms

As discussed above, the user can configure trends and alarms in step 318.

Figure 34:
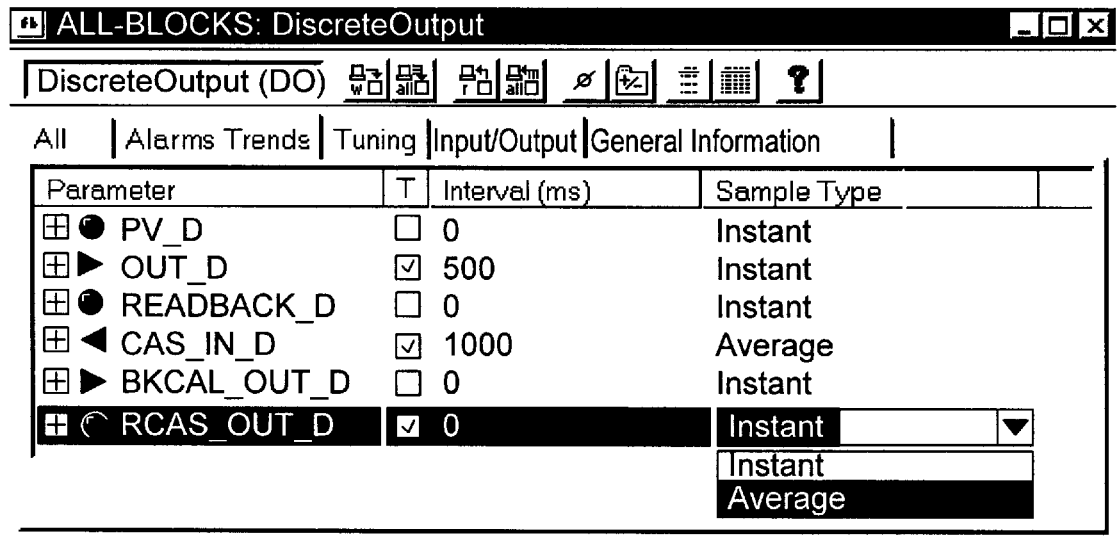
FIG. 34 is a screen shot illustrating the configurations tab associated with a function block.

To configure trends, the user opens or selects the function block in the FBAP editor window to display the Block window for the block. In the Block window, the user switches to the "Trends" tab, as shown in FIG. 34. The trends tab shows only trendable parameters and is used to configure trends. The trends tab has four columns as follows:

1) Parameter—the name of the parameter

2) Trend—check box to trend this value

3) Interval—sample interval of trend

4) Sample type—for the type of sample you have two choices
   1) Instant—an instantaneous reading
   2) Average—an average of previous readings After the block window for the selected function block is displayed, to configure which parameter the user desires to trend, the user performs the following steps:

1) Select one or more parameters of the function block desired to trend by clicking the checkbox in the trends column.

2) Set the sample interval of the trend by typing the interval in the Interval field.

3) Set the type of sample by selecting a sample type from the Sample Type drop down list.

Figure 35:
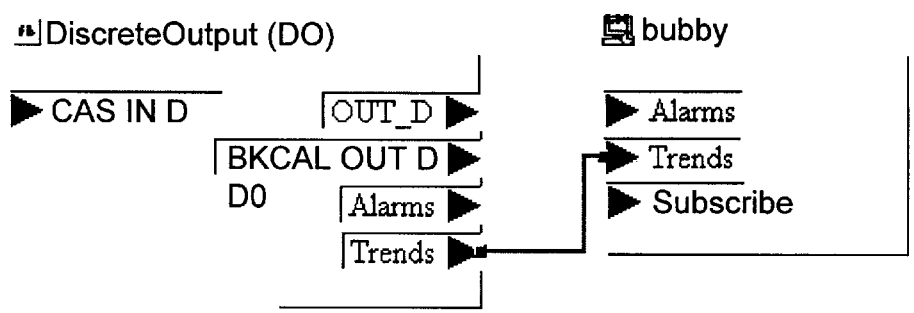
FIG. 35 is a screen shot illustrating the trends output of a block wired to a device which receives the trend.

4) Wire the trends output of the block to the device desired to receive the trend, as shown in FIG. 35. This presumes that the function block icon which corresponds to the selected function block is already displayed in the editor window, wherein the function block icon includes a trends output, and the device icon which corresponds to the device in the fieldbus network is also displayed. The wiring operation involves displaying on the screen a wire connecting the trends output of the function block icon to the trends input of the device icon in response to user input.

As shown, FIG. 35 shows a configured trend, wherein the trends output of a function block icon is connected to the trends input of a device. Wiring the trends output of the function block icon to the trends input of the device icon operates to configure the device to receive trend information regarding the one or more selected parameters. When a fieldbus configuration including the diagram or trend configuration shown in FIG. 35 is executed, the device icon receives trend information of the selected one or more parameters of the function block during execution. This trend information comprises values of the parameter at the specified sample interval. The device receiving the trend information preferably operates to store a history of the trended parameter(s) for a certain length or buffer size, and then preferably publishes this information.

Figure 36:
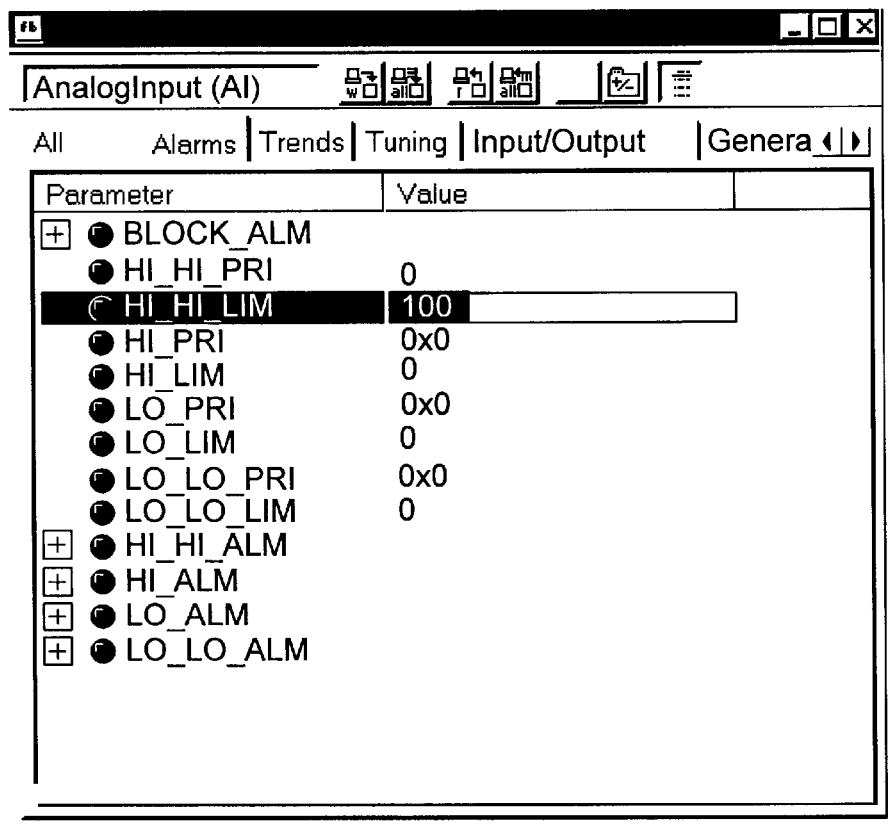
FIG. 36 is a screen shot illustrating the alarms tab associated with a function block.

In order to configure Alarms, the user opens the block to the "Alarms" tab, as shown in FIG. 36. The "Alarms" tab has 2 columns 1) Parameter—name of the block alarm parameter 2) Value—the editable value of the alarm limit, and priorities.

Figure 37:
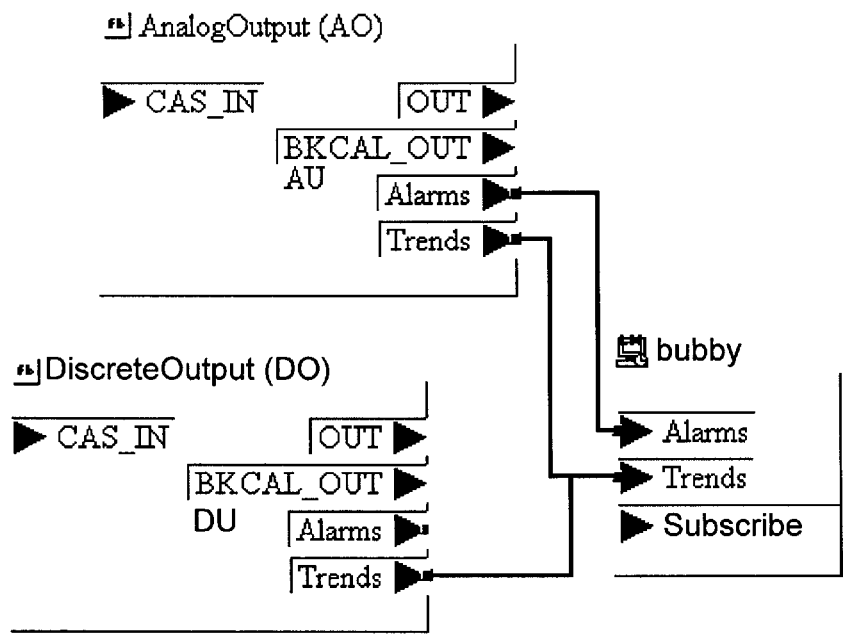
FIG. 37 illustrates a function block application including the alarm output of a block connected to a device which receives the alarm.

As shown in FIG. 37, the user simply wires the alarm output of a function block to an alarm input of the device desired to receive the alarm. FIG. 37 also shows that multiple trends and alarms can be wired to one device.

Wiring the alarm output of the function block icon to the alarm input of the device icon operates to configure the device to receive alarm information from the respective function block. When a fieldbus configuration including the diagram or alarm configuration shown in FIG. 37 is executed, the device icon receives alarm information from the selected function block during execution.

Periodic Updating

Figure 38:
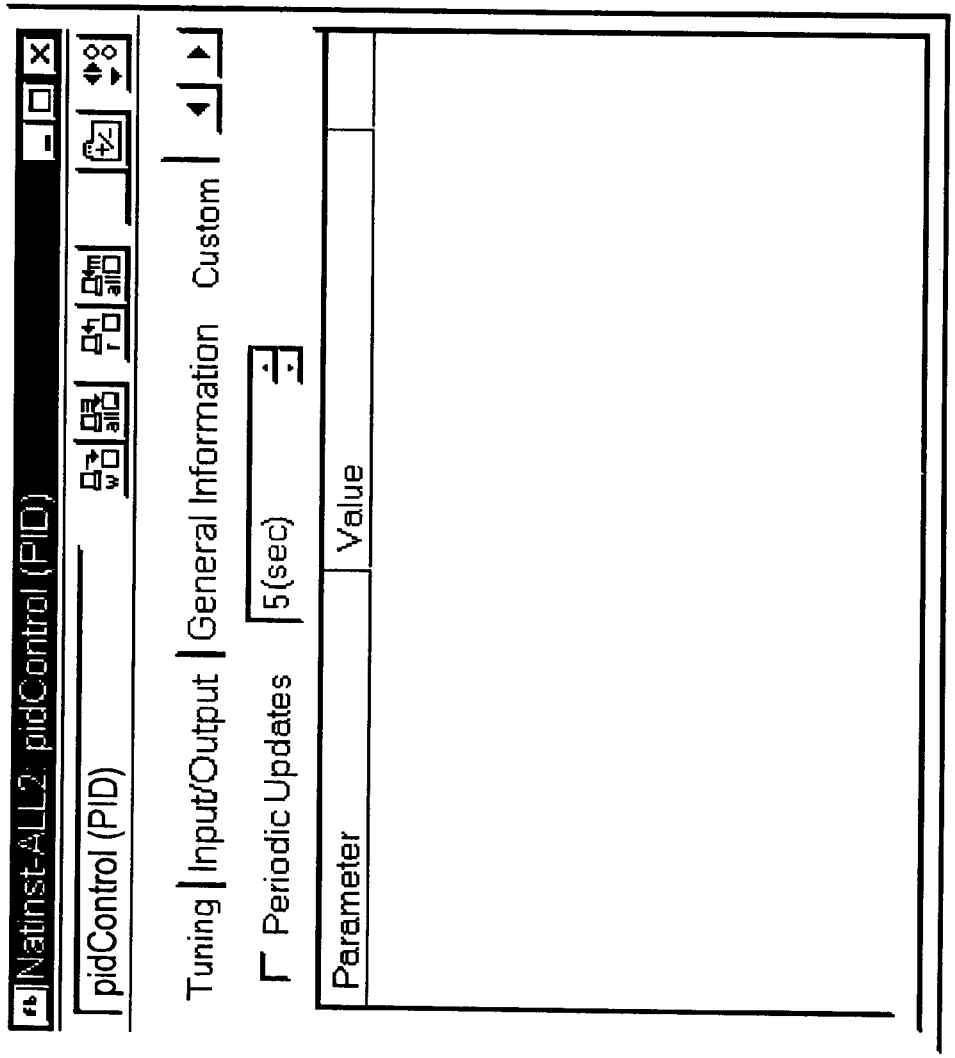
FIGS. 38–40 illustrate operation of the periodic update window.
Figure 39:
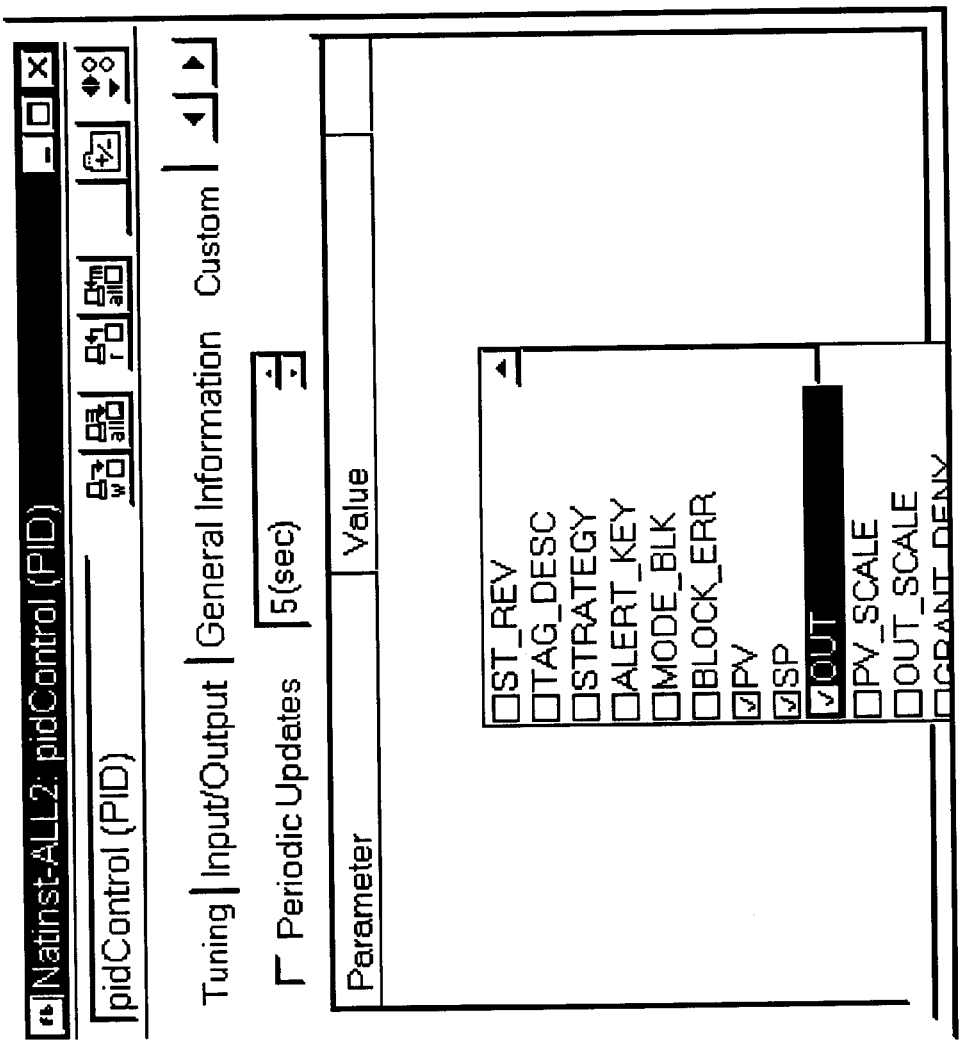
Figure 40:
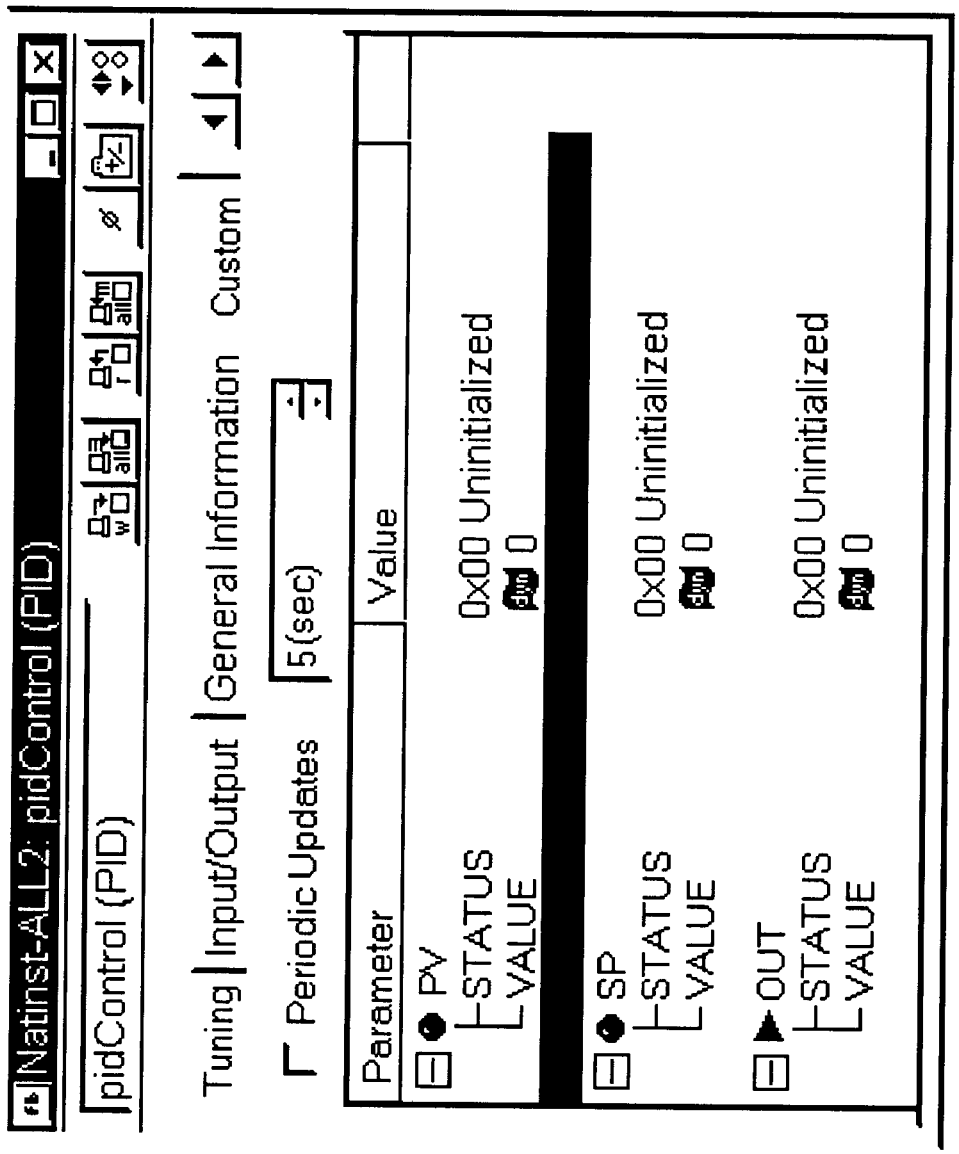

Referring now to FIGS. 38–40 screen shots are shown illustrating operation of the periodic update window. As shown, the user first selects the custom tab of a block window. The custom tab of the block window is illustrated in FIG. 38. As shown, the custom tab includes a check box where the user can select a period update option, as well as a time interval indicating how often periodic updating is to occur. The window of the custom tab includes parameter and value fields as shown.

Referring now to FIG. 39, the user can place parameters in the custom tab or periodic update window by dragging the parameters to the window. The user can select certain parameters for periodic updating by checking boxes next to their respective parameters as shown. In the example shown in FIG. 39, the user has checked the PV, SP, and OUT parameters for periodic updating.

Referring now to FIG. 40, the user sets the update time and simply checks the "period updates" check box at the top of the custom tab to enable periodic updating. When this occurs, the parameters that are selected are read from the block at the specified rate. Thus the periodic updating feature may be used to periodically view updated values of parameters of a respective function block.

Downloading the configuration to the fieldbus network.

Figure 41:
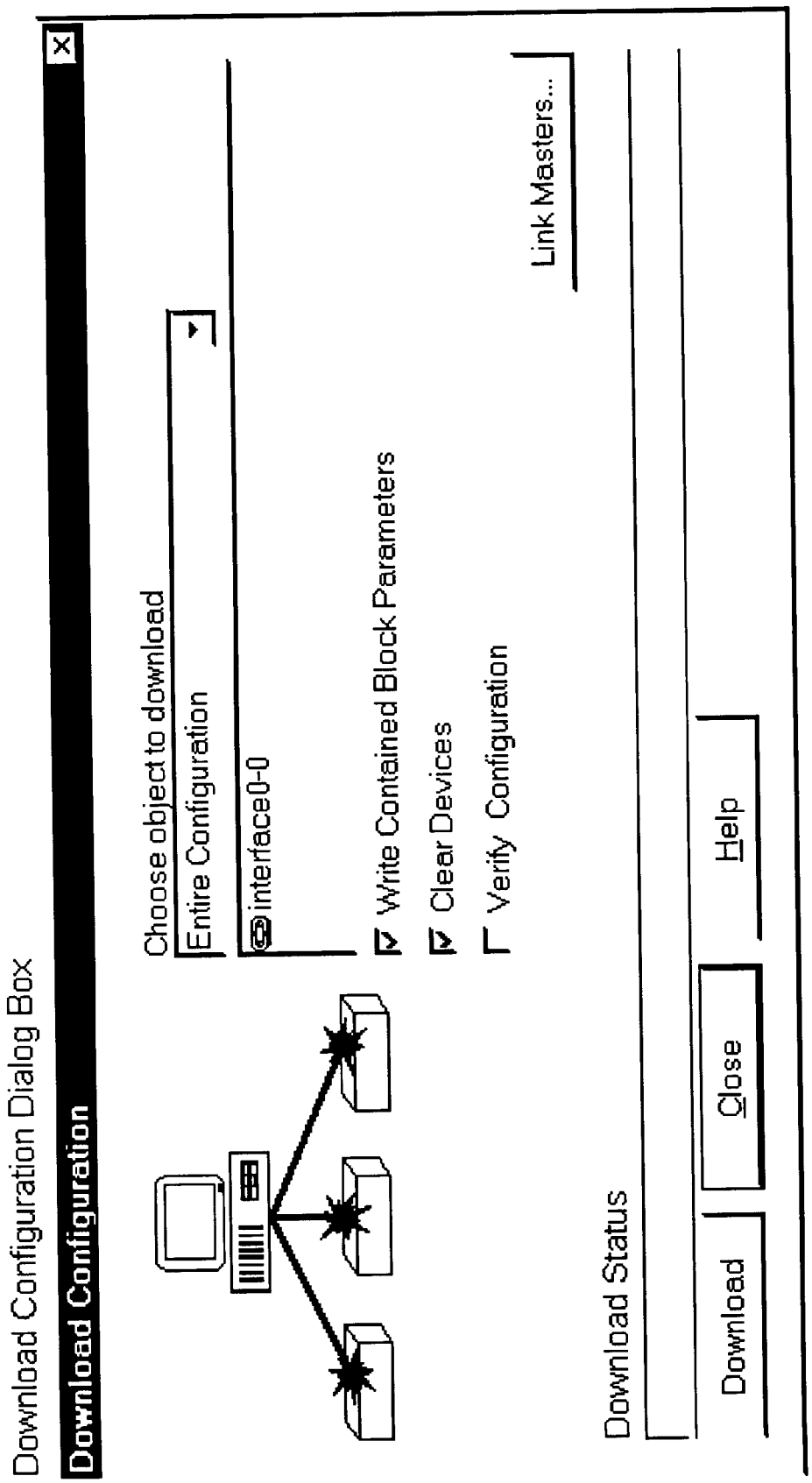
FIG. 41 is a screen shot illustrating the download wizard dialog box for downloading the function block application or fieldbus configuration.

As noted above, after the fieldbus configuration has been created, in step 322 the user selects an option to download the configuration to the fieldbus network. By selecting the download option from the Project View toolbar or from the Configure menu, the user can open the "Download Configuration" dialog box as shown in FIG. 41. This dialog makes it easy to download the user's selected configuration to a specific fieldbus network.

The steps for downloading are as follows:

1) The user chooses the configuration object the user desires to download.
2) The user chooses the fieldbus object the user desires to receive the configuration.
3) The user can optionally click on the Link Masters button to set link masters to receive the Link Active Schedule, the primary Link Active Scheduler, and the primary time master of the link. In response, a Network Parameters dialog box appears, which the user can use to change network parameters, such as primary LAS and primary time master.
4) The user can optionally check the "Write contained block parameters" box to write all of the contained parameters of function blocks in the project.
5) The user can optionally check the "Clear devices" box to reset or clear all of the communication connections of devices on the bus.
6) The user clicks "Download" to download the fieldbus configuration to the network The progress bar updates showing what percentage of the configuration is complete.

The configuration utility during download displays and updates the "Download" tab in the status window. The configuration utility shows what devices are being configured, their settings, and whether or not configuration is successful.

EXAMPLES OF OPERATION OF THE PRESENT INVENTION

FIGS. 42a–f: Assembly of a fieldbus configuration

Figure 42A:
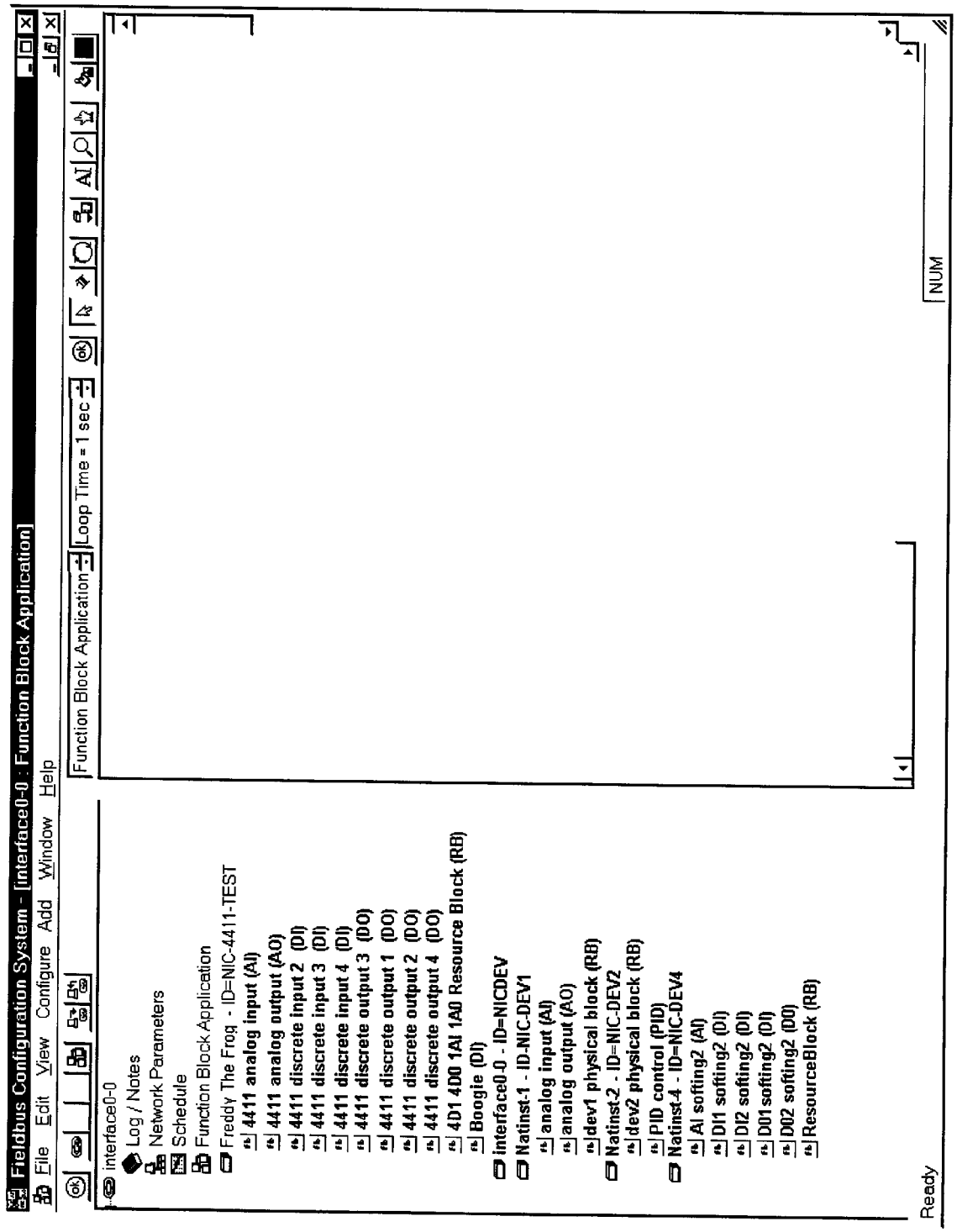
FIGS. 42a–42f are screen shots illustrating creation of a fieldbus configuration, involving placing function blocks in the editor window and linking or wiring them together.
Figure 42B:
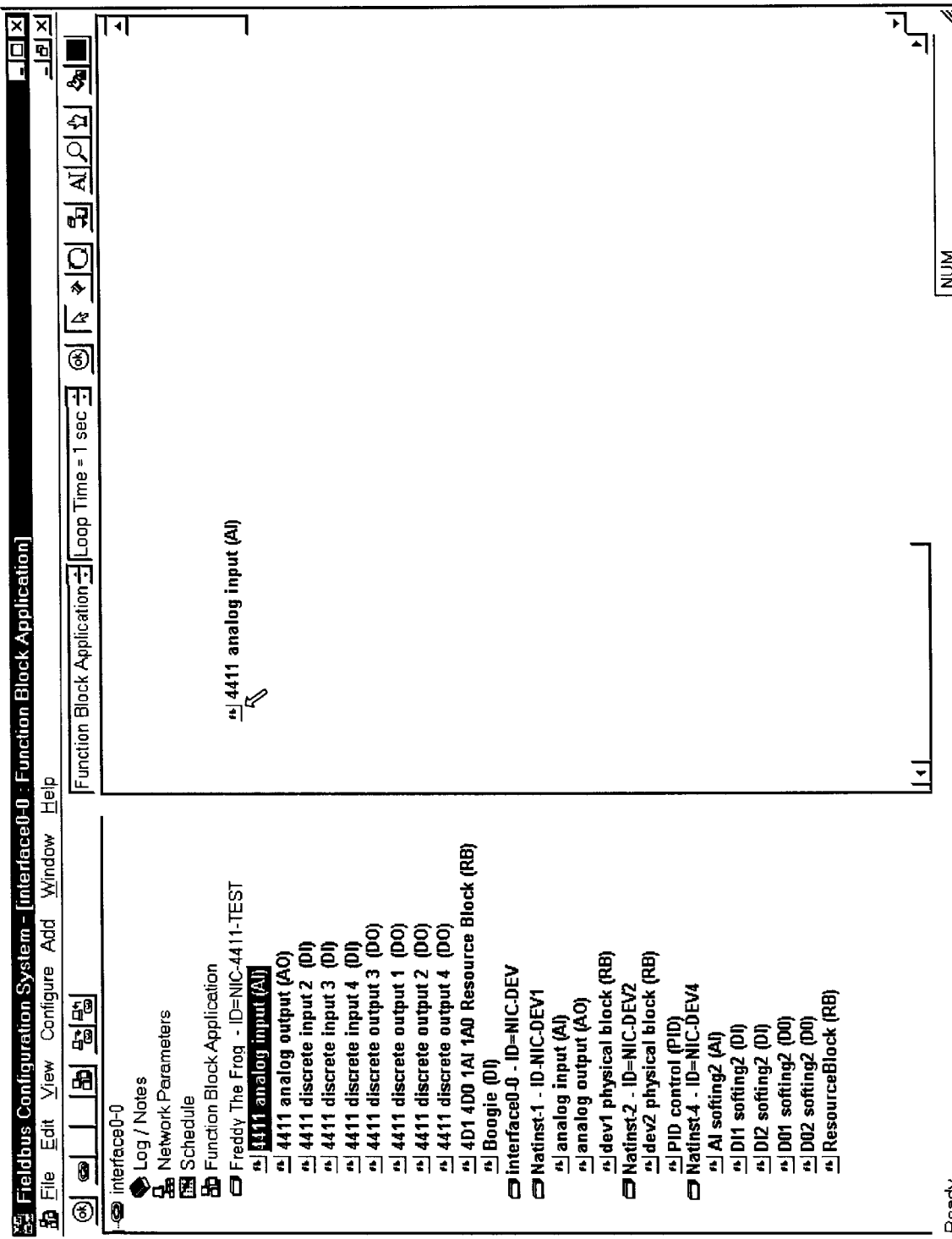
Figure 42C:
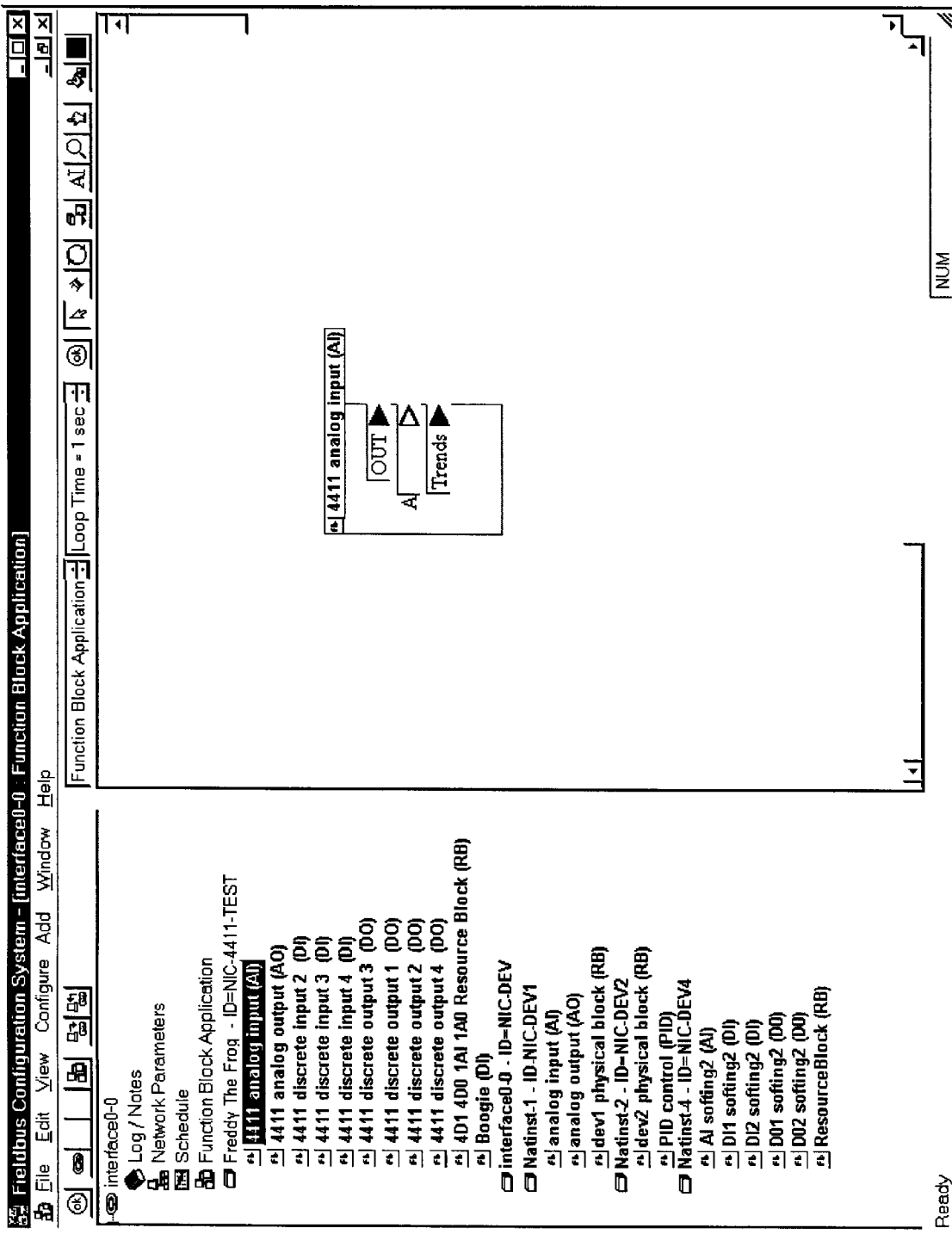
Figure 42D:
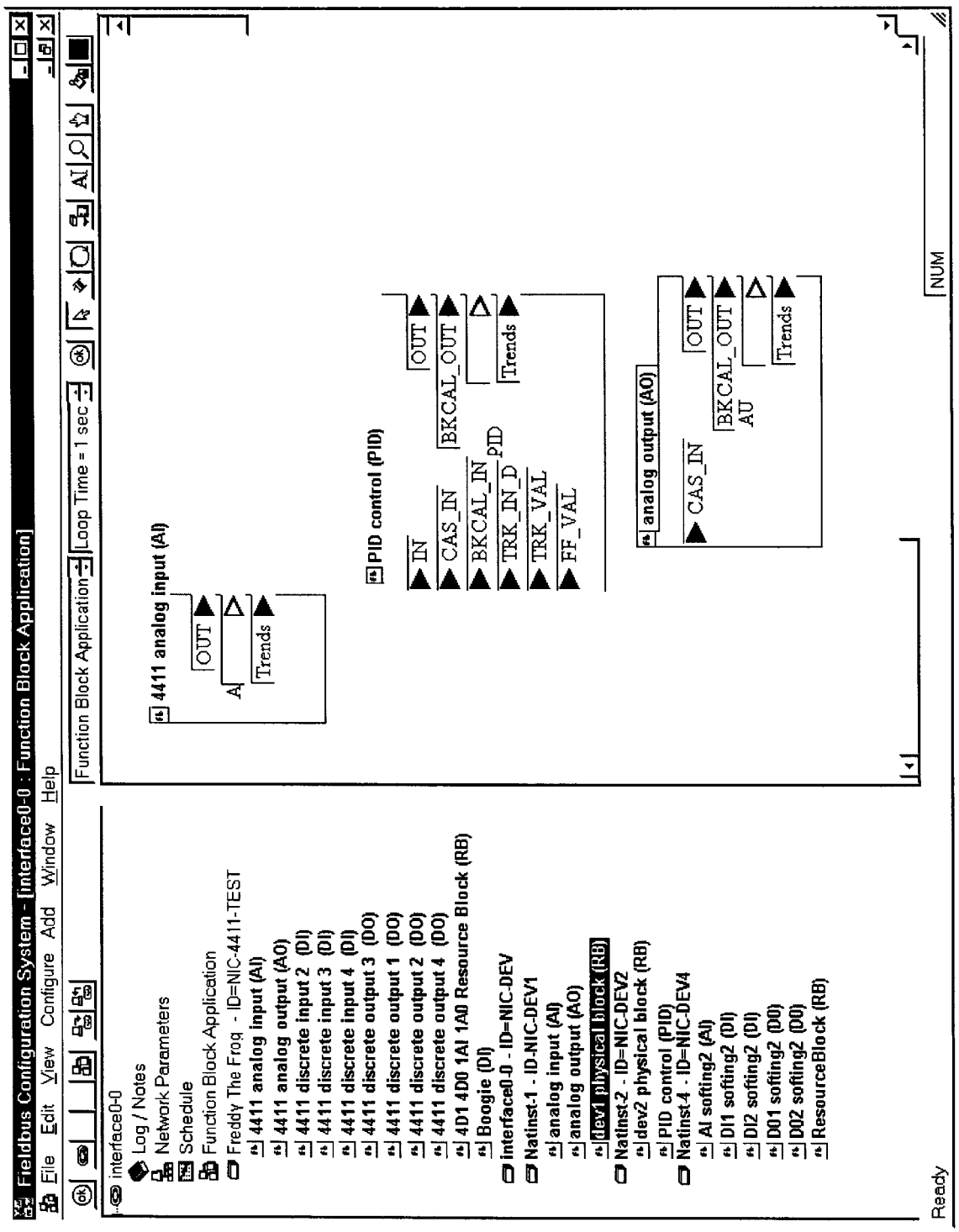
Figure 42E:
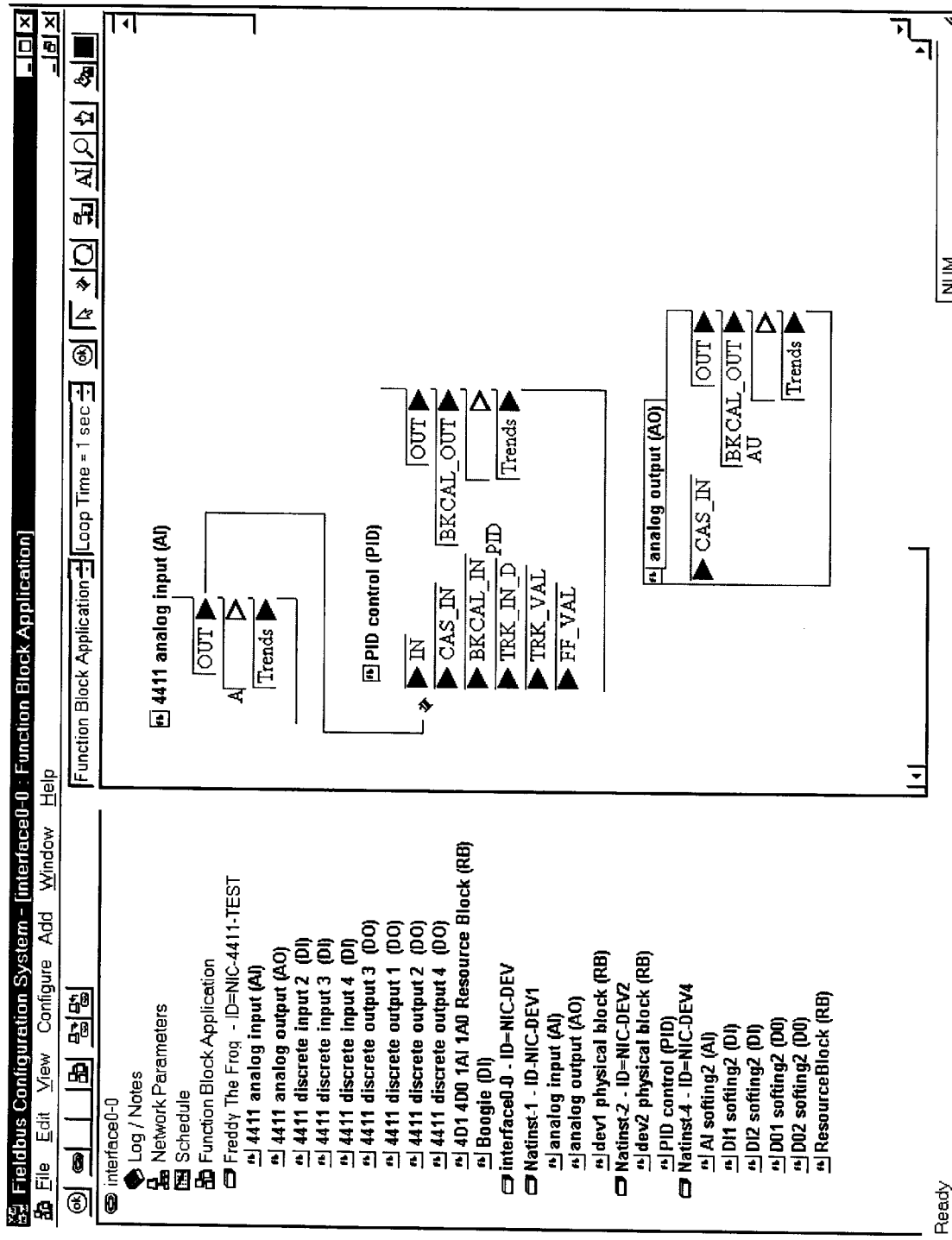
Figure 42F:
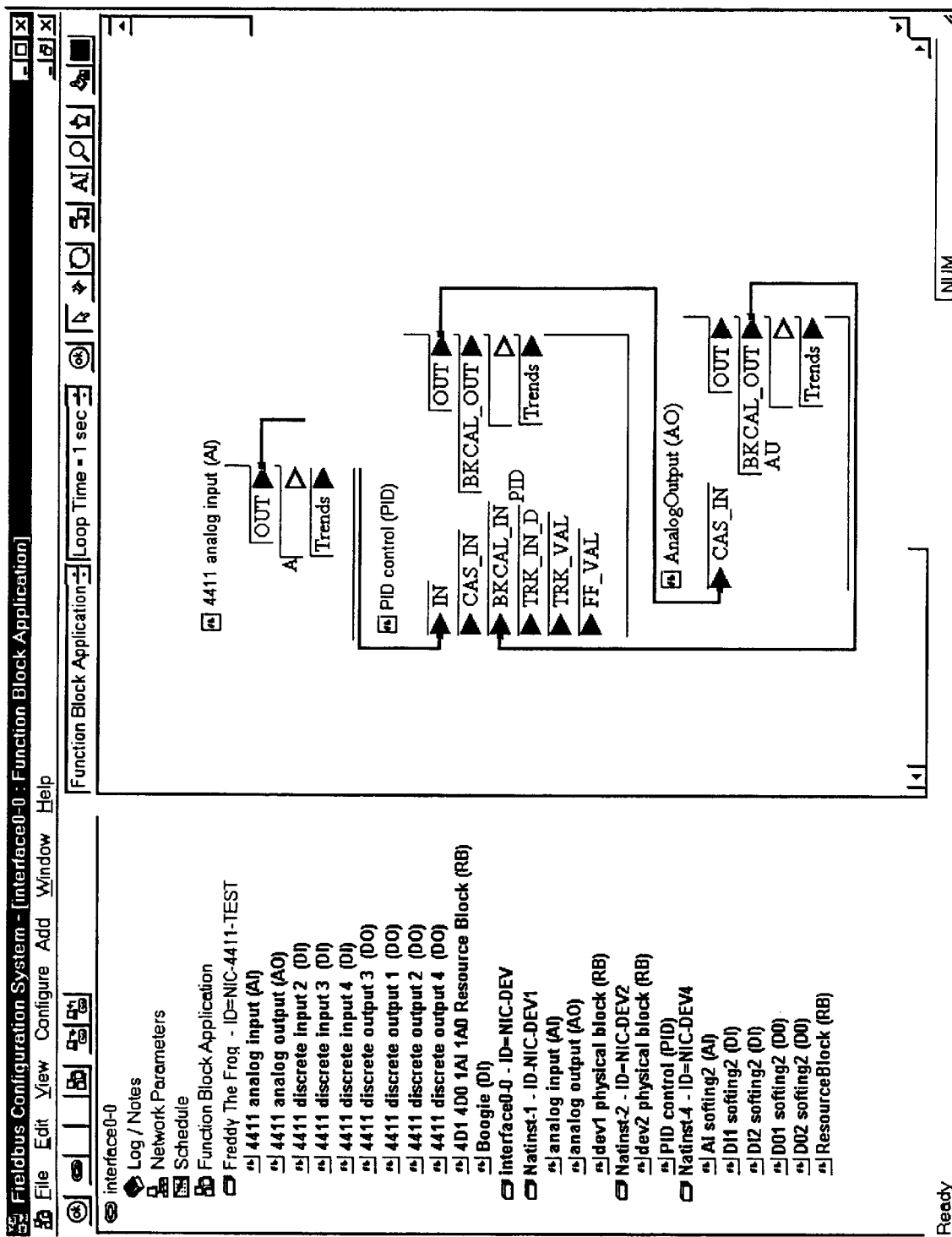

Referring now to FIGS. 42a–42f, various screen shots are shown illustrating assembly or creation of a fieldbus configuration, also referred to as a function block application or wiring diagram, according to the preferred embodiment of the invention. As shown, in FIG. 42a the function block application editor window has been opened and is blank. In FIG. 42b the user has dragged the "4411 analog input (AI)" item from the project view window to the editor window as shown. In FIG. 42c the function block icon corresponding to this function block appears in the editor window. In FIG. 42d the user has also placed a PID control function block icon and an analog output function block icon in the editor window as shown. In FIG. 42e the user has begun wiring up function blocks by connecting the out output of the analog input function block icon to the in input of the PID control function block icon. In FIG. 42f the user has completed wiring the function block diagram.

It is noted that the examples of FIGS. 42a–42f are similar to the examples of FIGS. 18a and 18b described previously. However, FIGS. 42a–f show more detail or more steps of how the function block application or fieldbus configuration is assembled or created.

Figure 43A:
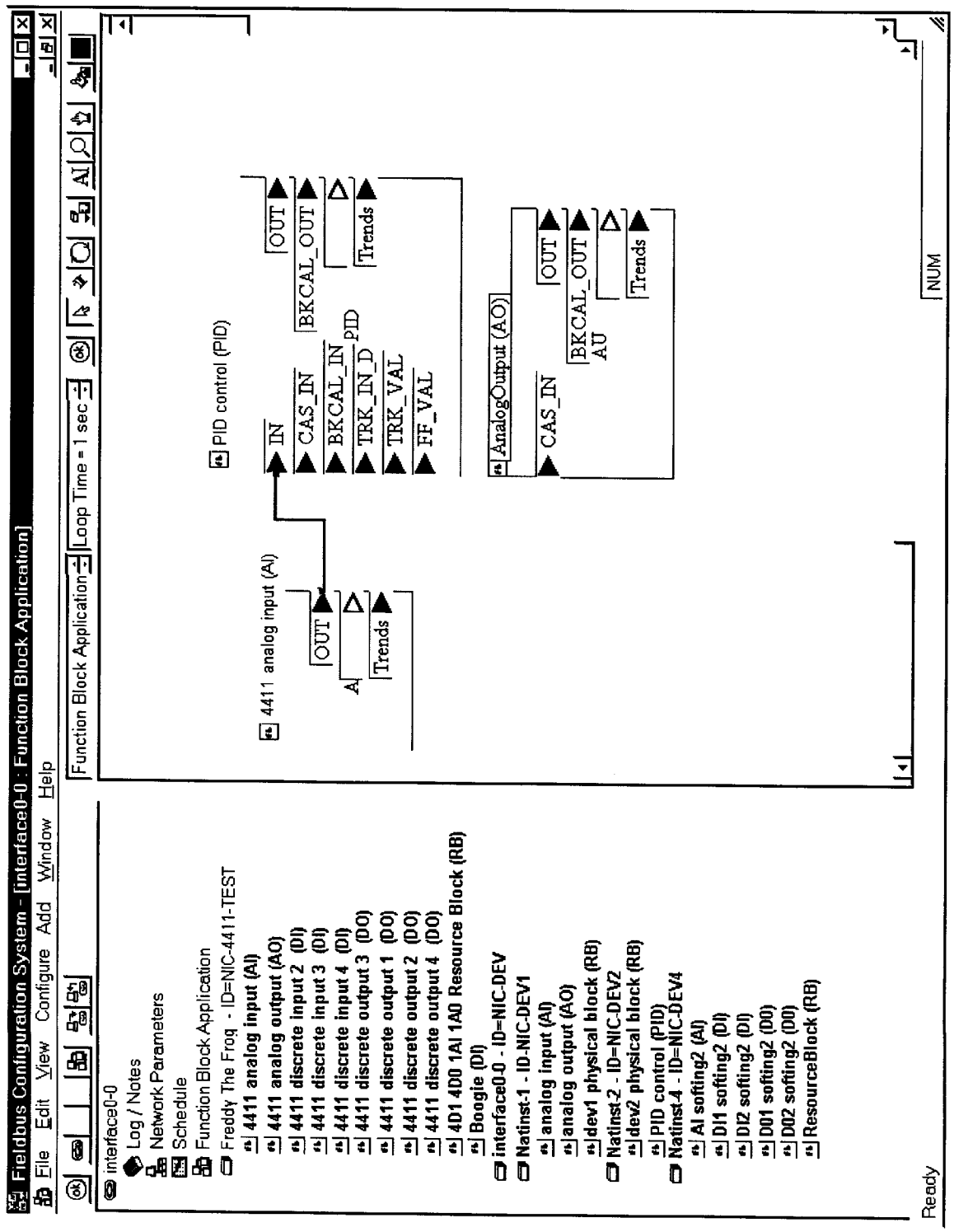
FIGS. 43a–b are screen shots illustrating connecting one output of a function block to multiple inputs of two or more function blocks.
Figure 43B:
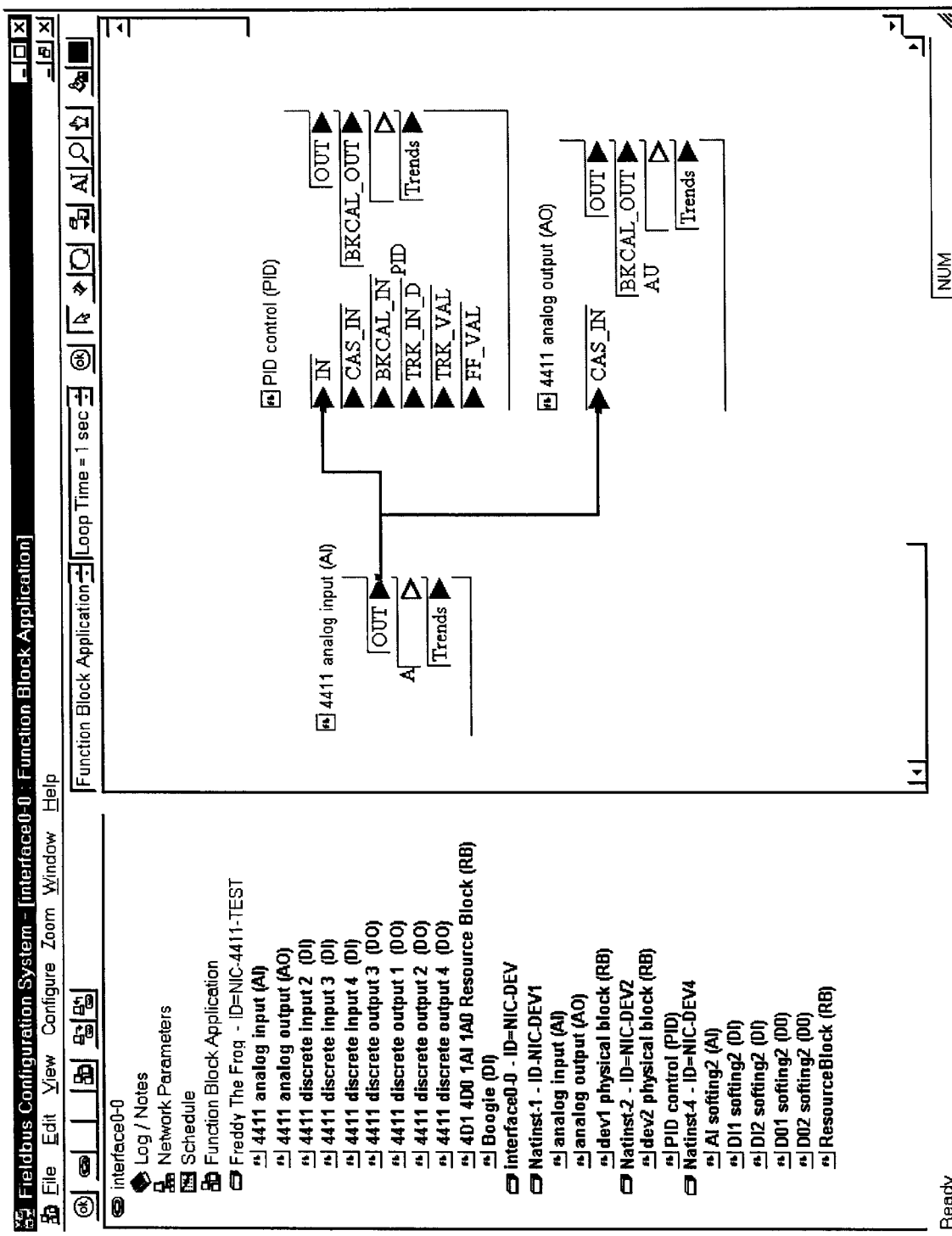

FIGS. 43a–b: single output connected to two inputs

FIGS. 43a and 43b illustrate how a single output of a function block icon can be connected to two or more inputs of two or more function block icons. Thus, the present invention provides a method whereby the output of one icon can be connected to multiple inputs of other icons in a data flow diagramming paradigm.

FIGS. 44a–d: Creation of a fieldbus configuration with the schedule window open

Figure 44A:
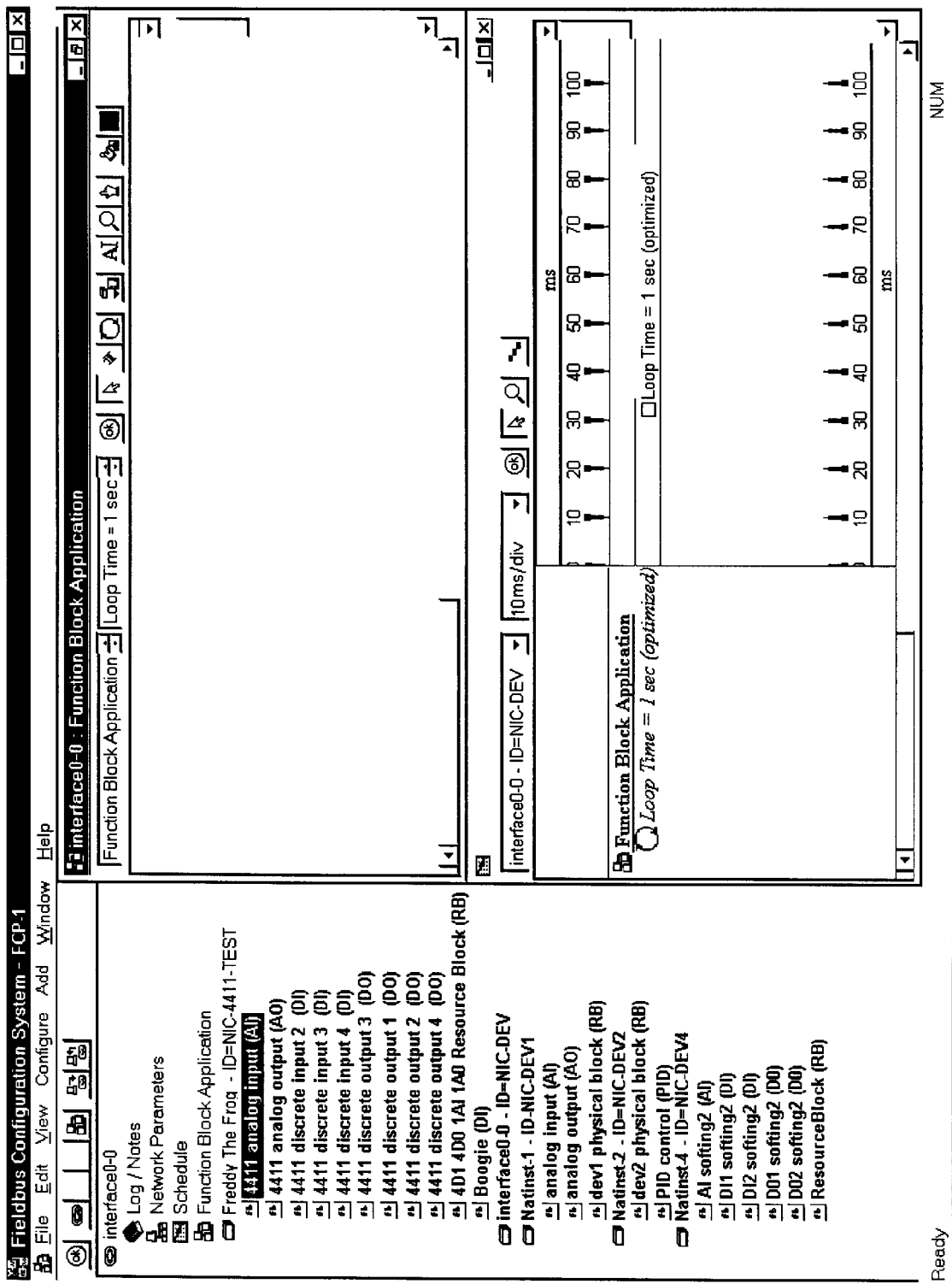
FIGS. 44a–d are screen shots illustrating creation of a fieldbus configuration, wherein the schedule window is open and illustrates creation of the schedule as the fieldbus configuration is assembled.
Figure 44B:
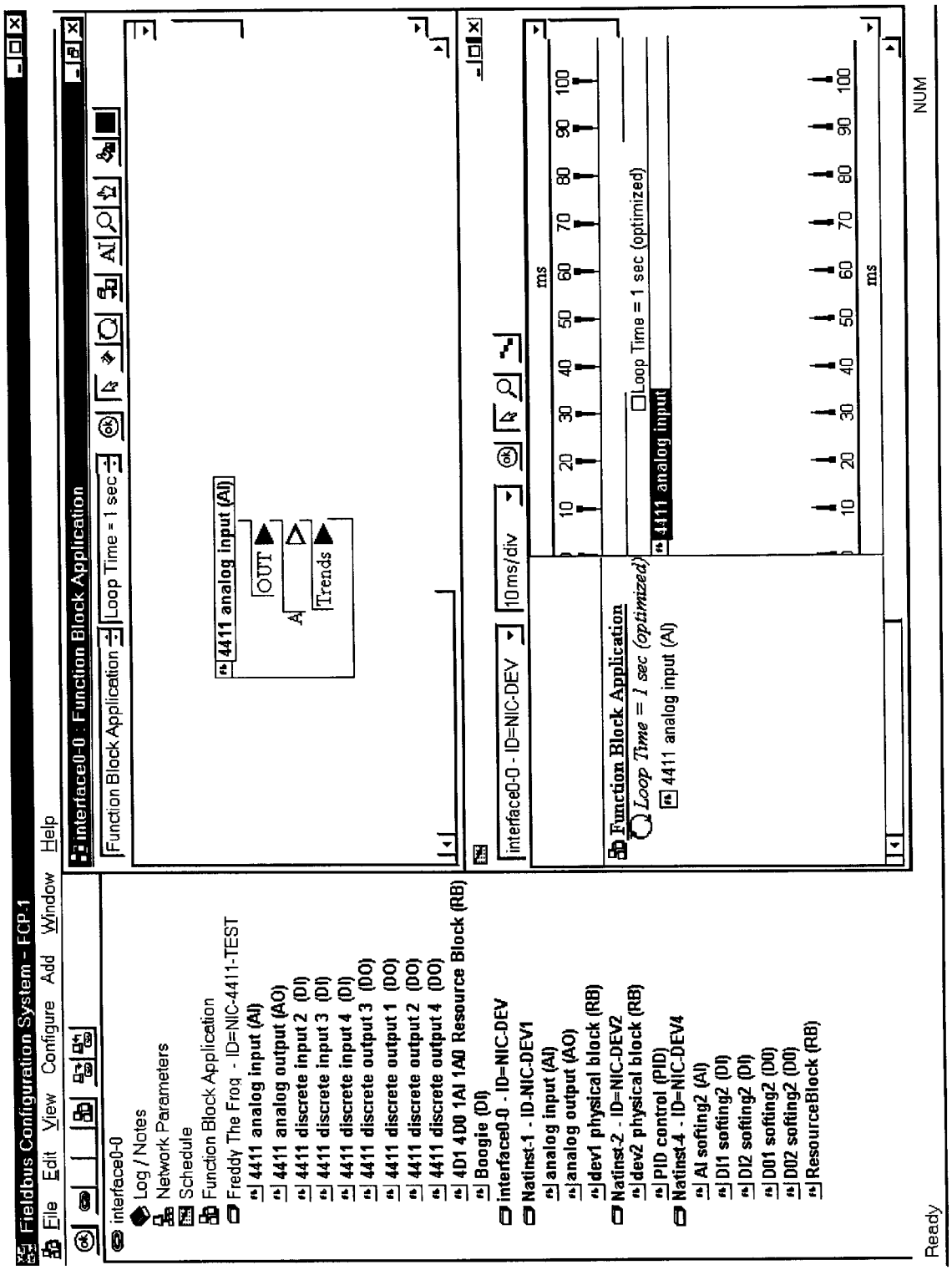

FIGS. 44a–44d illustrate an example of the creation of a fieldbus configuration, wherein the schedule window is also open. As discussed above, the schedule is preferably created (updated) and displayed in real time as the user assembles the fieldbus configuration or function block application. Thus, as the user drops function block icons in the editor window, corresponding schedule bars appear in the schedule window to illustrate the schedule of the application or fieldbus configuration being created. Also, as the user links or connects function block icons in the editor window, the corresponding schedule bars are re-arranged or manipulated to illustrate the schedule of the application being assembled As shown in FIG. 44a, the editor window is blank, and the schedule window is also blank. In FIG. 44b a function block icon has been placed in the editor window. A corresponding schedule bar automatically appears in the schedule in response to the function block icon being placed in the editor window.

Figure 44C:
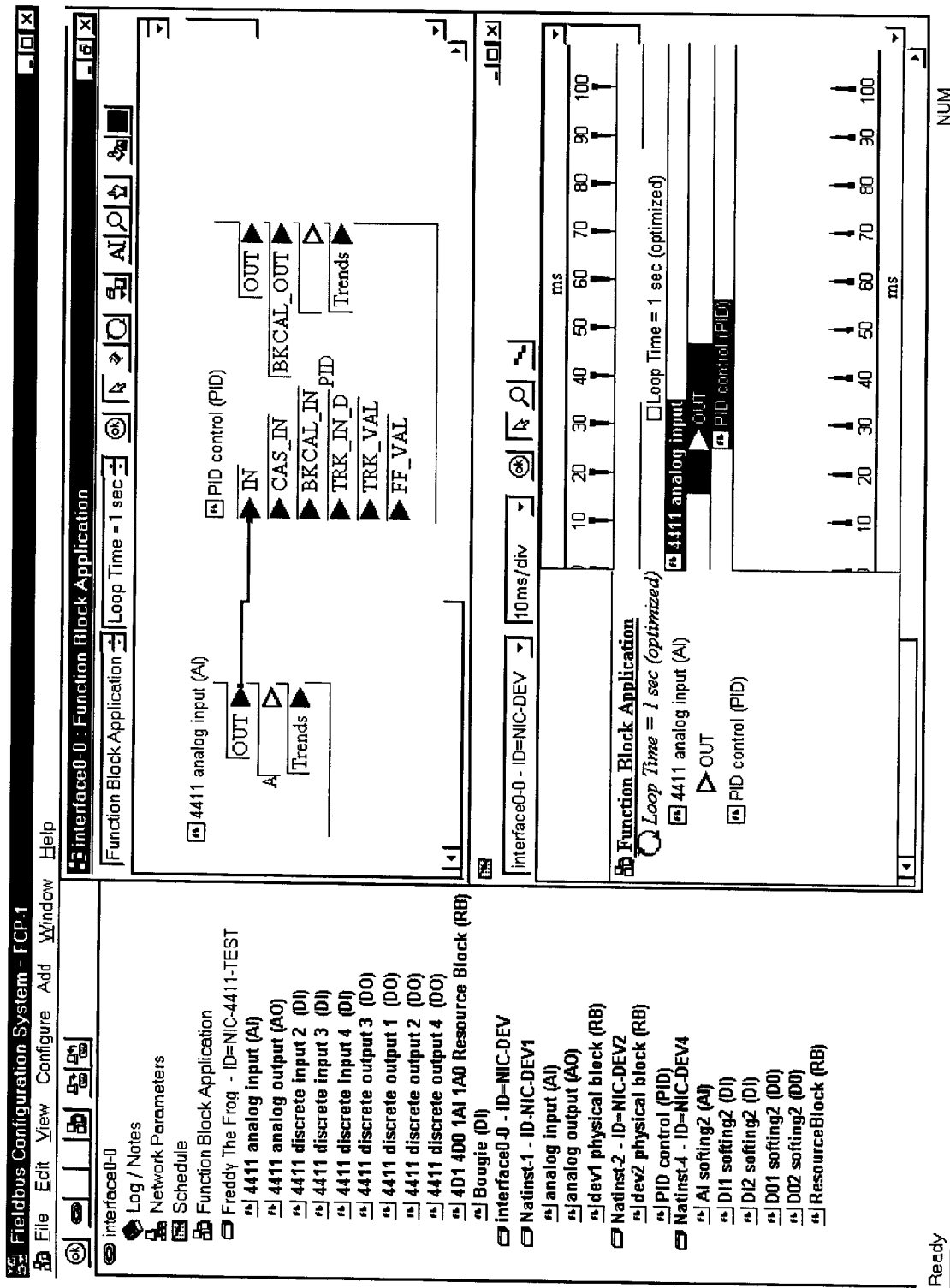
Figure 44D:
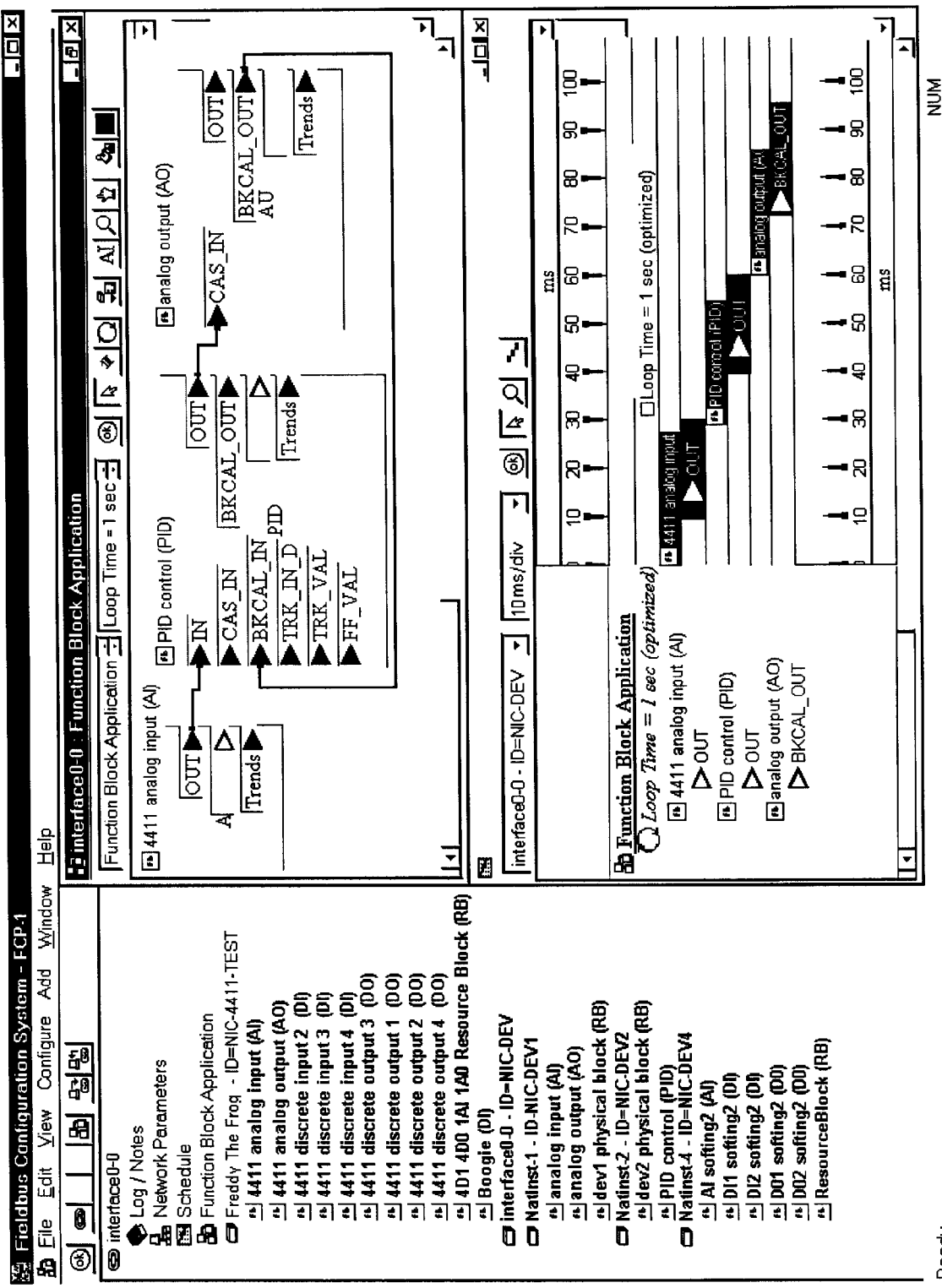

In FIG. 44c a second function block icon referred to as PID control has been placed in the editor window, and the output of the analog input function icon has been connected to an input of the PID control function block icon. In response to these operations being performed in the editor window, the fieldbus configuration utility of the present invention automatically displays additional schedule bars which indicate the schedule of the application as it is being created. In FIG. 44d, the fieldbus configuration or function block application has been completed, and the schedule has also been completed as shown.

Thus, the present invention displays the schedule in real time during creation of the fieldbus configuration. Thus, the user receives immediate feedback as to the schedule that is being created as the user assembles or wires up the fieldbus configuration. This provides a very intuitive system and method for creating the fieldbus configuration according to the present invention.

FIGS. 45a–d: Creation of a fieldbus configuration with a loop structure with the schedule window open FIGS. 45a–45d illustrate further creation of the fieldbus configuration shown in FIG. 44d, wherein a loop structure is added to the configuration. FIGS. 45a–45d also illustrate the schedule window as the loop structure is added to the fieldbus configuration.

Figure 45A:
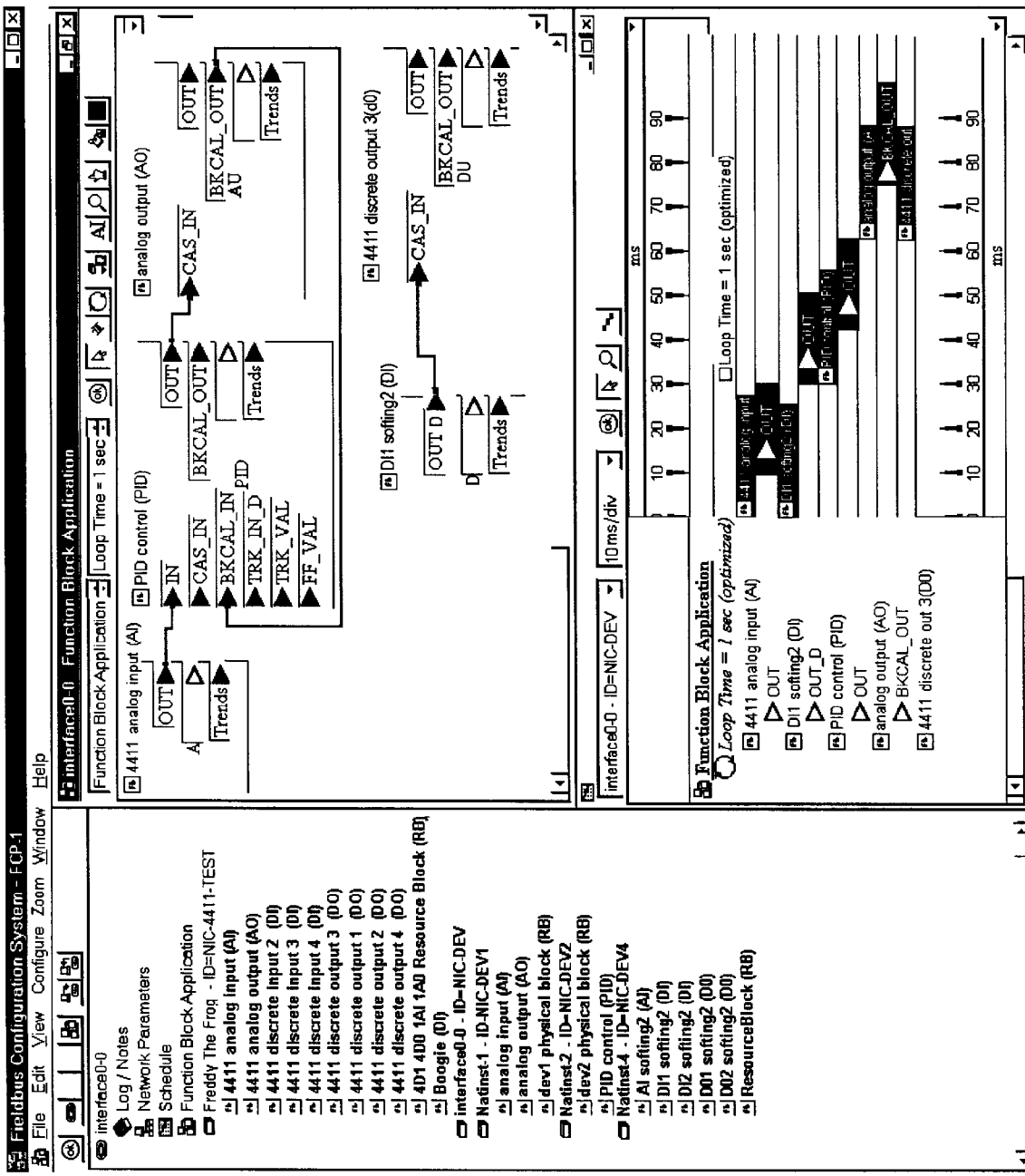
FIGS. 45a–d are screen shots illustrating use of a loop structure in the editor window.

As shown, in FIG. 45a the fieldbus configuration portion which is shown in FIG. 44d is present in the editor window, and the user has added additional interconnected function blocks referred to as "DI1 softing2 (DI)" and "4411 discrete output 3 (DO)". In response to these additional interconnected function blocks being added to the editor window, additional schedule bars appear in the schedule window as shown.

Figure 45B:
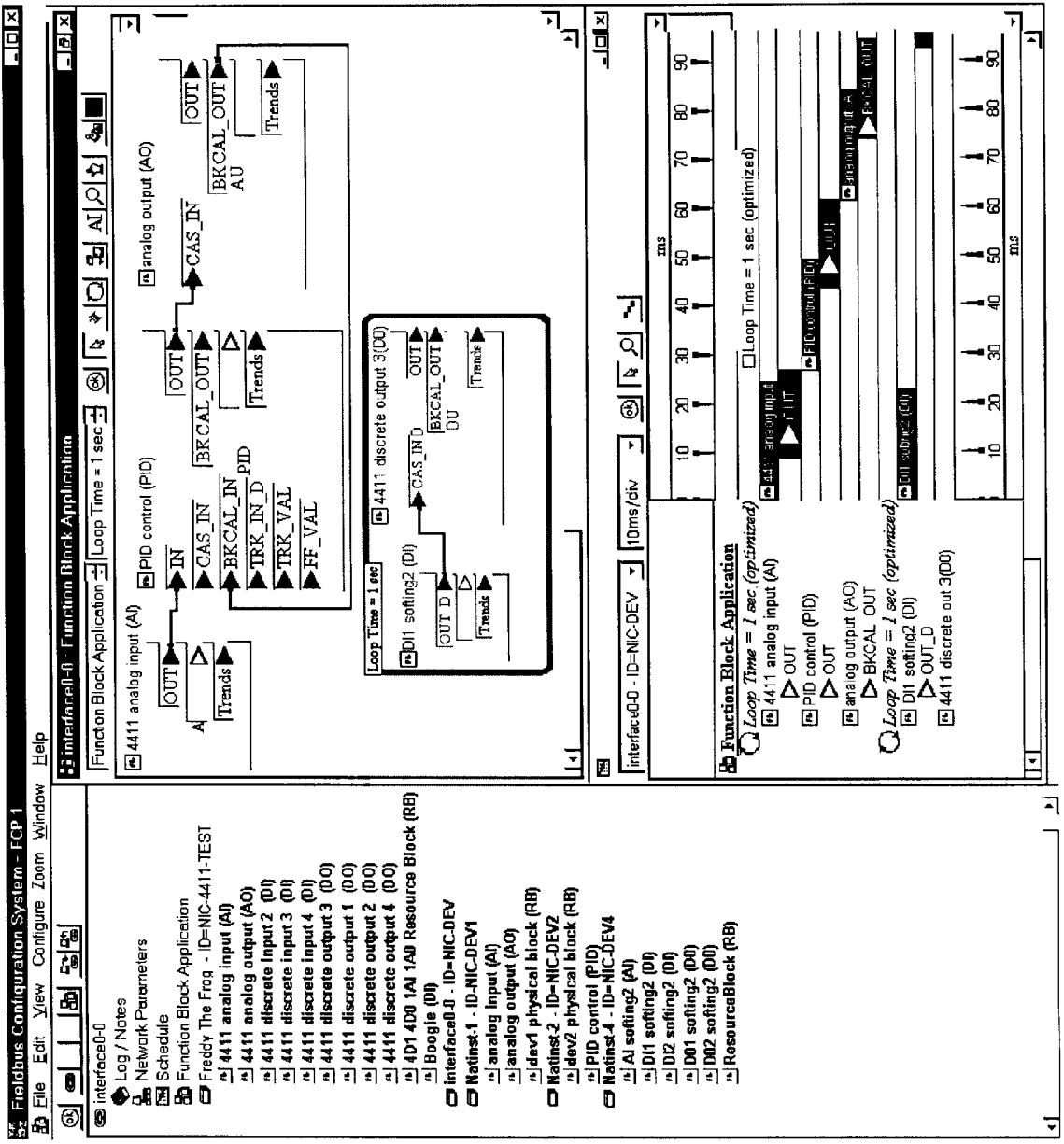

In FIG. 45b the user creates or places a loop structure around these added function blocks as shown. As shown, the default loop time of the loop structure is one second, which corresponds to the default loop time of the editor window. In response to the user placing the loop structure in the editor window, the schedule adds an additional loop time field as shown.

Figure 45C:
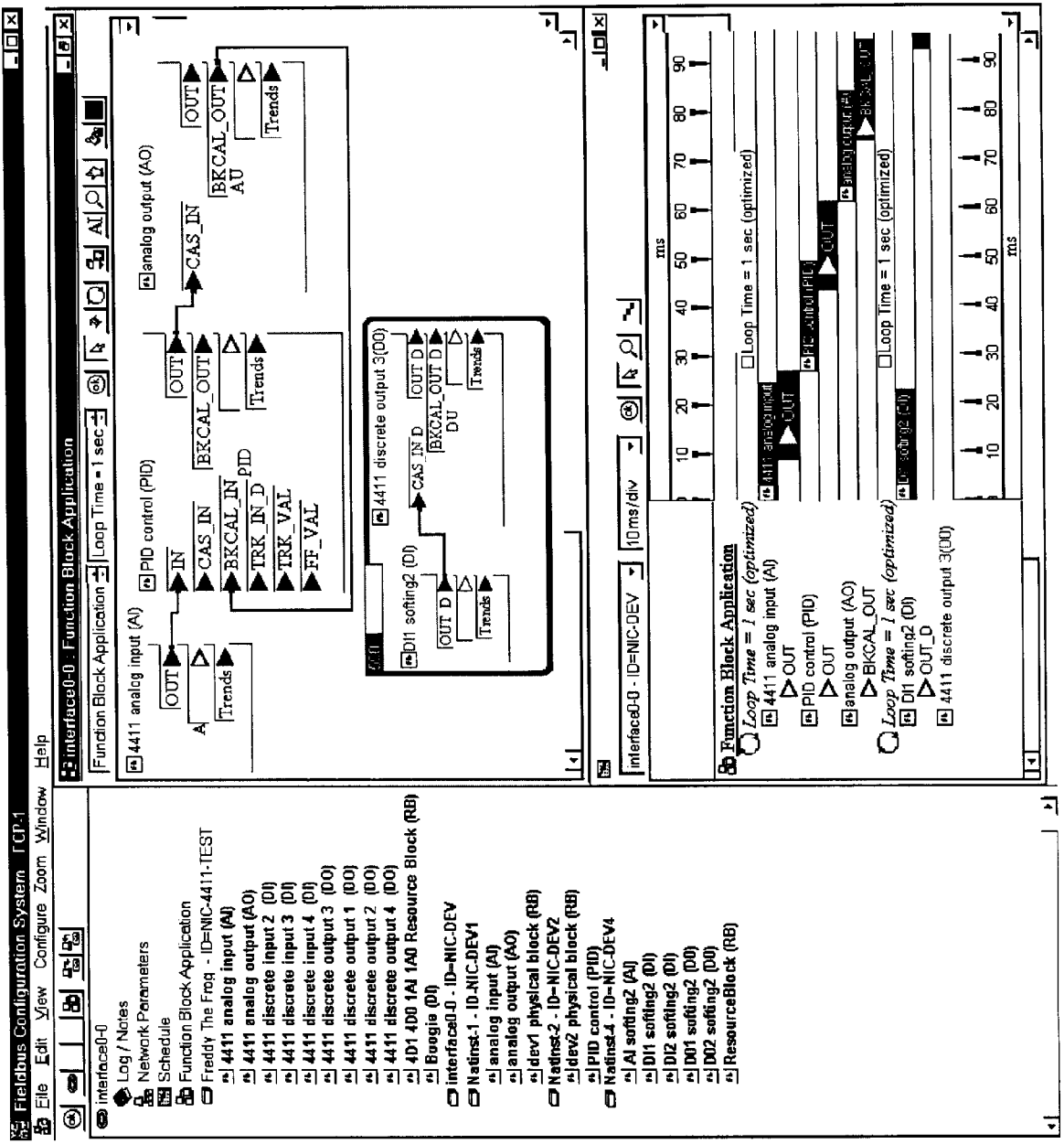
Figure 45D:
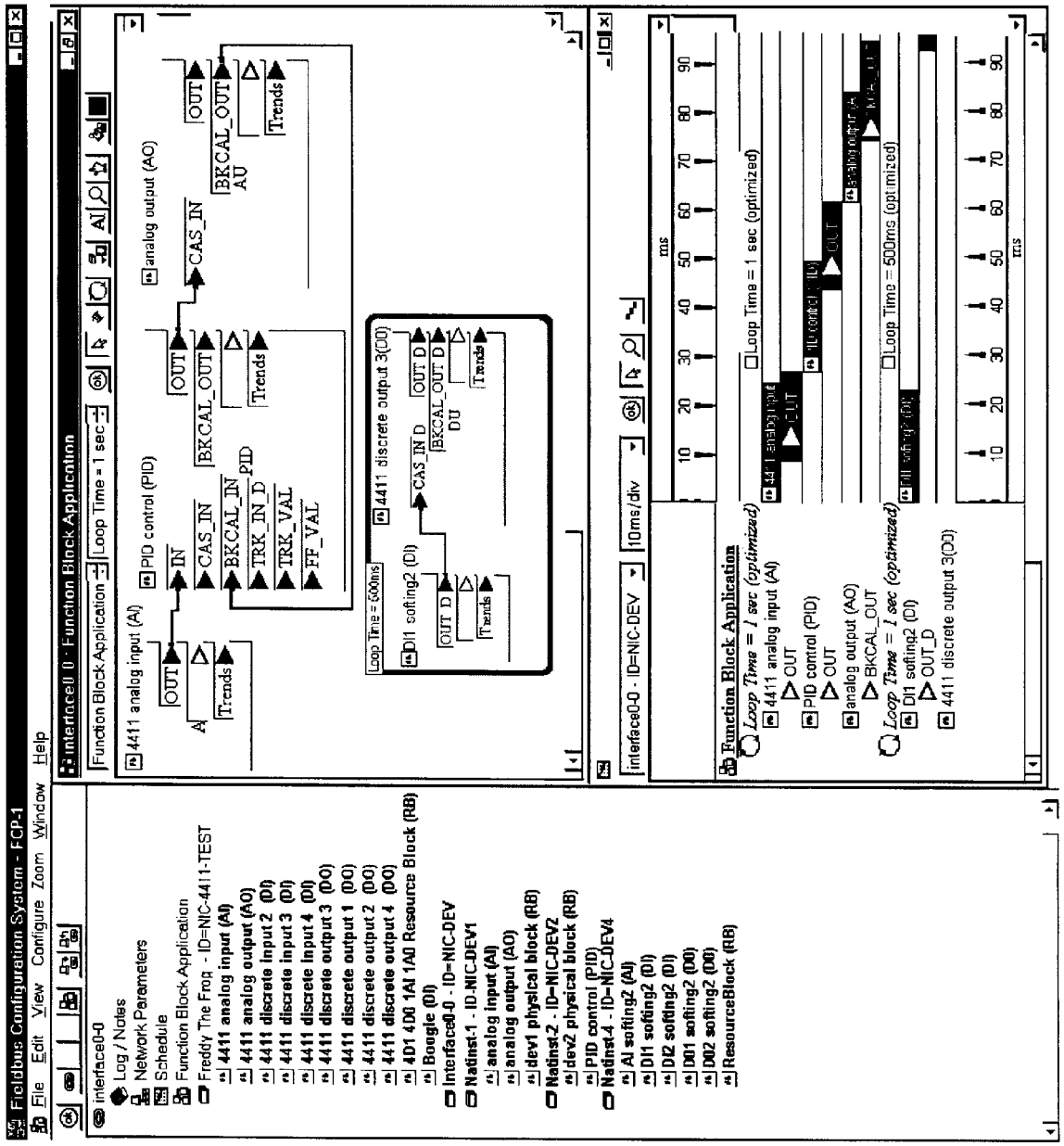

In FIG. 45c the user selects the loop time field in the loop structure and changes the loop time from one second to 500 milliseconds. In response, in FIG. 45d the loop structure displays the new loop time of 500 milliseconds, and this new loop time is also updated in the schedule as shown.

Figure 46A:
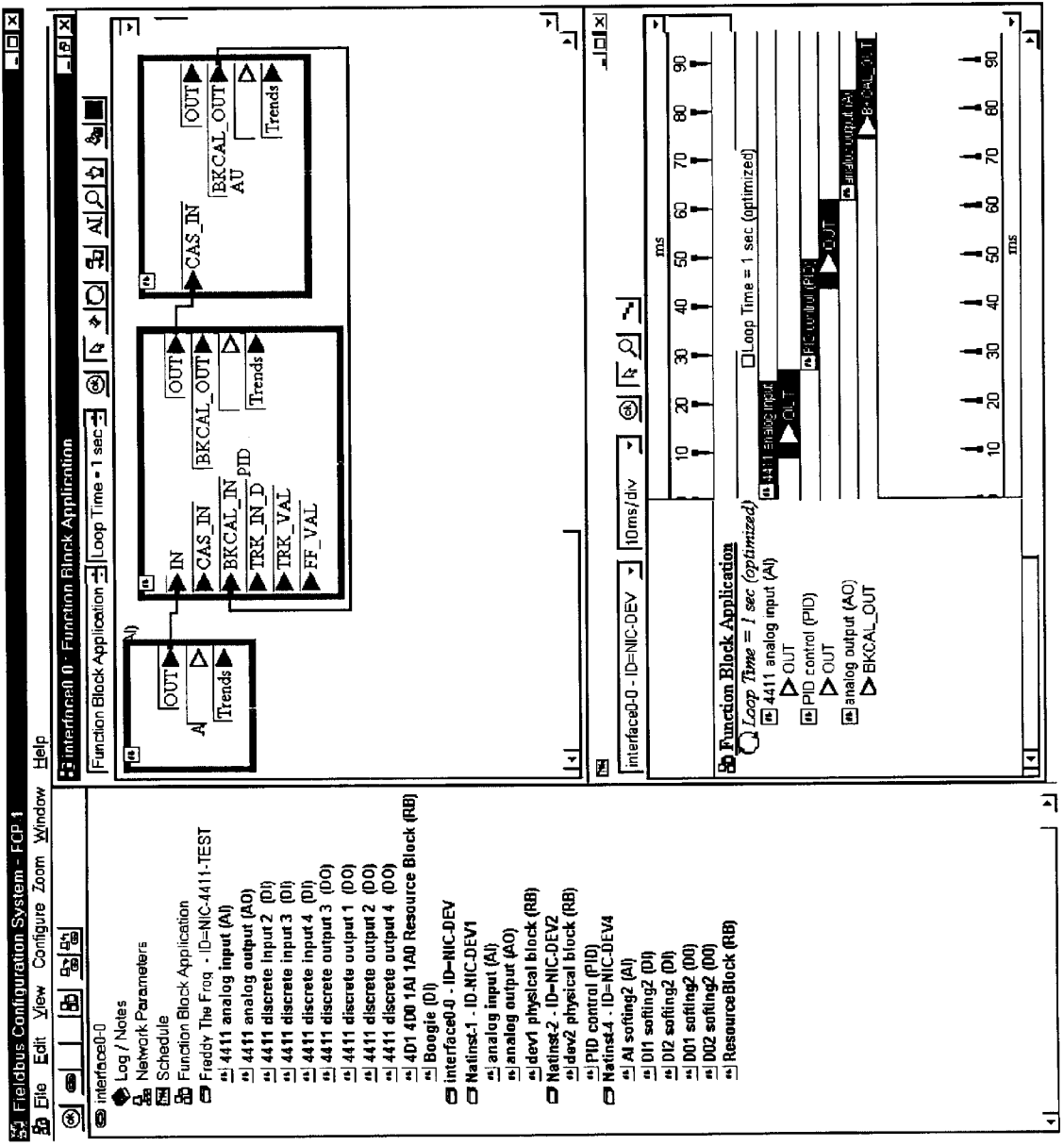
FIGS. 46a–b are screen shots illustrating changing the order of execution of a fieldbus configuration.
Figure 46B:
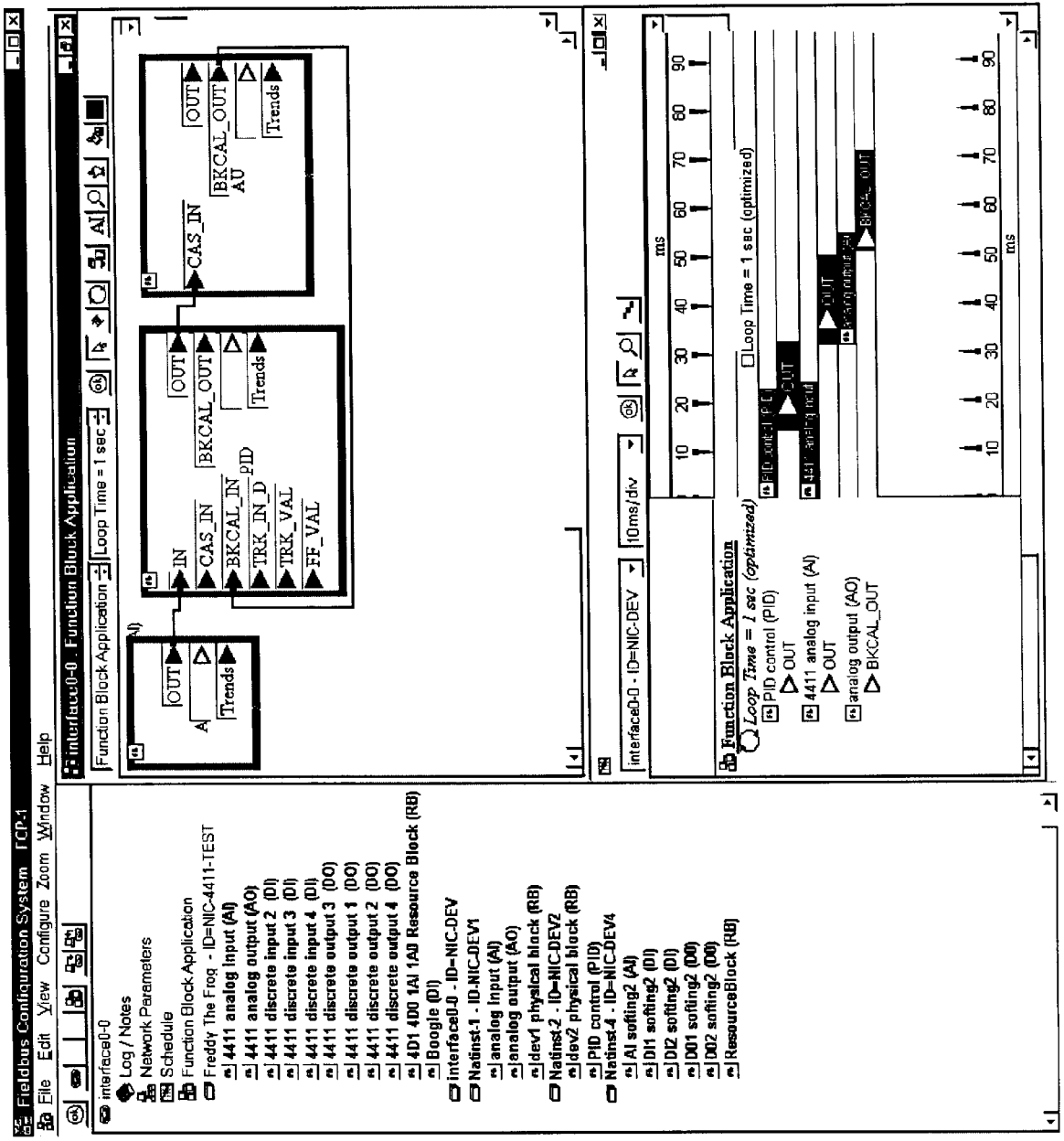

FIGS. 46a–b: Changing the order of execution of a fieldbus configuration

FIGS. 46a–46b illustrate operation of the user changing the order of execution of a completed fieldbus configuration. As shown, in FIG. 46a the fieldbus configuration in the editor window includes an order from left to right of 1–3. In other words, as shown, the function block on the far left executes first, followed by the middle function block and then followed by the right most function block. The schedule in the schedule window is also configured according to this order of execution.

In FIG. 46b, the user has opted to change the order of execution of the function block icons in the editor window. As shown, in this new order, the middle function block executes first, followed by the left most function block and then the right most function block. When the user changes the order of execution of the function block icons in the editor window, the schedule is automatically updated to represent this new order of execution as shown.

As noted above, the user can also change the order of execution of the function block icons by manipulating the schedule bars in the schedule window.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters.

2. A method for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters;

wherein said displaying on the screen a list of parameters comprises displaying an object proximate to each of a subset of said parameters, wherein said objects have different colors to distinguish among parameters.

3. The method of claim 2, wherein said objects have different colors to distinguish between different classifications of parameters, wherein said classifications include contained, input, and output.

4. The method of claim 2, wherein said objects have different colors to distinguish between alarm, tuning, and diagnostic parameters.

5. The method of claim 2, wherein said objects also have various differing shapes to identify different classifications of parameters.

6. A method for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters;

wherein said displaying on the screen a list of parameters comprises displaying an object proximate to each of a subset of said parameters wherein said objects have different shapes to distinguish among parameters.

7. The method of claim 6, wherein said objects have different shapes to distinguish between contained parameters, input parameters and output parameters.

8. The method of claim 6, wherein each of said objects can have one of a plurality of possible shapes, said possible shapes including circles and triangles.

9. The method of claim 6, wherein said objects also have various differing colors to identify different classifications of parameters.

10. The method of claim 9, wherein said objects have different colors to distinguish between contained parameters and input/output parameters.

11. A method for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

determining one or more blocks in a device;

determining parameters from the device after said determining said one or more blocks, wherein said determining parameters includes determining identification values of the parameters;

obtaining a device description for each parameter, wherein said obtaining a device description includes receiving parameter information associated with the identification values;

parsing the parameter information;

displaying said parameters, wherein said parameters are displayed in a manner which indicates at least a portion of said parameter information.

12. The method of claim 11, wherein said displaying said parameters in a manner which indicates at least a portion of said parameter information includes displaying an object proximate to each of at least a subset of said parameters, wherein said objects have different shapes to visually distinguish among said parameters.

13. The method of claim 12, wherein said objects have different shapes to visually distinguish between different classifications of said parameters, wherein said different classifications of said parameters include contained parameters, input parameters and output parameters.

14. The method of claim 12, wherein said objects also have various differing colors to visually distinguish among different classifications of said parameters.

15. The method of claim 11, wherein said displaying said parameters in a manner which indicates at least a portion of said parameter information includes displaying an object next to each of at least a subset of said parameters, wherein said objects have different colors to visually distinguish among said parameters.

16. The method of claim 15, wherein said objects have different colors to visually distinguish between different classifications of parameters, wherein said different classifications of parameters include alarm parameters and tuning parameters.

17. The method of claim 15, wherein said objects also have various differing shapes to visually distinguish among different classifications of said parameters.

18. The method of claim 11, wherein, for at least a subset of said parameters, said parameter information includes classification information;

wherein said parameters are displayed in a manner which indicates said classification of said parameters.

19. The method of claim 11, wherein said classification of said parameters includes contained, input, and output classifications, wherein said contained classification further includes alarms and tuning classifications.

20. A method for configuring trends of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

selecting a block in response to user input;

selecting one or more parameters of the selected block to trend in response to user input;

displaying on the screen a block icon which corresponds to the selected block, wherein the block icon includes a trends output;

displaying on the screen a device icon which corresponds to a device in the fieldbus network; and displaying on the screen a wire connecting the trends output of the block icon to an input of the device icon in response to user input.

21. The method of claim 20, wherein said displaying on the screen the wire connecting the trends output of the block icon to the input of the device icon operates to configure the device to receive trend information from the block regarding the one or more selected parameters.

22. The method of claim 20, wherein said selecting one or more parameters of the selected block to trend comprises:

displaying a list of parameters of the selected block; and selecting said one or more parameters from said list of parameters.

23. The method of claim 20, further comprising:

executing a fieldbus configuration including said block icon, said device icon and said wire connecting the trends output of the block icon to the input of the device icon, wherein the device icon receives trend information of said selected one or more parameters from said block icon during said executing.

24. The method of claim 20, further comprising:

selecting a sample interval of the trend in response to user input; and selecting a sample type of the trend in response to user input.

25. A method for configuring alarms of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

selecting a block in response to user input;

displaying on the screen a block icon which corresponds to the selected block, wherein the block icon includes an alarm output;

displaying on the screen a device icon which corresponds to a device in the fieldbus network; and displaying on the screen a wire connecting the alarm output of the block icon to an input of the device icon in response to user input.

26. The method of claim 25, wherein said displaying on the screen the wire connecting the alarm output of the block icon to the input of the device icon operates to configure the device to receive alarm information from the selected block.

27. The method of claim 25, further comprising:

executing a fieldbus configuration including said block icon, said device icon and said wire connecting the alarm output of the block icon to the input of the device icon, wherein the device icon receives alarm information from the selected block during said executing.

28. A method for monitoring parameters in a fieldbus network, wherein the method operates on a computer system coupled to the fieldbus network, the computer system including a display screen, wherein the fieldbus network includes a plurality of devices connected to a fieldbus bus, wherein one or more of the fieldbus devices includes one or more blocks, the method comprising:

displaying on the screen a window;

displaying on the screen a plurality of parameters comprised in the window;

selecting one or more parameters after displaying said plurality of parameters;

enabling a periodic update option in response to user input;

wherein values of said selected one or more parameters are periodically updated in response to said enabling the periodic update option.

29. A method for editing parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, the method comprising:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters;

selecting a parameter to be edited in response to user input;

displaying on the screen an edit control for changing the value of the parameter in response to said selecting; and receiving user input manipulating the edit control, wherein said manipulating edit control operates to change the value of the parameter.

30. The method of claim 29, wherein said displaying on the screen an edit control comprises displaying on the screen an edit control corresponding to the type of parameter value being edited.

31. The method of claim 30, wherein said edit control comprises one from the group comprising: an edit control for changing string values, a spin control for changing integer values, a list control for selecting from several alternative options, and a check list control for selecting several options;

wherein one of said edit controls appears depending on the type of parameter value being edited.

32. A memory media which stores program instructions for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, wherein the program instructions are executable to implement the steps of:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters;

wherein said displaying on the screen a list of parameters comprises displaying an object proximate to each of a subset of said parameters, wherein said objects have different colors to distinguish among parameters.

33. The memory media of claim 32, wherein said objects have different colors to distinguish between different classifications of parameters, wherein said classifications include alarm, tuning, and diagnostic parameters.

34. The method of claim 32, wherein said objects also have various differing shapes to identify different classifications of parameters.

35. A memory media comprising program instructions for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, wherein the program instructions are executable to implement the steps of:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters;

wherein said displaying on the screen a list of parameters comprises displaying an object proximate to each of a subset of said parameters, wherein said objects have different shapes to distinguish among parameters.

36. The memory media of claim 35, wherein said objects have different shapes to distinguish between contained parameters, input parameters and output parameters.

37. The memory media of claim 35, wherein said objects also have various differing colors to identify different classifications of parameters.

38. A memory media comprising program instructions for displaying parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, wherein the program instructions are executable to implement the steps of:

determining one or more blocks in a device;

determining parameters from the device after said determining said one or more blocks, wherein said determining parameters includes determining identification values of the parameters;

obtaining a device description for each parameter, wherein said obtaining a device description includes receiving parameter information associated with the identification values;

parsing the parameter information; and displaying said parameters, wherein said parameters are displayed in a manner which indicates at least a portion of said parameter information.

39. The memory media of claim 38, wherein said displaying said parameters in a manner which indicates at least a portion of said parameter information includes displaying an object proximate to each of at least a subset of said parameters, wherein said objects have different shapes to visually distinguish among said parameters.

40. The memory media of claim 39, wherein said objects have different shapes to visually distinguish between different classifications of said parameters, wherein said different classifications of said parameters include contained parameters, input parameters and output parameters.

41. The memory media of claim 39, wherein said objects also have various differing colors to visually distinguish among different classifications of said parameters.

42. The memory media of claim 38, wherein said displaying said parameters in a manner which indicates at least a portion of said parameter information includes displaying an object next to each of at least a subset of said parameters, wherein said objects have different colors to visually distinguish among said parameters.

43. The memory media of claim 42, wherein said objects have different colors to visually distinguish between different classifications of parameters, wherein said different classifications of parameters include alarm parameters and tuning parameters.

44. The memory media of claim 42, wherein said objects also have various differing shapes to visually distinguish among different classifications of said parameters.

45. The memory media of claim 38, wherein, for at least a subset of said parameters, said parameter information includes classification information;

wherein said parameters are displayed in a manner which indicates said classification of said parameters.

46. The memory media of claim 38, wherein said classification of said parameters includes contained, input, and output classifications, wherein said contained classification further includes alarms and tuning classifications.

47. A memory media comprising program instructions for configuring trends of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, wherein the program instructions are executable to implement the steps of:

selecting a block in response to user input;

selecting one or more parameters of the selected block to trend in response to user input;

displaying on the screen a block icon which corresponds to the selected block, wherein the block icon includes a trends output;

displaying on the screen a device icon which corresponds to a device in the fieldbus network; and displaying on the screen a wire connecting the trends output of the block icon to an input of the device icon in response to user input.

48. The memory media of claim 47, wherein said displaying on the screen the wire connecting the trends output of the block icon to the input of the device icon operates to configure the device to receive trend information from the block regarding the one or more selected parameters.

49. The memory media of claim 47, wherein said selecting one or more parameters of the selected block to trend comprises:

displaying a list of parameters of the selected block; and selecting said one or more parameters from said list of parameters.

50. The memory media of claim 47, wherein the program instructions are executable to further implement the step of:

executing a fieldbus configuration including said block icon, said device icon and said wire connecting the trends output of the block icon to the input of the device icon, wherein the device icon receives trend information of said selected one or more parameters from said block icon during said executing.

51. The memory media of claim 47, wherein the program instructions are executable to further implement the steps of:

selecting a sample interval of the trend in response to user input; and selecting a sample type of the trend in response to user input.

52. A memory media comprising program instructions for configuring alarms of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, wherein the program instructions are executable to implement the steps of:

selecting a block in response to user input;

displaying on the screen a block icon which corresponds to the selected block, wherein the block icon includes an alarm output;

displaying on the screen a device icon which corresponds to a device in the fieldbus network; and displaying on the screen a wire connecting the alarm output of the block icon to an input of the device icon in response to user input.

53. The memory media of claim 52, wherein said displaying on the screen the wire connecting the alarm output of the block icon to the input of the device icon operates to configure the device to receive alarm information from the selected block.

54. The memory media of claim 52, wherein the program instructions are executable to further implement the step of:

executing a fieldbus configuration including said block icon, said device icon and said wire connecting the alarm output of the block icon to the input of the device icon, wherein the device icon receives alarm information from the selected block during said executing.

55. A memory media comprising program instructions for monitoring parameters in a fieldbus network, wherein the memory media operates on a computer system coupled to the fieldbus network, the computer system including a display screen, wherein the fieldbus network includes a plurality of devices connected to a fieldbus bus, wherein one or more of the fieldbus devices includes one or more blocks, wherein the program instructions are executable to implement the steps of:

displaying on the screen a window;

displaying on the screen a plurality of parameters comprised in the window;

selecting one or more parameters after displaying said plurality of parameters;

enabling a periodic update option in response to user input;

wherein values of said one or more parameters comprised in the window are periodically updated in response to said enabling the periodic update option.

56. A memory media comprising program instructions for editing parameters of a block on a computer system, the computer system including a display screen, wherein the computer system is coupled to a fieldbus network, wherein the fieldbus network includes a plurality of devices connected to a fieldbus bus, wherein one or more of the fieldbus devices includes one or more blocks, wherein the program instructions are executable to implement the steps of:

displaying on the screen a plurality of block icons in response to user input, wherein each of said plurality of block icons represents one or more of said blocks, wherein each of said plurality of block icons includes one or more algorithms and one or more parameters;

selecting a block in response to user input;

displaying on the screen a list of block parameters corresponding to said selected block, wherein said displaying on the screen the list of block parameters includes displaying on the screen values corresponding to each of said parameters;

selecting a parameter to be edited in response to user input;

displaying on the screen an edit control for changing the value of the parameter in response to said selecting; and receiving user input manipulating the edit control, wherein said manipulating edit control operates to change the value of the parameter.

57. The memory media of claim 56, wherein said displaying on the screen an edit control comprises displaying on the screen an edit control corresponding to the type of parameter value being edited.

58. The memory media of claim 57, wherein said edit control comprises one from the group comprising: an edit control for changing string values, a spin control for changing integer values, a list control for selecting from several alternative options, and a check list control for selecting several options;

wherein one of said edit controls appears depending on the type of parameter value being edited.

* * * * *